April 1, 1930. C. D. ROWLEY ET AL 1,753,093
CALCULATING MACHINE
Filed July 9, 1925 35 Sheets-Sheet 1

INVENTORS.
C. D. Rowley and
W. Jackson.
Watson, Coit, Morse & Grindle
ATTYS.

April 1, 1930.  C. D. ROWLEY ET AL  1,753,093
CALCULATING MACHINE
Filed July 9, 1925   35 Sheets-Sheet 7
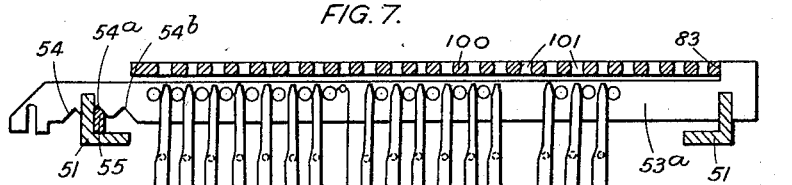
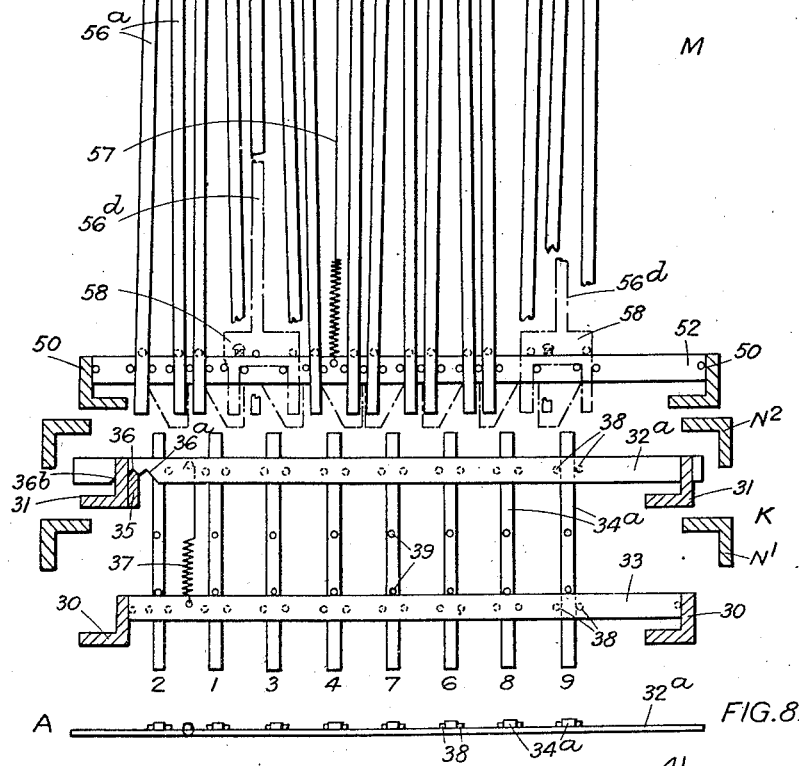
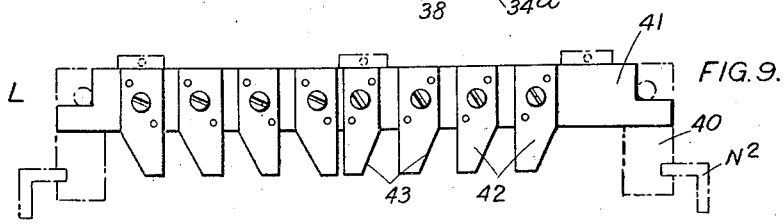

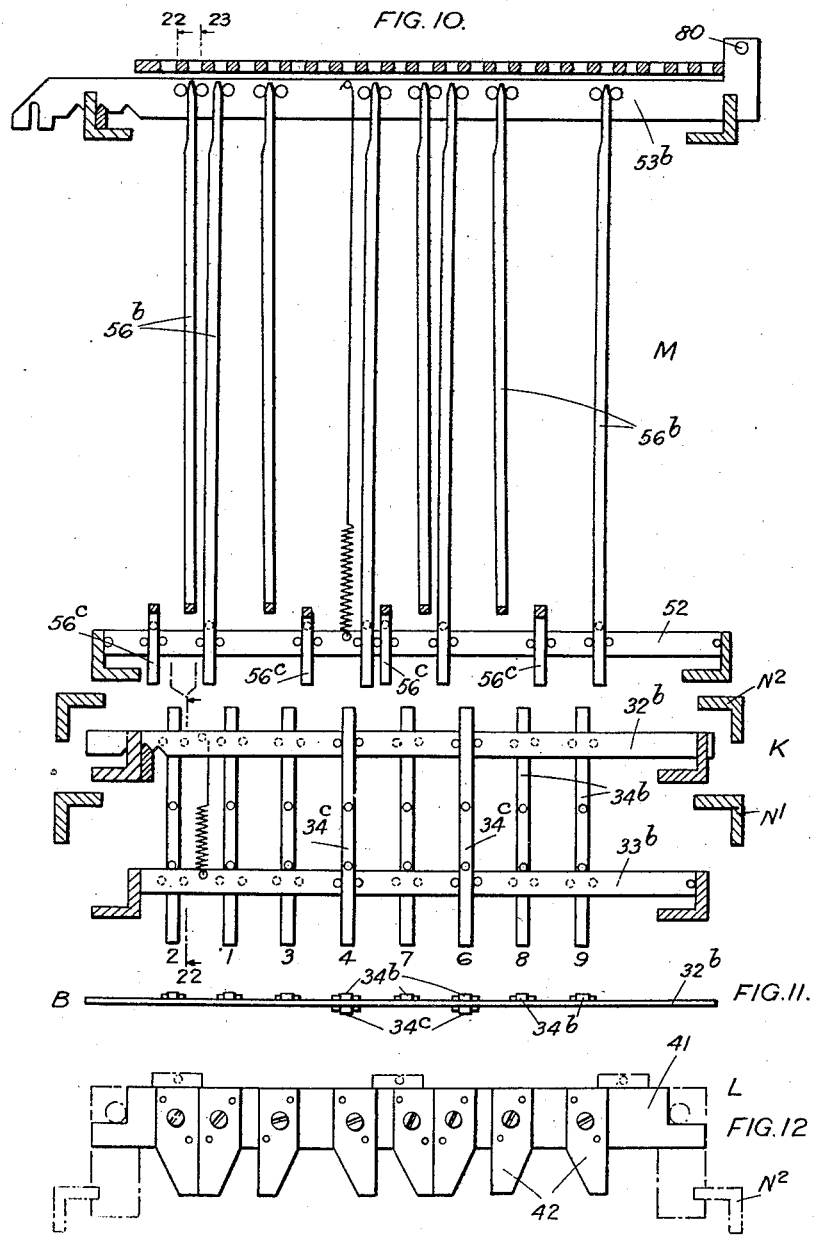

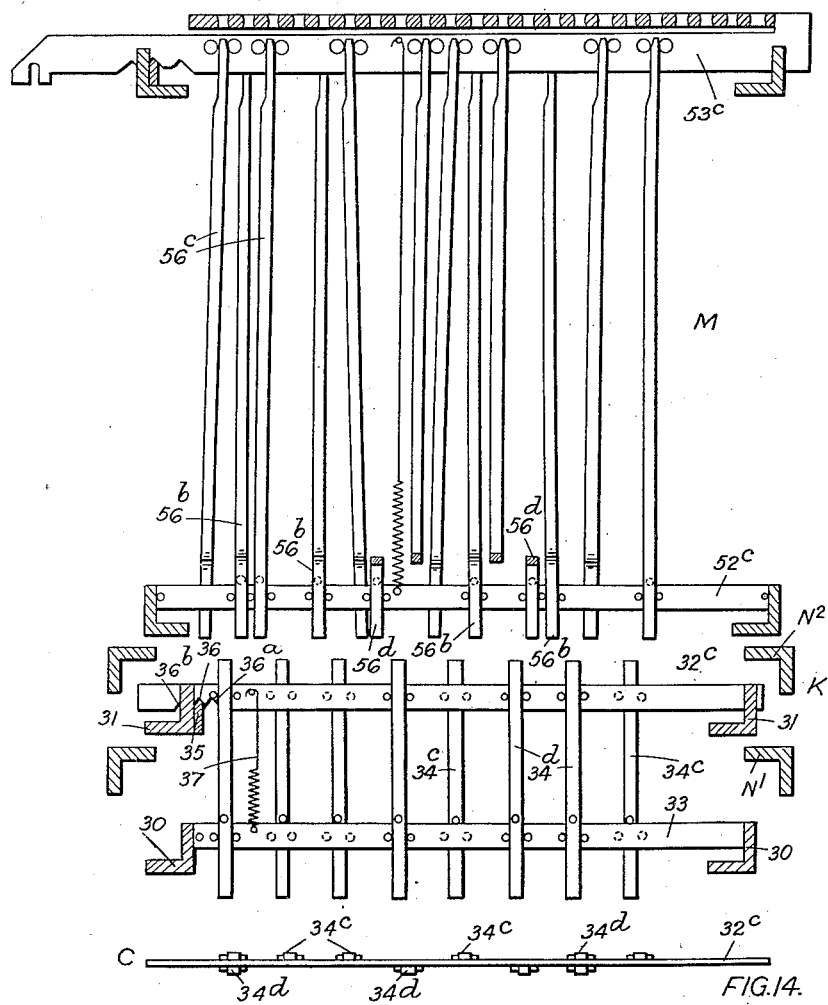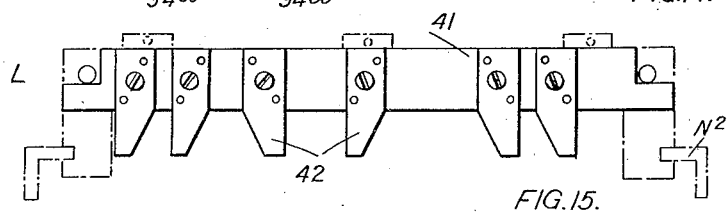

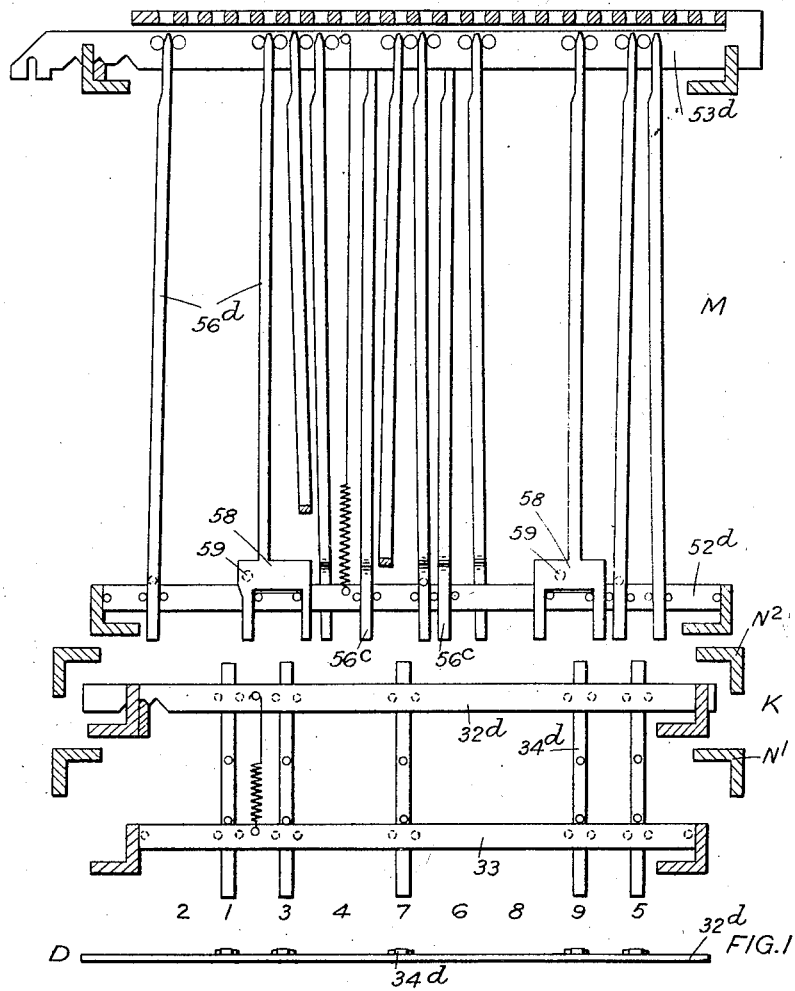
FIG. 16.
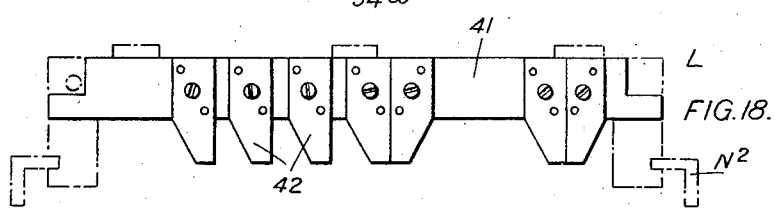
FIG. 17.
FIG. 18.

April 1, 1930.  C. D. ROWLEY ET AL  1,753,093
CALCULATING MACHINE
Filed July 9, 1925   35 Sheets-Sheet 11
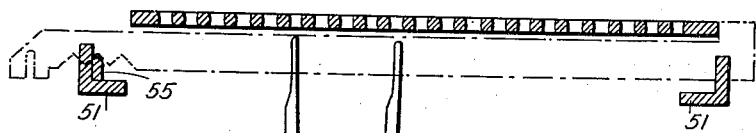
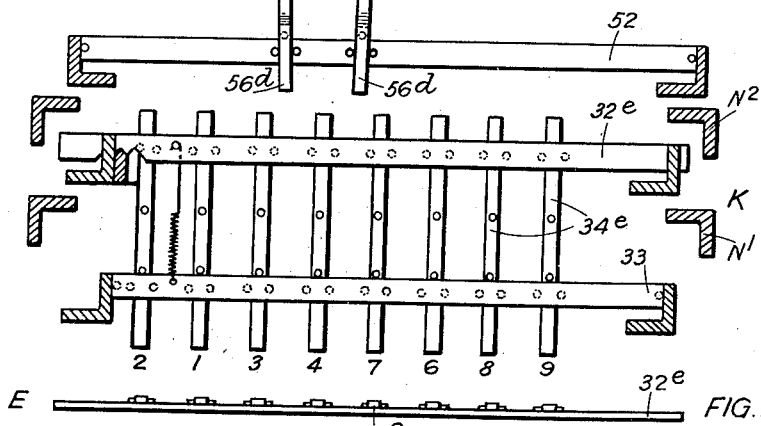
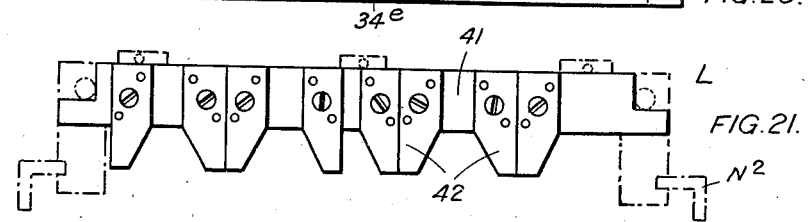

April 1, 1930.  C. D. ROWLEY ET AL  1,753,093
CALCULATING MACHINE
Filed July 9, 1925  35 Sheets-Sheet 12
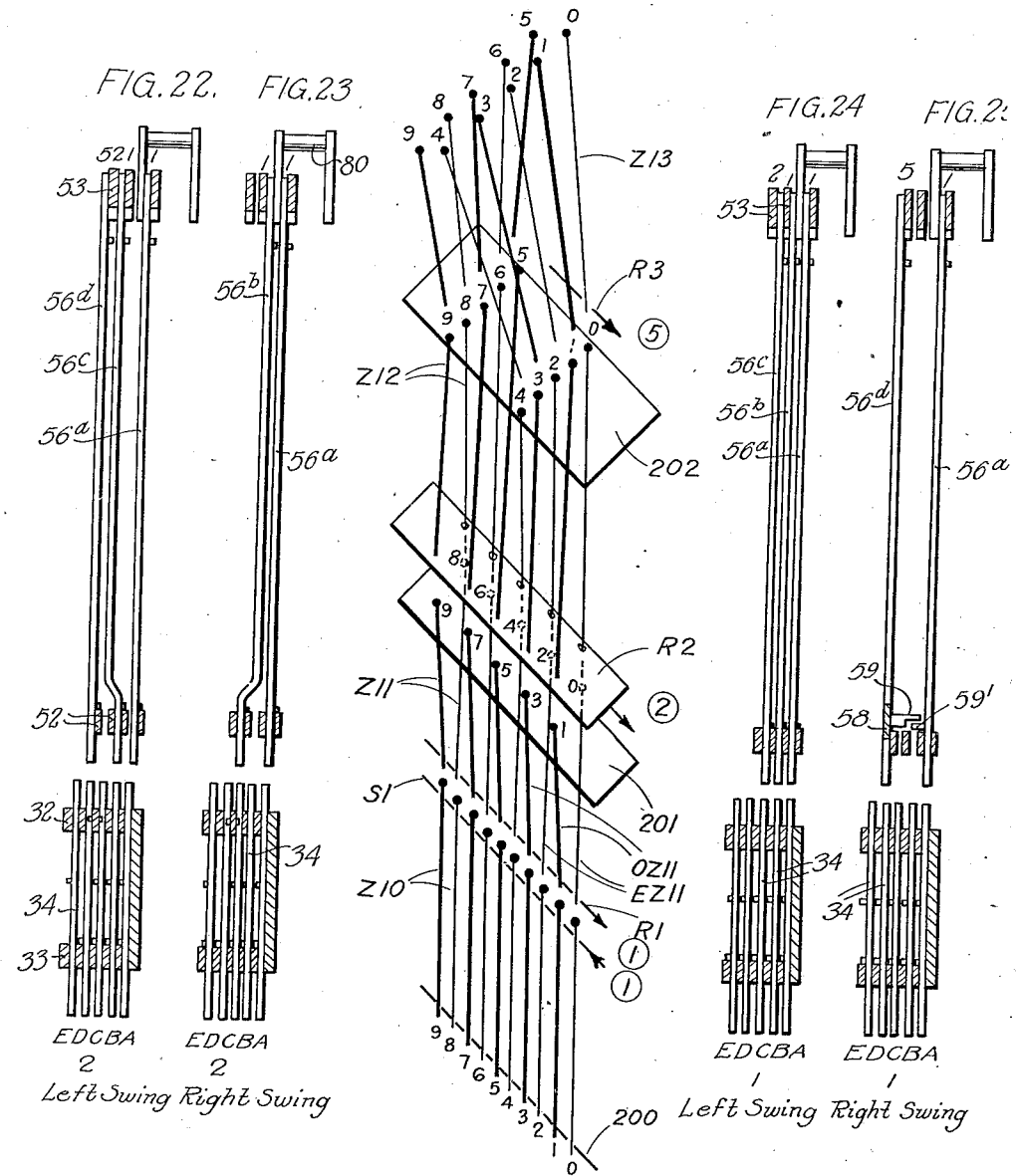

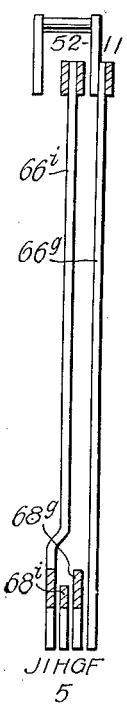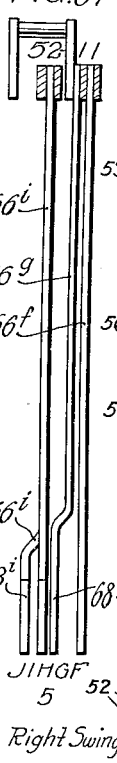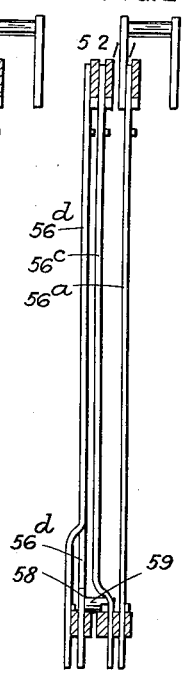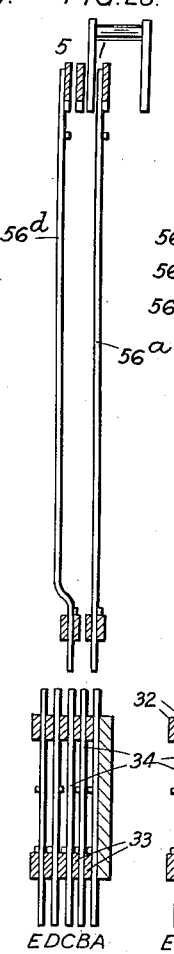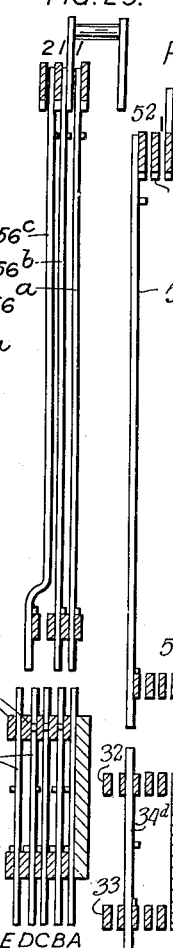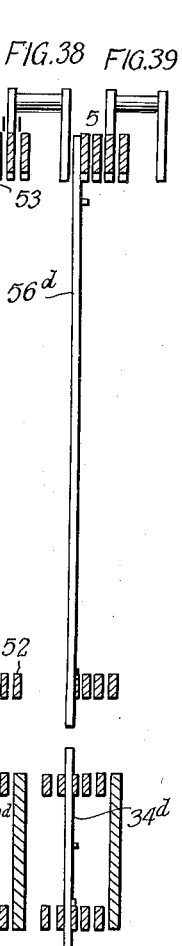

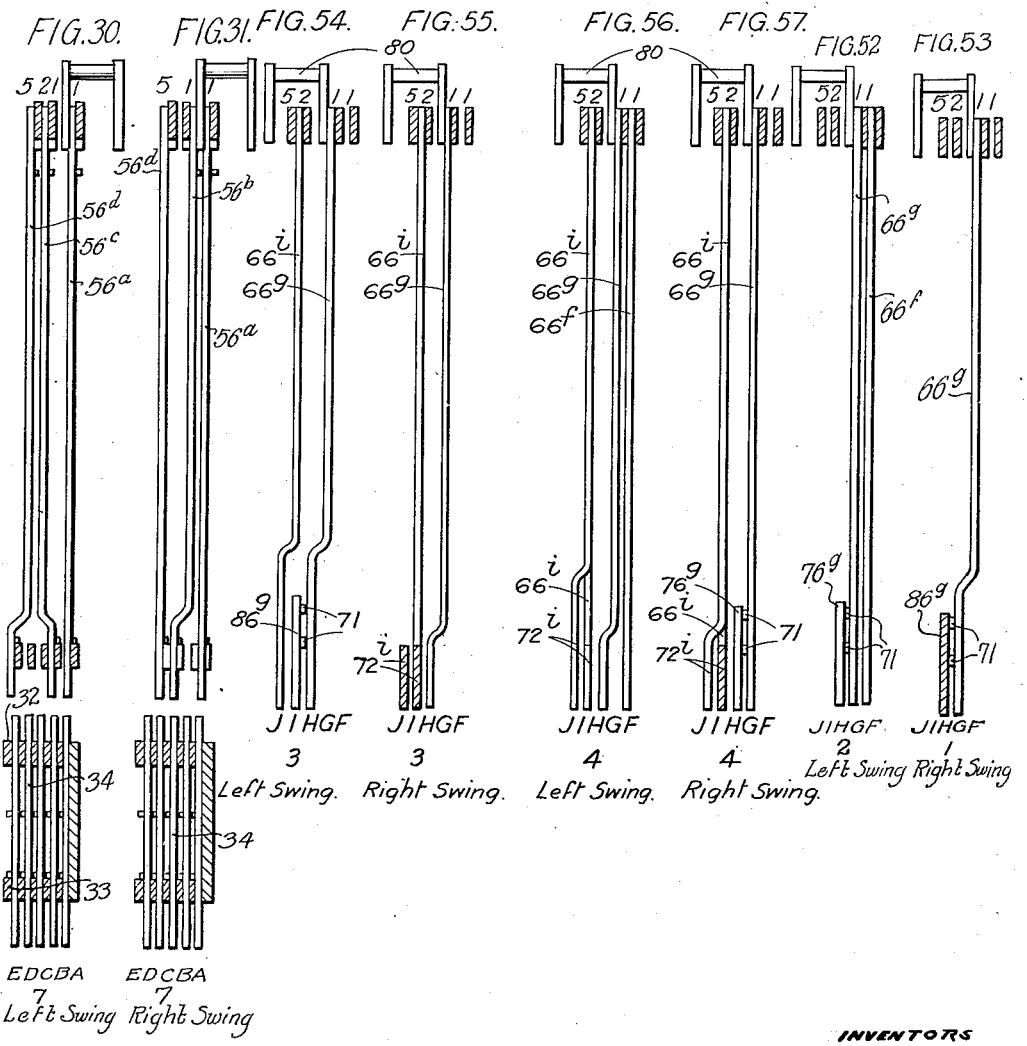

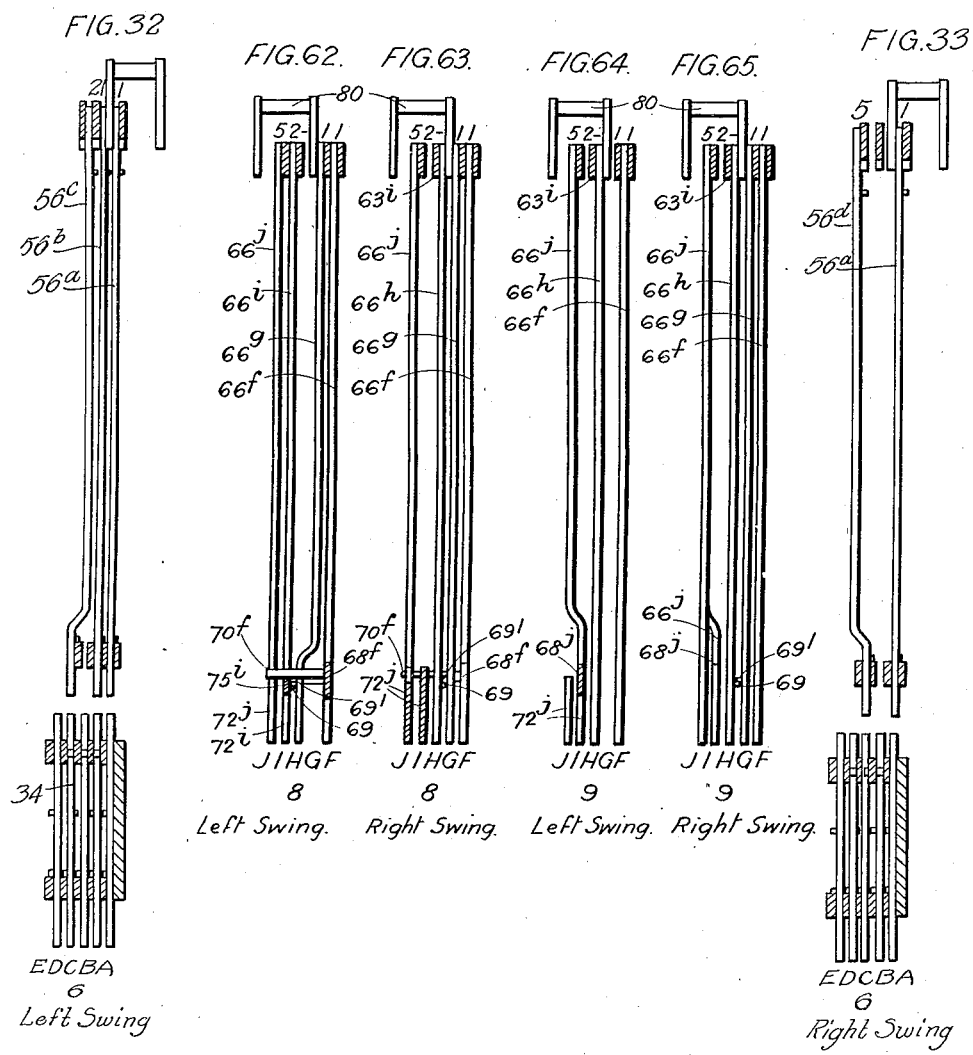

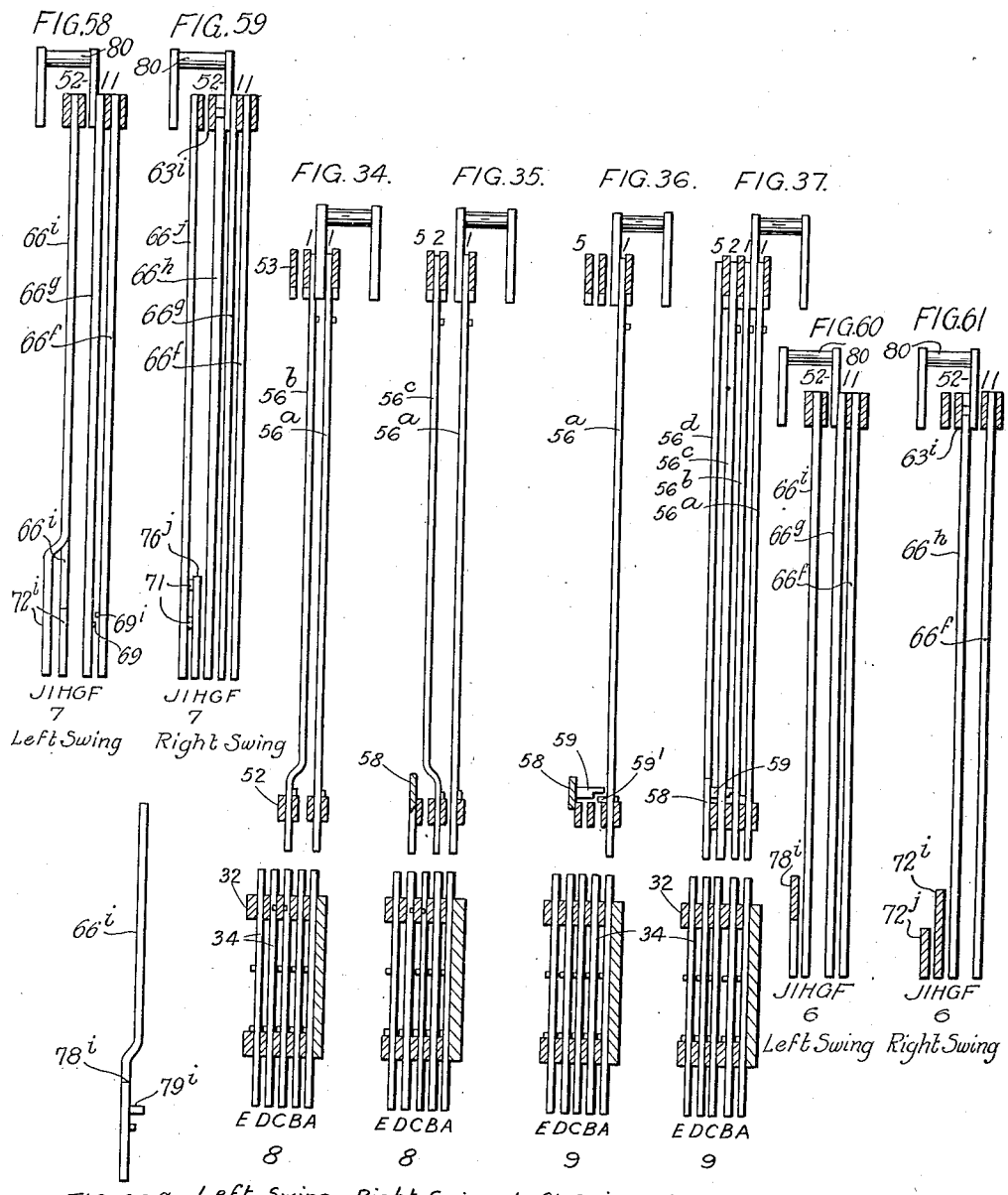

April 1, 1930.    C. D. ROWLEY ET AL    1,753,093
CALCULATING MACHINE
Filed July 9, 1925    35 Sheets-Sheet 17
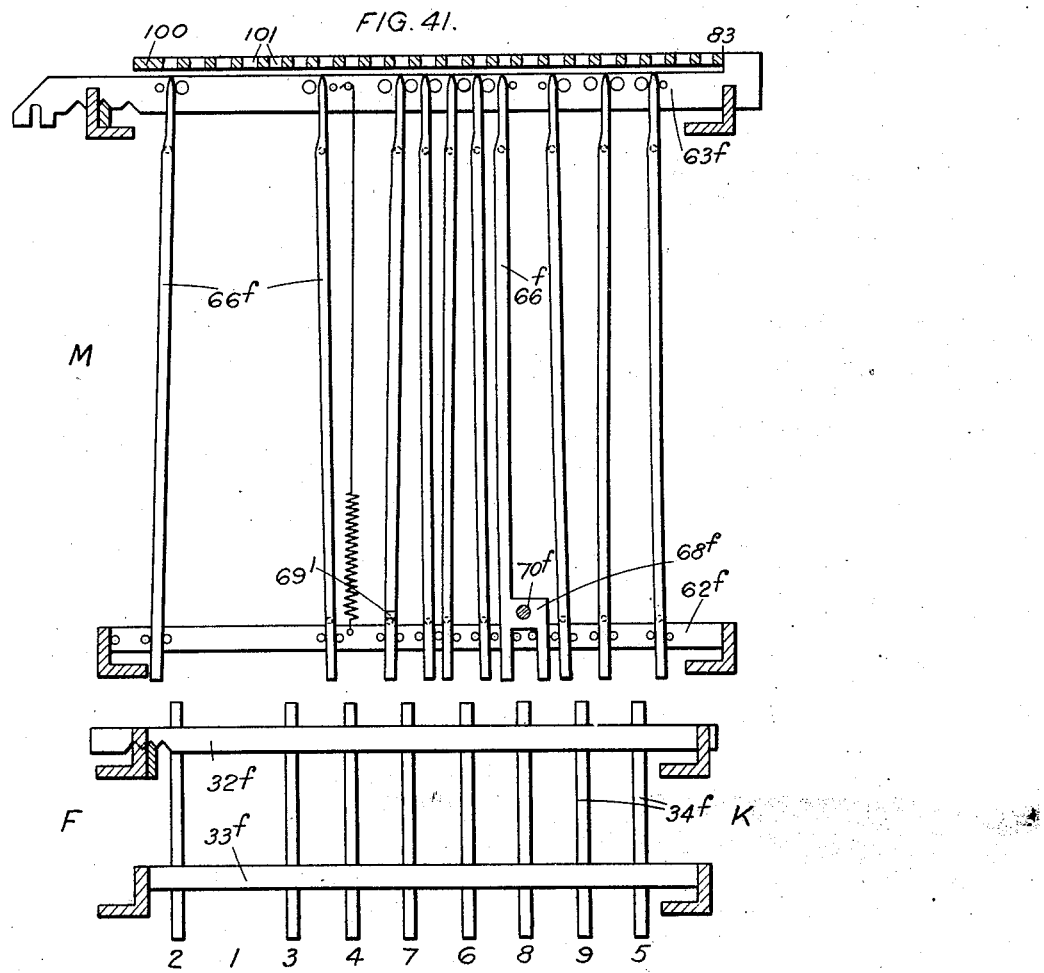
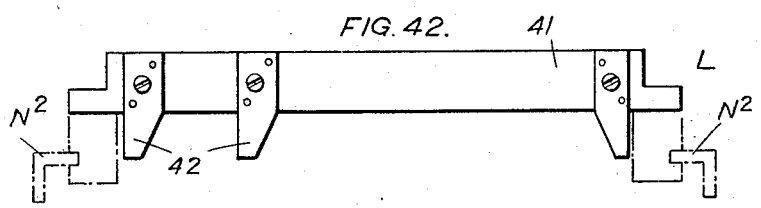

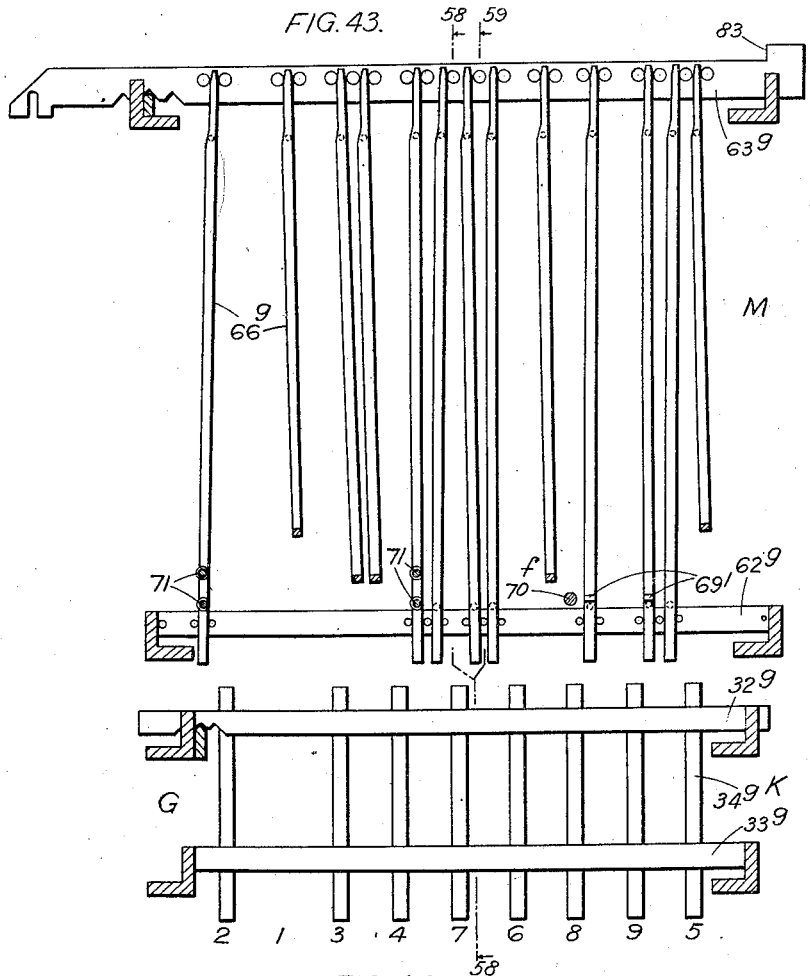
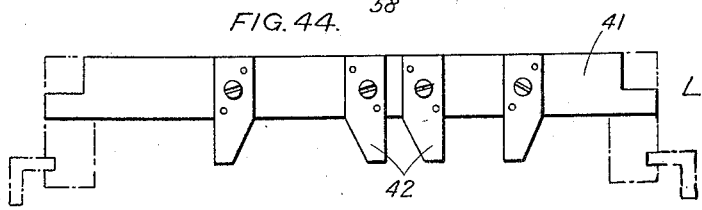

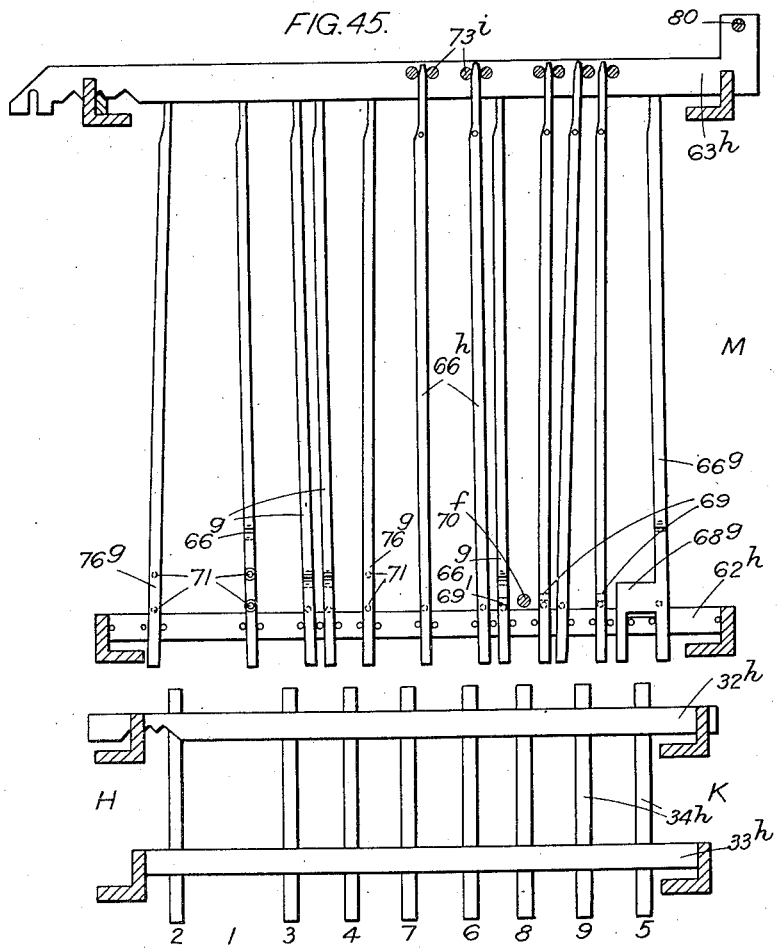
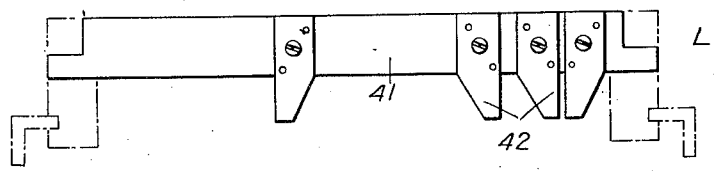

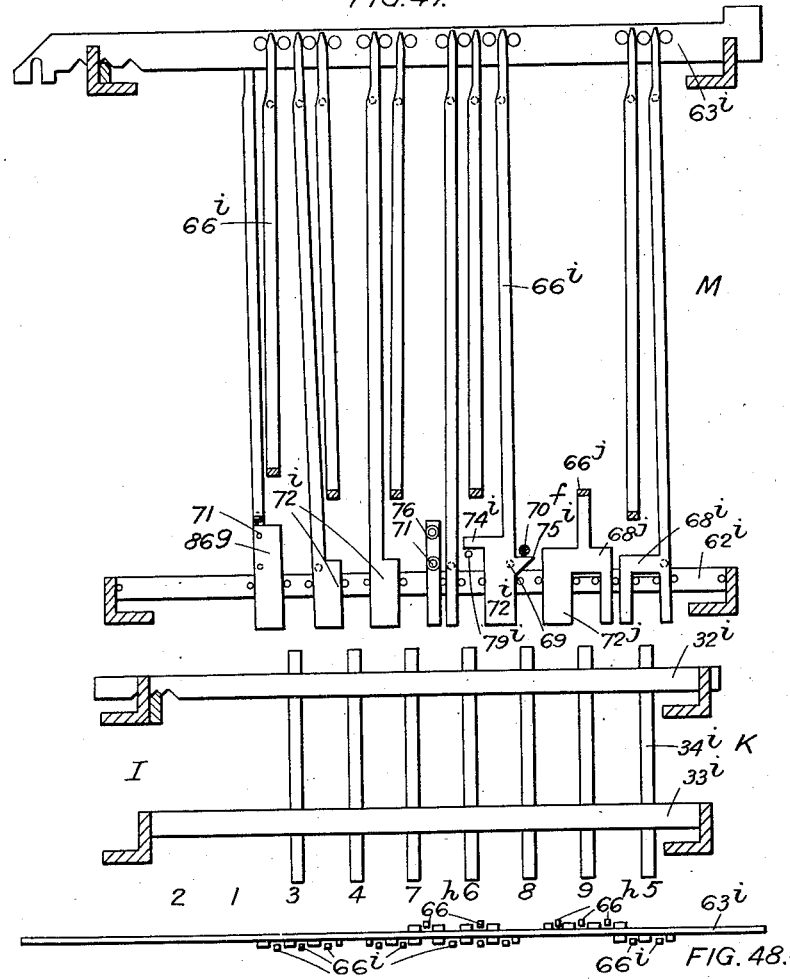
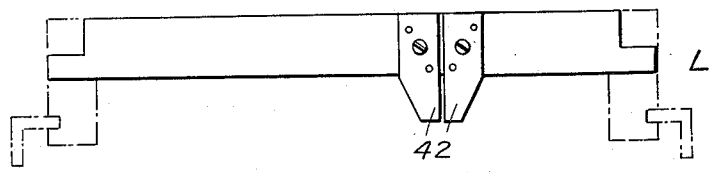

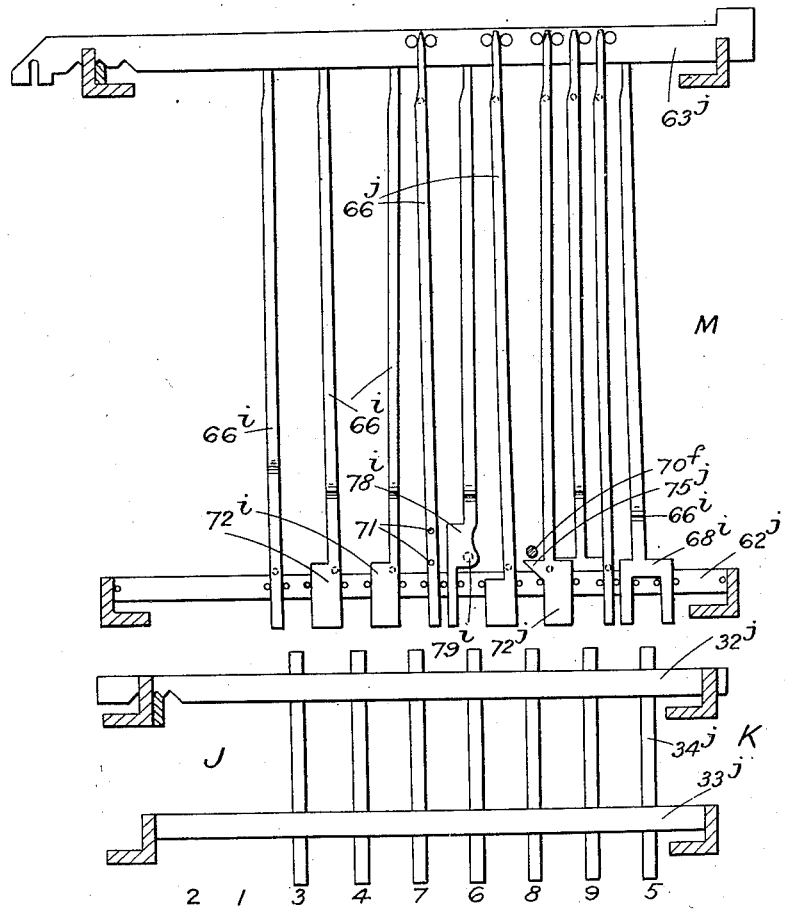
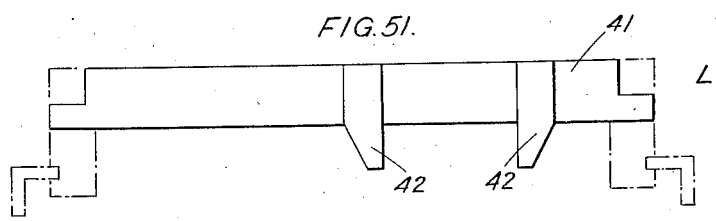

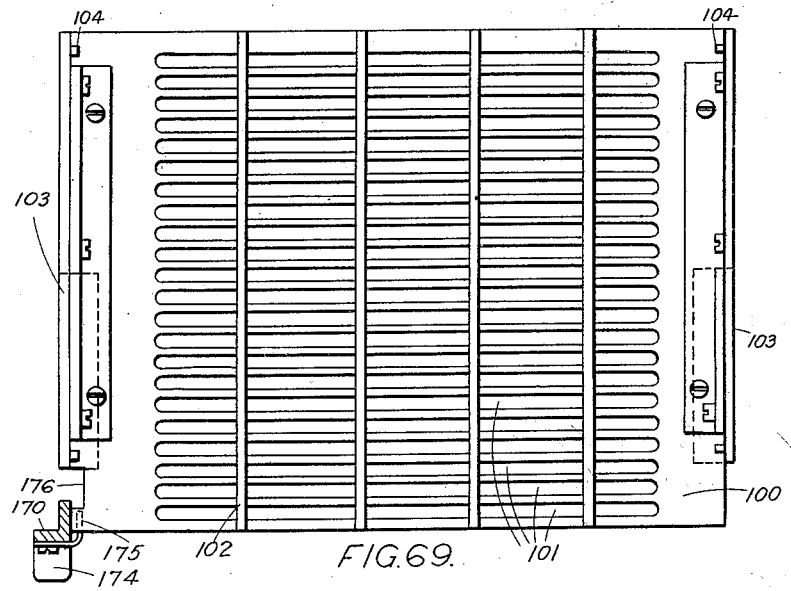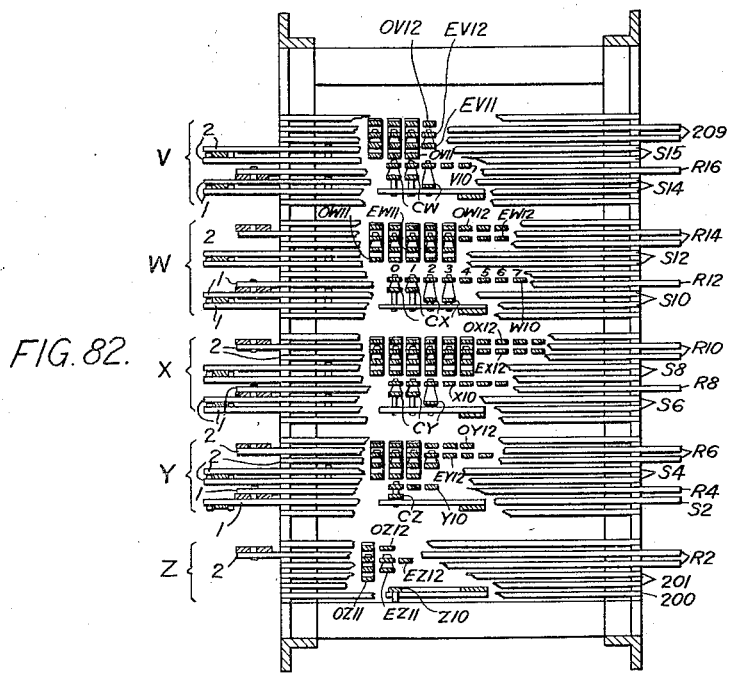

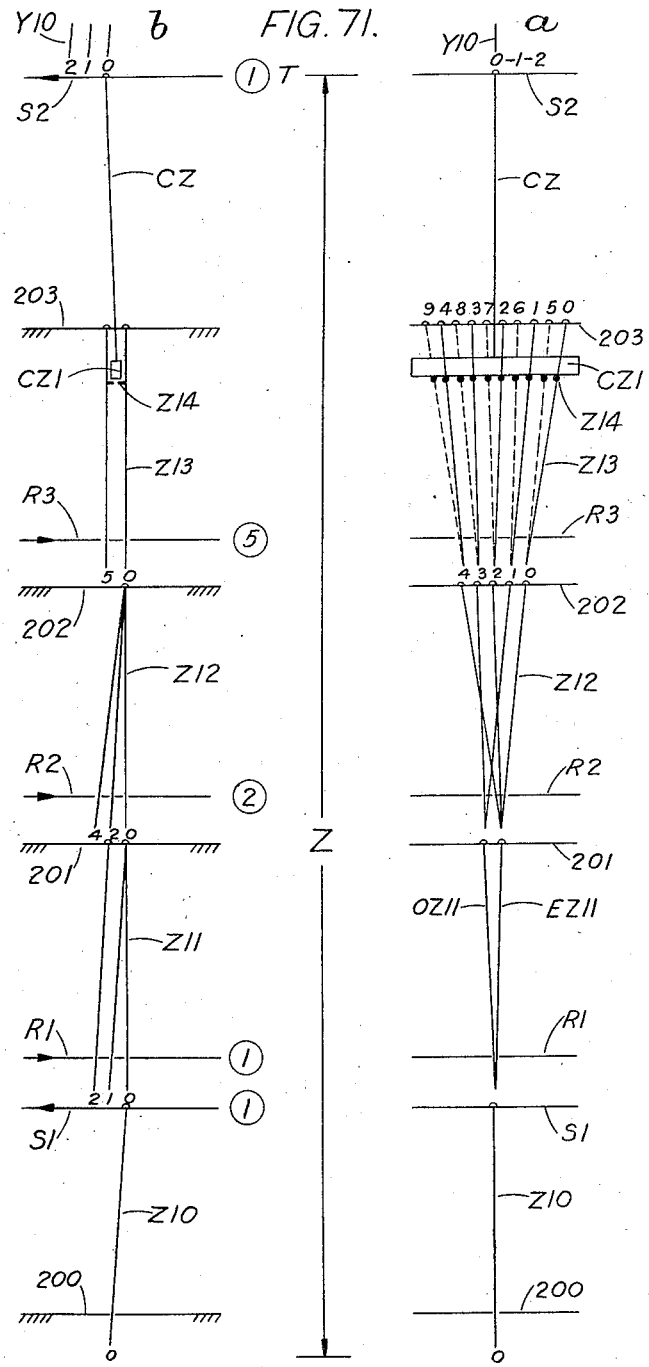

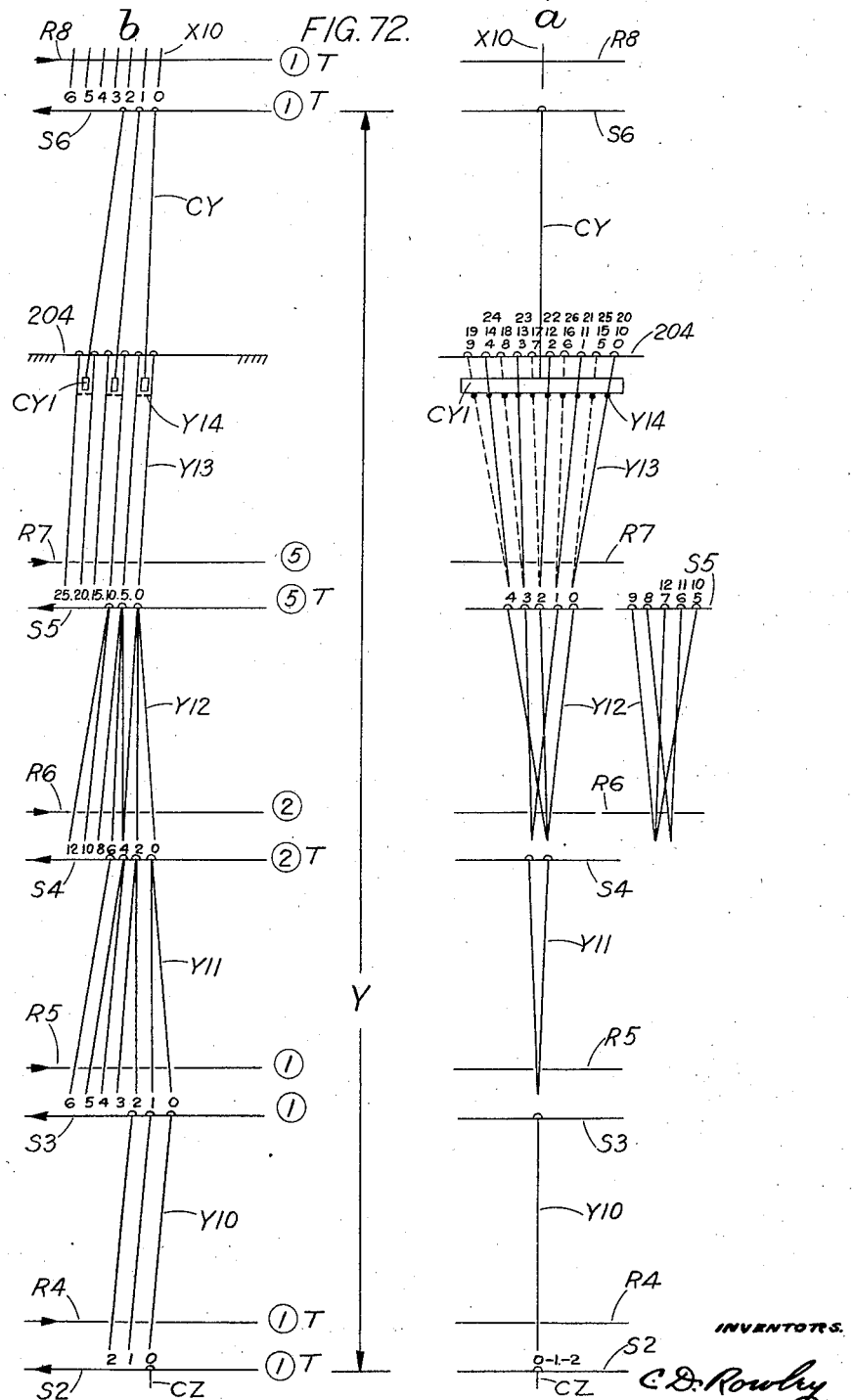

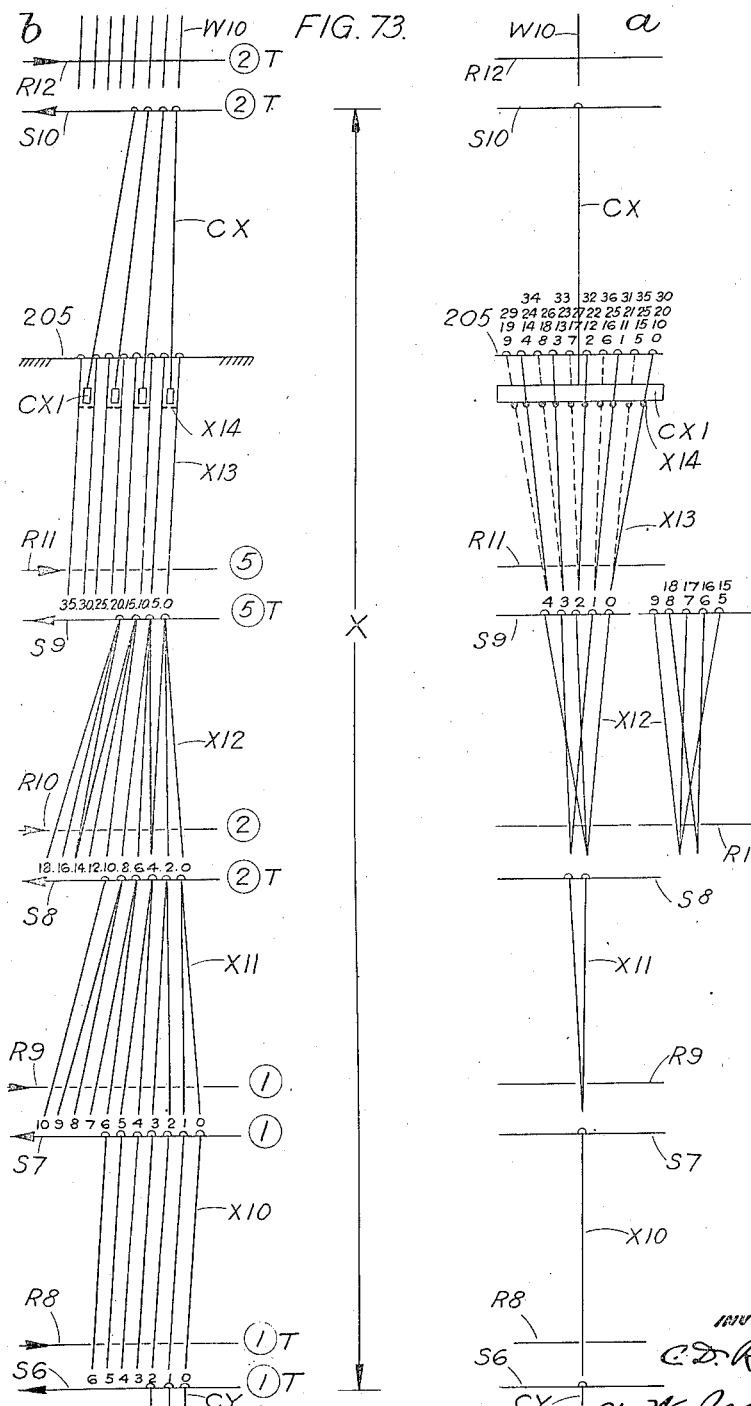

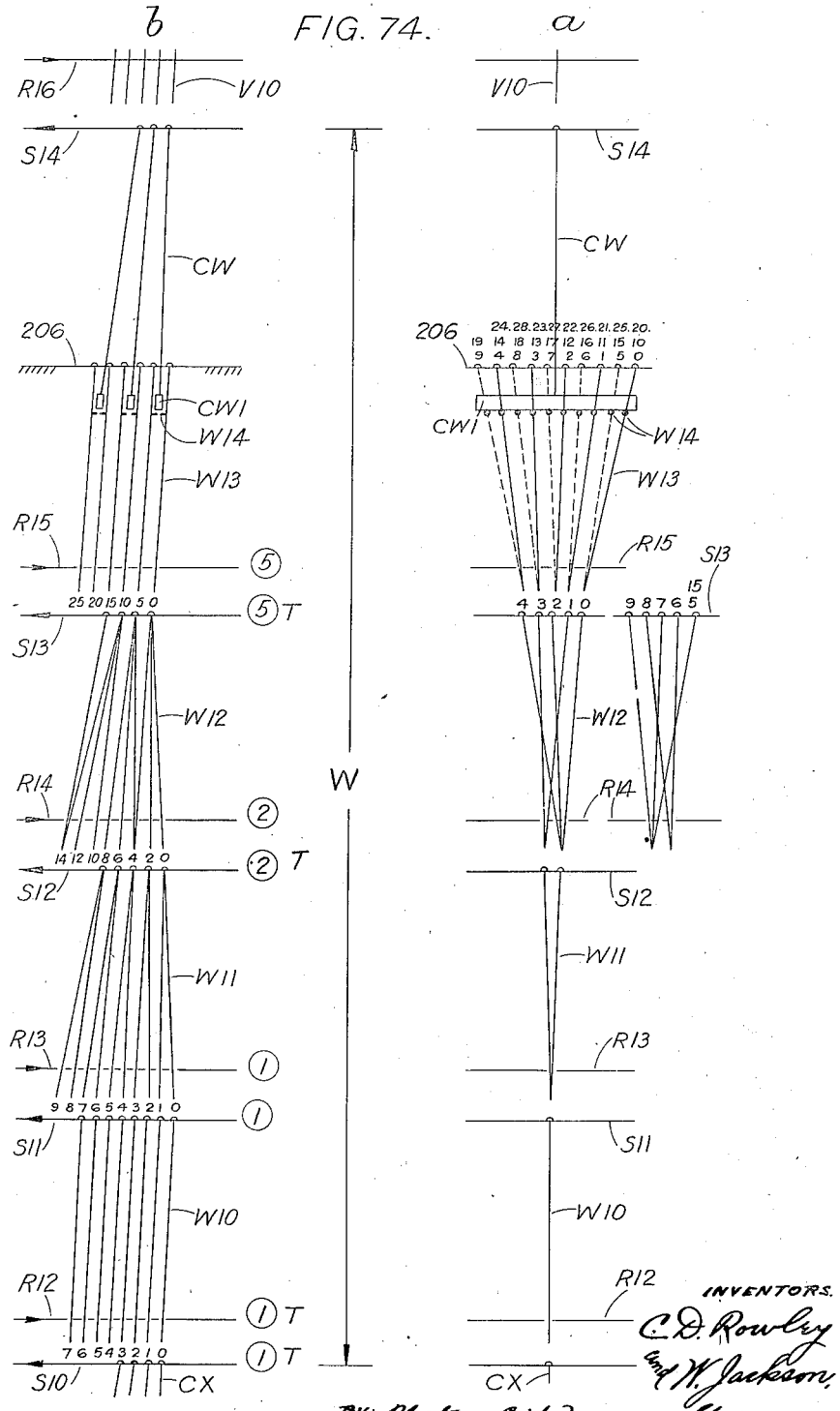

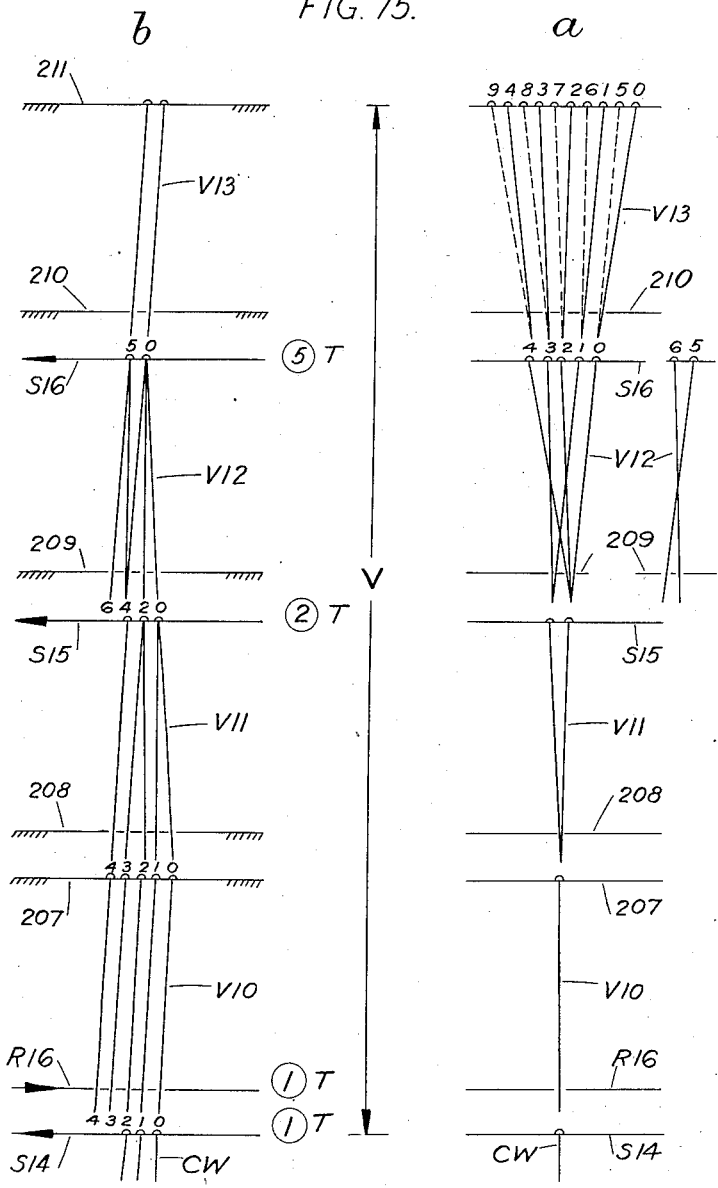

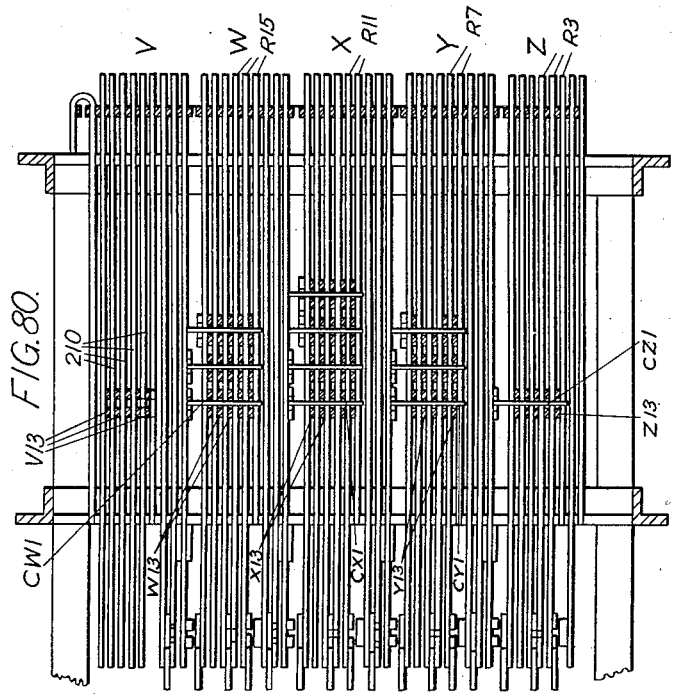
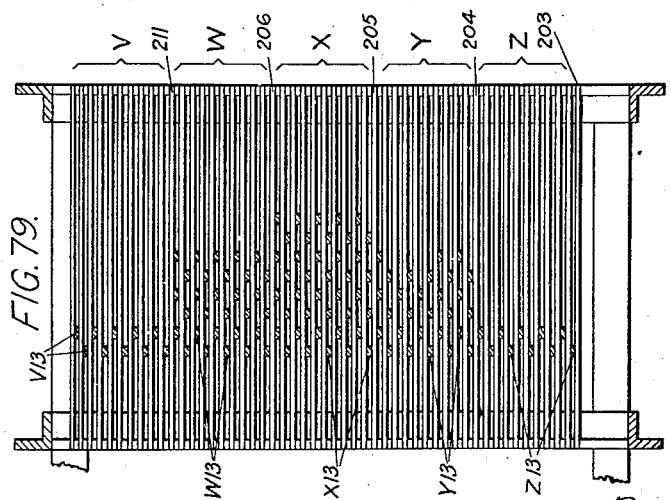

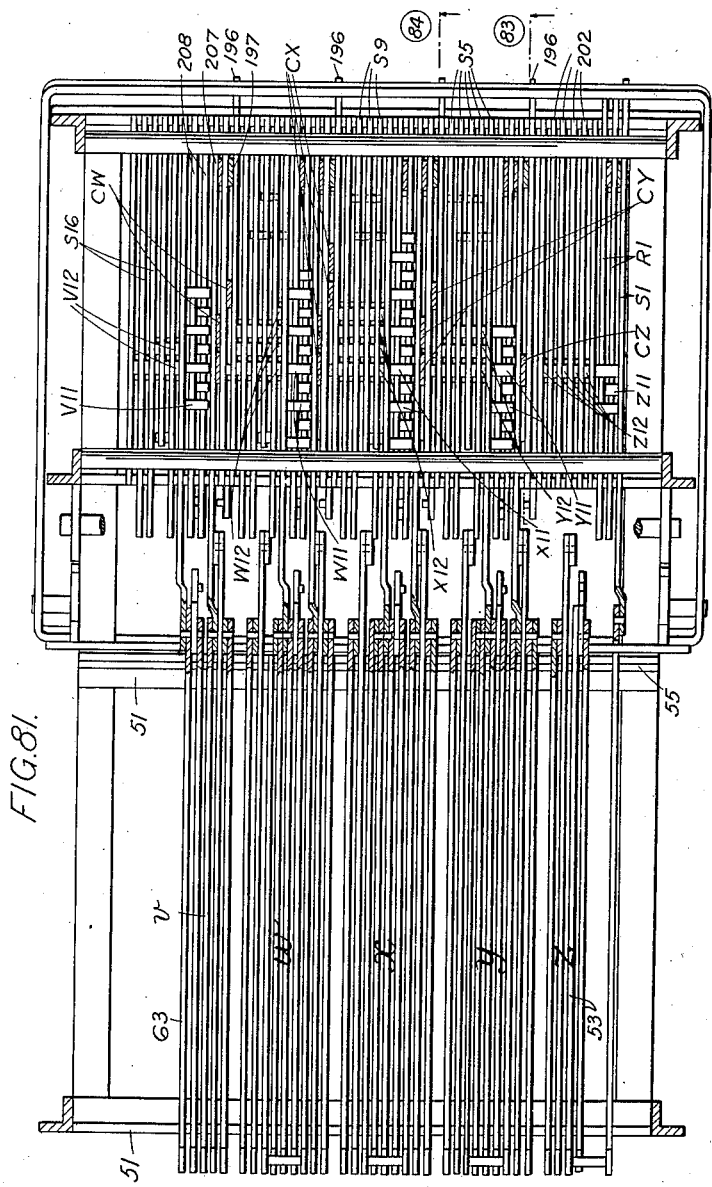

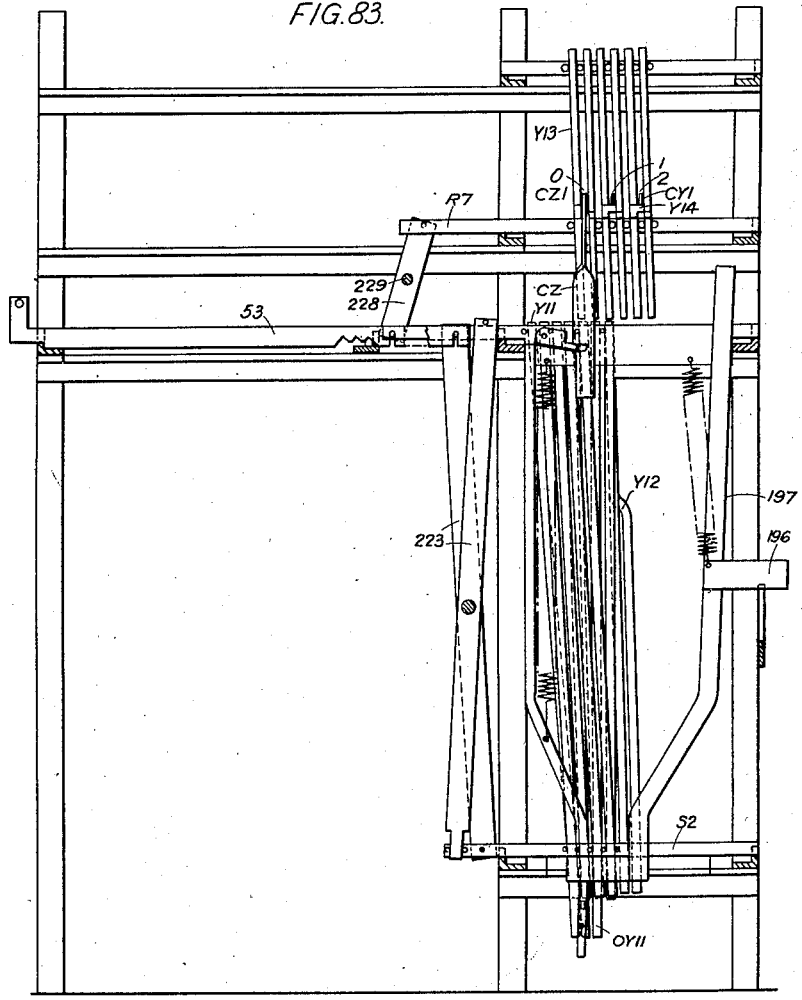

April 1, 1930.  C. D. ROWLEY ET AL  1,753,093
CALCULATING MACHINE
Filed July 9, 1925   35 Sheets-Sheet 34
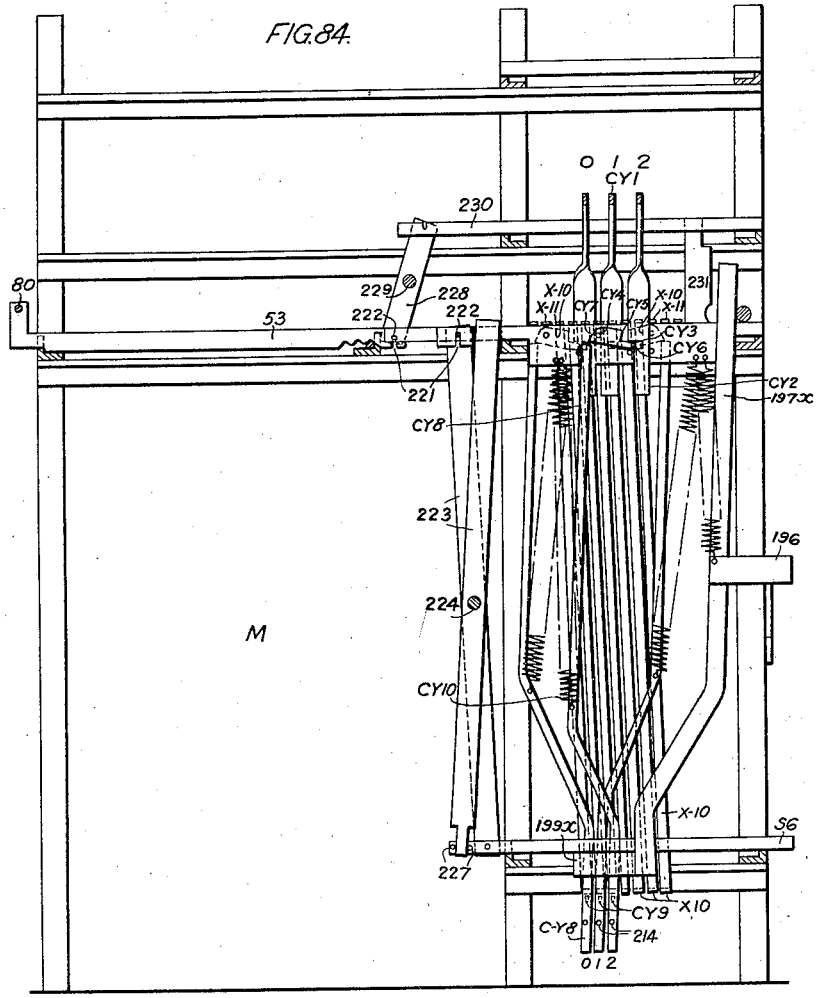

April 1, 1930.　　　C. D. ROWLEY ET AL　　　1,753,093
CALCULATING MACHINE
Filed July 9, 1925　　　35 Sheets-Sheet 35
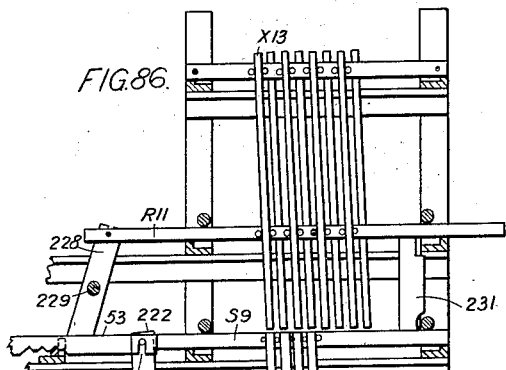
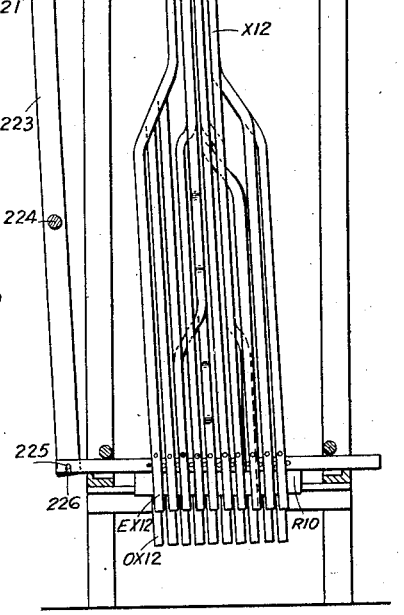
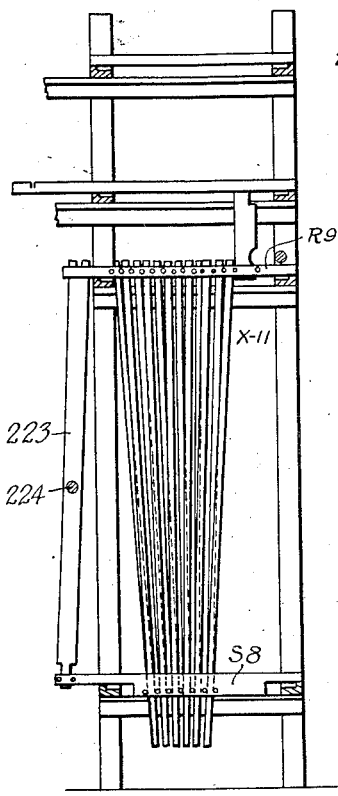

Patented Apr. 1, 1930

1,753,093

UNITED STATES PATENT OFFICE

CHARLES DONOVAN ROWLEY, OF LONDON, AND WILLIAM JACKSON, OF BRIGHTON, ENGLAND, ASSIGNORS TO THE AUTOKAL SYNDICATE LIMITED, OF LONDON, W. 1., ENGLAND, A BRITISH COMPANY

CALCULATING MACHINE

Application filed July 9, 1925, Serial No. 42,608, and in Great Britain July 28, 1923, and July 17, 1924.

This invention relates to calculating machines and has more particularly for its object to provide apparatus by means of which multiplication can be carried out.

The performance of this arithmetical operation involves effecting a change of position in sets of rod-like members and subsequently transmitting impulses through the relatively positioned members after the manner described in the specification of the present applicants' prior application for Letters Patent of the United States of America, Serial No. 727,564. The present invention relates to a construction and arrangement of apparatus in which this earlier invention is embodied.

According to this invention a machine in which multiplication is performed by effecting a change of position in sets of rod-like members, as by swinging the members, and by transmitting impulses through these members, as by sliding them, comprises in combination a series of sets of rod-like members, a series of sets of indicating transmitting members disposed above the rod sets and with which the upper ends of the rod-like members can be caused to register, means for traversing the rod sets so that they can be located either where they will be clear of the indicating member sets or where they will be below and capable of registering with and transmitting impulses to the indicating member sets, means whereby when the rod sets are located clear of the indicating member sets selected rod sets can be swung, and means whereby when the rod sets are subsequently located below the indicating member sets impulses can be transmitted to indicating members through rods which have been swung and thereby positioned so as to register with indicating members. In the machine there are a series of sets of individually movable members the sets being disposed side by side and all the members in a set having the same numerical value while the values assigned respectively to the several sets are such that either separately or by combination thereof any answer value from 1 to 9 may be mechanically presented and if necessary transmitted by movement of members in one or more of the sets. A series of sets of rod-like members are arranged so that these sets are disposed side by side while the rods can slide individually and be swung collectively in sets the upper ends of these rods when swung being adapted to register with the said answer-presenting members. Key-actuated mechanism is provided whereby rods can be selected from the sets and caused to slide. By suitable means, preferably comprising sets of cams or like devices, a selective swinging of rod sets can be effected and determined by the number value of the first factor in the sum to be performed so that when subsequently the actuation of a key corresponding to the number value of the second factor in the sum causes rods to slide, movement will be imparted thereby to one or more answer-presenting members whose separate or collective numerical value represents the product or partial product of the sum performed.

Throughout the specification the word "sum" is commonly used as synonymous with the word "problem" as distinguished from the more specific definition in which the word "sum" describes the result obtained by the arithmetical process of addition.

The calculating machine comprises two main portions in one of which the main part of the multiplication sum is performed by the feeding in of two factors, the feeding in of the first factor bringing about a change of position in sets of rod-like members while the feeding in of the second factor causes the transmission of impulses through the relatively positioned rod-like members, the resultant mechanical representations of partial products being operative in the second part of the apparatus to effect changes of position, corresponding to the partial products, in other sets of rod-like members. These partial products are then added together in the second portion of the mechanism and the answer to the multiplication sum is presented by the automatic transmission of an impulse through the relatively positioned rod-like members in that portion of the apparatus. Thus the machine can be operated and the desired answer obtained merely by the actuation of the keys by means of which the factors are fed into the apparatus this feeding in of the two factors being effected by the successive operation of a single set of key-actuated members. In the multiplying portion of the apparatus there are sets of rod-like members on which the actuating members can operate so as to cause impulses to be transmitted through them while other sets of rod-like members are disposed above the first named sets. Means are provided whereby the first named rod sets are traversed so that they can be located either where they will be clear of the upper rod sets or where they will be below and capable of transmitting impulses to and through the upper rod sets. Means are provided also whereby when the first named rod sets are located clear of the rods in the upper sets the lower rod sets can be positioned by swinging as a result of the transmission of impulses through selected rods in these sets. A single set of actuating members is always operative on and capable of selecting and causing impulses to be transmitted through the rod-like members in the lower sets irrespective of their location relatively to the upper rod sets. In the second or adding portion of the apparatus there are other sets of rod-like members adapted to be positioned and have impulses transmitted through them, the position of these sets of rod-like members being effected by movements derived from or determined by mechanical representations of partial products resulting from the transmission of impulses through the relatively positioned upper and lower sets of rod-like members in the multiplying portion of the apparatus, the transmission of impulses through the relatively positioned sets of rod-like members in the adding portion of the mechanism causing the partial products to be added together and the answers to be presented.

The apparatus comprises a series of sets of rod-like members on the lower ends of which actuating members can operate so as to cause impulses to be transmitted through the rod-like members, and a second or upper series of rod-like members with the lower ends of which the upper ends of the rods in the first or lower rod sets can be caused to register, the upper ends of the rods in the second series serving to present or effect the transmission of answers as partial products. Means are provided for traversing the whole of the first series of rod sets so that they can be located either where they will be inoperative on the second series of rod sets or located where the upper ends of the rods in the first series can be caused to register with and transmit impulses to and through the rods in the second series. When the rods in the first series are located where they are inoperative on the second series of rod sets, the transmission of impulses through the first or lower rods will bring about by suitable means a positioning of selected rod sets by swinging them, subsequent traversing of the first series of rod sets then locating them where they can be operative on the second or upper series of rod sets. A single set of actuating members are always operative on and capable of selecting and causing impulses to be transmitted through the rod-like members in the lower sets irrespective of the location of these first or lower rod sets relatively to the second or upper rod sets, so that the same actuating members serve to effect both the relative positioning of and the transmission of answer-giving impulses through the rod sets. The rod-like members are conveniently arranged so that they can slide in the direction of their length, this sliding being brought about by operation of the actuating members which raise and thereby transmit impulses through the rod-like members. The swinging of the rods in the first or lower series may be brought about by a set of cams with which the upper ends of the rod-like members when raised can engage, such engagement causing one or more selected sets of rods to swing and thus be positioned in accordance with a determined value. The first or lower series of rod sets are located initially where their upper ends can engage the cams and the series of rod sets are then traversed so as to locate them where their upper ends can be caused to register with and by sliding transmit impulses to and through the rods in the upper sets. To effect this traversing the first or lower series of rod sets are conveniently all mounted in a carriage which is traversed, for example, by spring action, the traversing being controlled and the desired location effected by an escapement of suitable construction. The second or upper series of sets of sliding rod-like members as a whole occupy a fixed position above the first series of rod sets and the upper ends of the rods in the second series serve or are operative to present or transmit answers, preferably as partial products or to bring about answer producing effects.

The cams are disposed above the first or lower series of rod sets and to one side of the second or upper series of rod sets so that the carriage on which are mounted the first series of rod sets can be traversed horizontally below the cams and the second series of rod sets. A single set of key-actuated members which are always operative on the rods in the first sets mounted on the carriage serve to effect a selection and cause sliding of the rods in these sets irrespective of the location of the carriage due to traversing thereof. If one or more keys are successively actuated when the carriage is located beneath the cams, sliding of the corresponding rods in the carriage will by the action of the cams cause a selected set or sets of rods to swing and thus be positioned in accordance with a value determined by each key which has been operated. The carriage is then traversed automatically and located beneath the second series of rod sets and there will now be registration between the upper ends of certain of the rods in the carriage and the lower ends of certain rods in the second series as a result of the selective positioning by the action of the cam or cams of the rods in the first series. If now a key-actuated member is operated, the resultant sliding of the corresponding rods in the carriage will cause impulses to be transmitted by sliding through such first series rods as are in registration with the rods in the second series. Thus the rods in the first or lower series of rod sets even if caused to slide by key actuation are not operative to transmit impulses to and through the second or upper rod-like members unless and until the rods in the first series have been positioned by lateral swinging, such swinging constituting a feeding into the machine of one of the factors in a multiplication sum which is to be performed by the machine. The second factor is then fed in by the impulse that can then be transmitted through both the first and second series of rod sets when a selected key-actuating member is operated.

The transmission of an impulse or impulses through the first and second series of rod-like members which takes place when the second factor is fed into the machine causes the ends of selected rods which represent partial products to project from the upper part of the multiplying portion of the machine and these projecting parts engage or can be engaged by a member which can move transversely to the direction in which slide the rod-like members, this transverse movement being caused by spring action or other convenient means. The movement of this transverse member is controlled by an escapement which is released as and when the key-actuated mechanism completes the movement necessary to feed in the second factor and has thereby transmitted an impulse or impulses through the relatively positioned first and second series of rod-like members. When this member is thus released and moves transversely, it carries with it and swings those rod-like members whose ends have been caught and engaged by the transversely moving member. The swinging of these selected rods moves transversely sliding bars connected to or associated with these rods, and the bars in turn impart swinging movements to correspondingly selected sets of rods in the adding portion of the mechanism, thereby effecting a relative positioning of these rod sets in the adding mechanism in accordance with the partial products which have to be added together to produce the desired answer. Following this positioning by swinging of rods in the adding portion of the mechanism, the carriage in the multiplying part of the mechanism completes its traversing movement and, in doing so, releases a catch retaining a master rod in the adding portion of the mechanism. This master rod is acted on by a spring tending to cause it or mechanism controlled thereby to slide upwards and as soon as this master rod is released, an impulse constituted by a general upward movement, which may be described as a ripple, is transmitted or passes through the rods in the adding portion of the mechanism, with the result that the relatively positioned and selected rods in this part of the mechanism slide and as they rise cause figures which indicate the answer of the sum which has been performed to be brought into view. Such parts of the whole apparatus as have not already been reset by gravity are then reset by returning the carriage in the multiplying portion of the apparatus to its starting place beneath the rod positioning cams or by actuation of a resetting key or member.

The improved machine may be constructed and arranged in various ways but the following may be instanced as an example of a construction that may be adopted for a calculating machine adapted to enable any number up to 99 to be multiplied by any number up to 999. By suitable modification in the detail construction and by the provision of further groups of sets of rods and other cooperating parts, the capacity of the machine may be increased if desired.

It may be noted that if certain sets of members are assigned respectively the number values 1, 1, 2, 5, it is possible by selection of these sets to give by means of these members indications of or transmit movements corresponding to any unit number from 1 to 9. Thus the number 3 which may be a partial product may be represented by members from a 1 set and from the 2 set, similarly the number 7 may be represented by members from the 2 and from the 5 sets or again the number 9 may be represented by members from each of the 1 sets, from the 2 set and from the 5 set. In this way, by assigning number values from 1 to 9 to individual members through which movements can be imparted to the sets having the 1, 1, 2, 5 values, as and when a selective action has been exerted on these movement-imparting or impulse-transmitting members, it is possible to bring about a mechanical representation of any desired partial product number which mechanical representation can be utilized to actuate mechanism wherein such partial products can be added together in order to produce the final answer.

In the specification of the present applicants' above mentioned application for Letters Patent of the United States of America, Serial No. 727,564, there is described more particularly with reference to Figures 6, 7 and 8 of the drawings appended to that specification, means whereby the multiplication may be performed of any number from 1 to 9 by any number from 1 to 9. In the mechanism there shown diagrammatically, it was assumed that two sets of keys might be employed but it will be apparent that if the mechanism or a part of the mechanism by means of which the impulses are transmitted from the keys can be traversed it becomes possible to employ a single set of keys which when first actuated for the purpose of feeding in the first factor will effect a selective swinging of the rod-like members and then after traversing the said mechanism when the keys are again operated to feed in the second factor in the sum to be performed, an impulse will be transmitted and an answer-presenting member will be moved.

Further, the members through which the impulses are to be transmitted may be arranged so that all those members, preferably of rod-like form, which are adapted to be swung are arranged in sets, these sets being disposed side by side while above these sets are arranged sets of answer-presenting members to which the impulses can be transmitted after the sets of rod-like members have been positioned by swinging. In this arrangement the individual rods in each set are assigned as to their lower ends separate and different number values while the sets of rod-like members are assigned respectively the number values 1, 1, 2, 5. The sets of answer-presenting members, which are also disposed side by side and above the sets of rod-like members, are likewise given the number values 1, 1, 2, 5. The selective swinging of the rod-like members is then effected on the basis of 1, 1, 2, 5 values by means which causes this selective swinging to take place when a key is operated for the purpose of feeding in the first factor in the sum to be performed. The rod-like members which have thus been positioned by swinging will be capable of transmitting impulses to the answer presenting members as and when a key is again operated to feed in the second factor in the sum to be performed. If now the sets of rod-like members are mounted so that they can be traversed and positioned where they will be clear of the answer-presenting members, it becomes possible, as the result of key actuation, to cause the transmission of impulses through the rod-like members to bring about the positioning by swinging of the sets of rod-like members. Subsequently when the sets of rod-like members are traversed so as to be located beneath and where they can register with the answer-presenting members impulses can be transmitted to these answer-presenting members when a key is again actuated, the same set of keys being always operative on the sets of rod-like members irrespective of their location.

Turning now to the performance of specific sums, if two single figure numbers are to be multiplied together, the sum may be set out in the following way:—

I.
$$\begin{array}{r} 9 \\ 9 \\ \hline 8\ 1 \\ \hline y\ z \end{array}$$

If a key is actuated to feed in the first factor 9, it will effect a corresponding selective swinging of sets of rod-like members. These rod-like members are then traversed so that they become located beneath the sets of answer-presenting members. Now the sets of rod-like members are divided into two main groups one group functioning with respect to units, while the second group will function with respect to tens. Each of these main groups is divided into two sub-groups which function respectively for tens and units. Since the first factor here contains only a unit figure, the unit main group of sets of rod-like members will alone be operative. Hence the selective swinging brought about by the key operation which feeds in the first factor 9 will have swung rod sets in the unit sub-group and also rod sets in the tens sub-group, both being in the units main group. The sets of answer-presenting members are also divided into main groups respectively functioning for units, tens, hundreds and for higher denominations as required, each main group being divided into sub-groups respectively for tens and units. In the sum set out above, when the sets of rod-like members are located beneath the answer-presenting members, the units sub-group of rod sets will be positioned where they can register with a units sub-group of answer-presenting members while the tens sub-group of rod sets will be positioned where they can register with a tens sub-group of answer-presenting members. When now a key is operated to feed in the second factor 9, movement will be imparted through a rod in the units sub-group which will register with an answer-presenting member in a set of those members with 1 value. At the same time rods in the tens sub-group will impart movement to answer-presenting members in sets of those members with respective set values 1, 2 and 5. Thus the answer-presenting members will give a product indication for the sum which may be set out in the following way:—

```
II.         9
            9
           ——
         1  1
         2  0
         5  0
           ——
         8  1
           ——
         y  z
```

The answer will thus be indicated in the form of two partial products, that in the case of the tens being split into 10, 20 and 50. These partial products can then be added together so as to produce the final answer.

The several columns in the final answer are for convenience designated above by the letters z, representing the units column, and y the tens column and the columns of higher denominations will be hereafter designated by the letters x, for the hundreds column, w for the thousands column and v for the ten thousands column.

If now it is desired to multiply a two figure number, that is, a number containing a ten and a unit, by a single figure number which comprises a unit only, the sum may be set out in the following way:—

```
III.        9  9
               9
              ——
            8  1
         8  1  0
         ——————
         8  9  1
         ——————
         x  y  z
```

When feeding in these factors by actuation of keys the latter will be struck with respect to the figures in the factors in the order in which these figures would be written down, that is to say, taking the first factor 99, a key will be struck first for the 9 in the tens and then again for the 9 in the units. When the first key is struck, it will effect a selective swinging of the main group of sets of rod-like members which function with respect to tens and then when the key is struck for the unit figure there will result a selective swinging of the sets of rod-like members in the main group which functions with respect to units. The rod sets will then be traversed so as to locate them beneath the main groups of sets of answer-presenting members and when a key is actuated to feed in the second factor 9 in the sum to be performed, rods will register with such answer-presenting members in the units, tens and hundreds groups of the latter that the collective values of the partial products indicated will make up the required total of the answer. These product indications will be effected in the same way as shown in the sum II set out above, but in the case of the sum III in the y column there will be indicated an additional 1 to make up the total 9 which is required. In the x column the required total of 8 will be made up by 1, 2 and 5 as shown in the sum II above.

To elucidate a further point in the operation of the apparatus it is desirable to consider also the following sum wherein a single figure number, which comprises a unit only is multiplied by a two figure number containing a ten and a unit. This sum may be set out thus:—

```
IV.         9
         9  9
         ——
         8  1  0
            8  1
         ——————
         8  9  1
         ——————
         x  y  z
```

When feeding in these factors by actuation of the keys the latter will be struck to feed in first the single figure factor 9. This will effect a selective swinging in the main group of sets of rod-like members which function with respect to units, no selective swinging being required in respect of the main group of sets of rod-like members which function in respect of tens. The rod sets will then be traversed so as to locate them beneath the main groups of sets of answer-presenting members and a key is then actuated to feed in the first figure that is, the tens figure 9, in the second factor in the sum to be performed. At this stage, such rods on the carriage will be positioned to register with answer-presenting members as to cause an indication of collective values of partial products making up a total of 810, the 8 appearing in the hundreds or x group of answer-presenting members and the 1 appearing in the tens or y group of answer-presenting members. This product indication can then be stored for final addition to obtain the total answer. The rod sets are then traversed a further stage with respect to the answer-presenting members and a key is struck with respect to the second figure, that is the unit 9, in the second factor in the sum. This will result in collective values of partial products being indicated, namely 8 in the tens or y group and 1 in the units or z group. This product of 81 can then be added to the previously obtained product of 810 and the final answer obtained.

Following the procedure which has been indicated, it will be seen that the mechanism can be arranged to deal with larger figures as for example the multiplying of a two figure number by a three figure number. Such a sum may be set out in the following way:—

```
V.        9 9
            9 9 9
          -------
          8 1 0 0
        8 1 0 0 0
            8 1 0
          8 1 0 0
              8 1
            8 1 0
          ---------
          9 8 9 0 1 v w x y z
```

The capacity of the machine more particularly described hereafter is such that it is capable of multiplying any number from 1 to 99 by any number from 1 to 999, hence the limiting sum which can be performed in the machine is the sum IV set out above.

It will be convenient now to refer to Figure 1 of the appended drawings which comprises a series of diagrams illustrative of the successive location of the rod sets with respect to the sets of answer-presenting members and to mechanism by means of which the selective positioning of the rod sets by swinging is effected. This mechanism in the preferred construction of the apparatus comprises a series of sets of cams with which the upper ends of the rods in the sets can respectively make contact when these rods are raised by the actuation of a key. When a rod is thus raised and its end makes contact with a cam the set of rods of which the rod that has been raised constitutes one will be swung either to the right or to the left. These swinging movements take place actually in planes at right angles to the plane of the paper in respect to the diagrams in Figure 1 which indicate the positions of parts of the mechanism when viewed from the front of the apparatus.

Referring to the diagrams in Figure 1, the rod sets are mounted on a carriage K which can be traversed from left to right by suitable means under the control of an escapement. The diagrams illustrate the successive positions occupied by this carriage as it is traversed. The sets of cams are mounted on a carriage L which can also be traversed from left to right by suitable means under the control of an escapement, this cam carriage in the machine more particularly hereinafter described being capable of occupying two successive positions as indicated in the diagrams. To the right of the cam carriage and substantially in line with its path are disposed as at M the groups of sets of answer-presenting members beneath which the carriage K can be located in successive positions.

The grouping of the sets of answer-presenting members is in accordance with the various demonstrations and the capacity of the machine. It will be noted that a double system of grouping is indicated in each diagram by short vertical lines one grouping system being above and the other below the horizontal line. In what may be termed the upper grouping system the main groups are designated by the letters $v, w, x, y$ and $z$, these groups corresponding to the columns in the sums set out above and indicating the groups of answer-presenting members which function respectively for tens of thousands, thousands, hundreds, tens and units. Each of these main groups $v, w, x, y$ and $z$ is subdivided by a short vertical line into two subgroups. In the lower grouping system the main groups separated by longer vertical lines are designated by the letters $w', x', y'$ and $z'$ each group including one sub-group from each of two of the adjacent upper main groups. Thus the group $w'$ includes the right-hand sub-group in the $v$ main group and the left-hand sub-group in the $w$ main group, the $x'$ group similarly comprising one sub-group from the $w$ main group and one sub-group from the $x$ main group and so on. The lower main groups are each sub-divided by short vertical lines into two sub-groups respectively designated 10 for the tens and $u$ for the units. This double grouping is adopted in this diagram to indicate first by the letters $w', x', y'$ and $z'$ and their sub-groups the manner in which the partial products pass from the carriage K into the answer-presenting or product-indicating members in the part M of the apparatus, while secondly the upper grouping system indicates by the letters $v, w, x, y$ and $z$ with their sub-groups the manner in which these partial products are collected and passed from the portion M of the apparatus into the adding part of the apparatus for totalizing and the production of the final answer.

This grouping will be appreciated by reference to the sums set out above. In these sums the several columns, as mentioned, are designated by letters which are the same as those adopted to designate the upper groups in the diagrams in Figure 1, these groups in effect corresponding to the columns indicated by the letters $v, w, x, y, z$ in the sums. By referring more particularly to the sum IV and taking for example the multiplication of the single figure first factor 9 by the second or unit figure 9 in the second factor, it may be considered that the product comprises 8 in the tens of units and 1 in the units of units, but for totalizing purposes 8 must of course fall into the tens column $y$. Taking next the product of the first single figure factor with the tens figure in the second factor, the product 810 consists of 8, which may be regarded as representing tens of tens, and 1, units of tens, but for totalizing, the 8 naturally goes into the $x$ or hundreds column and the 1 into the tens column $y$ for addition to the 8 which is also in the tens column $y$. Reading the sum IV in this light into the diagrams in Figure 1, it will be seen that taking the product of the two unit figure factors, in other words, the product of the sum II set out above, the 81 may be considered as passing as to 8 into the $10z'$ subgroup, while the 1 passes into the unit sub-group $u$ of the main group $z'$, but for totalizing purposes in the groups above the horizontal line in the diagram, the 1 must lie in the unit main group $z$ while the 8 must fall in the tens main group $y$. With respect to the product of the single figure first factor with the tens number in the second two-figure factor in the sum IV, namely 810, the 8 being in the tens of tens passes into the $10y'$ sub-group, while the 1 being a unit of tens goes into the sub-group $u$ of the main group $y'$. Above the horizontal line, however, the 1 falls naturally into the tens or $y$ main group and is dealt with for totalizing purposes in conjunction with the 8 that has passed into the other sub-group of the $y$ or tens main group. In the meantime, the 8 has passed into the $x$ or hundreds main group for totalizing purposes.

The rod sets on the carriage are divided into two main groups, that to the left marked 10, functioning for tens while that to the right, marked U, functions for units. Each of these main groups is divided into two sub-groups the left sub-group marked 10, in each case functioning for tens, while the right sub-group, marked $u$, in each case functions for units. The cam sets are also divided into two groups which correspond to the sub-groups of the rod sets on the carriage. That is to say, there is one group of cam sets, marked 10, for the tens and another, marked $u$, for units both adapted to function in conjunction with either the tens main group of rod sets on the carriage or with the units main group of those rod sets.

It will be understood that the feeding of the factors into the machine which is under consideration is effected by a single set of keys which when operated actuate mechanism by means of which impulses can be imparted to the rods in the sets on the carriage K by causing these rods to slide in the direction of their length, that is to say upwards, and this single set of keys will act thus on these rods irrespective of the position of the carriage in the path along which it is traversed.

The diagram $a$ in Figure 1 represents the positions of the cam carriage L and the rod carriage K respectively at the commencement of the operations. When employing the mechanism to perform the sum V mentioned above, the keys are operated with respect to the several figures in the factors in the order in which these figures would be written down in setting out the sum. When the key corresponding to the first or tens figure in the first factor is struck, there results a selective swinging of rods in the tens main group of rod sets on the carriage K owing to the rods that have been raised making contact with the cams on the carriage L. On release of this key, the escapement permits the cam carriage L to move into its second position indicated in the diagram $b$ where the cam carriage is located over the units main group of rod sets on the carriage K. The key corresponding to the second figure in the first factor is now struck and as a result a selective swinging of rod sets in the units main group of rod sets on the carriage K results. When this key is released the carriage K is traversed and located by the escapement which controls it in the position indicated in the diagram $c$. It will be seen that in this position the rod sets on the carriage correspond as to the tens and units sub-groups marked 10 and $u$ with the similarly marked sub-groups in the lower main groups of answer-presenting members $w'$ and $x'$, the tens main group coinciding with the group $w'$ and the units main group on the carriage coinciding with the group $x'$. At this stage, the feeding in of the first factor has been completed and the apparatus is ready for the feeding in of the second factor to be commenced.

From what has been said above, it will be understod that as a result of the selective poitioning by the cams of rod sets on the carriage K certain rods on this carriage have been swung so that their upper ends, when the carriage is located beneath the answer-presenting members grouped at M, will register with certain of these answer-presenting members and the latter can thus be moved when keys are operated and corresponding rods are thereby caused to slide. Thus when the key is operated corresponding to the first or hundreds figure in the second factor in the sum V, answer-presenting members will be moved in the $v$, $w$, and $x$ groups. It will be appreciated that the partial products thus passing into the answer-presenting members will go in respectively as tens of thousands through the $10w'$ lower sub-group into the $v$ upper main group which functions for tens of thousands, secondly as units of thousands through the sub-group $u$ of the main group $w'$ into a sub-group of the upper main group $w$ which functions for thousands, thirdly through the $10x'$ lower sub-group into the second sub-group of the upper group $w$ for thousands, and finally through the sub-group $u$ of the lower group $x'$ into one of the sub-groups of the upper main group $x$ which functions for hundreds. In this way the apparatus will deal with the figures 81000 and 8100 comprised in the first two lines of partial products in the sum V. By mechanism to be referred to hereafter the partial products indicated or presented in the groups $v$, $w$ and $x$ will be fed automatically into the adding portion of the mechanism.

On release of the key the carriage K will be traversed to the position indicated in the diagram $d$ where, as can be seen, the carriage rod sets are located where the tens and units sub-groups of the tens and units main groups of these rod sets coincide respectively with the tens and units sub-groups in the main lower groups $x'$ and $y'$. The key corresponding to the tens or second number in the second factor is now operated and results in answer-presenting members being moved in the $w$, $x$ and $y$ upper main groups and the partial products thereby indicated are fed automatically into the adding portion of the mechanism. On release of this key the carriage K moves to its final position as indicated in the diagram $e$ where the carriage rod sets are located in the same way as already described but beneath the lower sub-groups $y'$ and $z'$ of answer-presenting members. The key corresponding to the third or unit figure in the second factor is now operated and answer-presenting members are moved in the $x$, $y$ and $z$ main groups and the partial products thereby indicated are fed into the adding portion of the mechanism. All the partial products which have been fed into that part of the mechanism are now added together and the final answer is presented.

From the above description with respect to the diagrams in Figure 1, it will be appreciated that considering the series of sets of product-indicating members comprised in each of the groups $w'$, $x'$, $y'$ and $z'$, there is a similarity, that is to say, referring to each group as a whole they are all alike. Further, there is a similarity between all the tens sub-groups $10w'$, $10x'$, $10y'$, $10z'$ and a similarity between all the $u$ sub-groups. It follows from this that taking the groups as a whole there is the same similarity between the sub-groups $w$, $x$ and $y$ and between their sub-groups $w$, while the group $v$ is similar to all the tens sub-groups and the group $z$ is similar to all the units sub-groups. Then again, with respect to the rod sets on the carriage K, taking the sub-groups of these sets as a whole, the two tens sub-groups are similar and the two units sub-groups are similar. Thus the two sub-groups of cams on the cam carriage L which function respectively for tens and units can function in a similar manner with respect to the sub-groups composing each main group of rod sets respectively for tens and units on the carriage K, and subsequently when the carriage K is located beneath the part M of the apparatus each tens sub-group of rod sets on the carriage functions similarly, for the purpose of transmitting impulses and obtaining product indications, with respect to each tens sub-group of answer-presenting or product-indicating members. In a like manner each unit sub-group of rod sets on the carriage K functions similarly, for the purpose of transmitting impulses and obtaining product indications, with respect to each units sub-group of answer-presenting or product-indicating members.

It may be noted that if the factors to be dealt with comprise fewer figures than in the sum V set out above, then it is necessary to operate a spacing or like key which brings about the traversing of the cam carriage L and the rod carriage K into the requisite positions. The effect of operating the spacing key in this way is the same as if 0 was to be written in the place of each figure of higher denomination which is not actually to be found in the factors dealt with. Thus if the sum II set out above is to be performed, the spacing key will be operated first and will cause the cam carriage L to move from the position shown in the diagram $a$ into the position shown in the diagram $b$ when the key for the single figure in the first factor will be operated. Then when this key has been released and the carriage K has moved into the position shown in the diagram $c$, the spacing key is operated twice in succession so as to cause the carriage to move first into the position shown in the diagram $d$ and then into the position shown in the diagram $e$ when the key corresponding to the single figure in the second factor can be operated.

The accompanying drawings illustrate by way of example an apparatus embodying this invention, this apparatus being designed to perform multiplication and, as above indicated, being capable of dealing with any number from 1 to 99 multiplied by any number from 1 to 999. In these drawings:—

Figure 1, already referred to, comprises a series of diagrams indicating the successive relative positions of the rod sets mounted on the traversing carriage, the sets of cams, and the sets of answer-presenting or product-indicating members.

Figure 1:
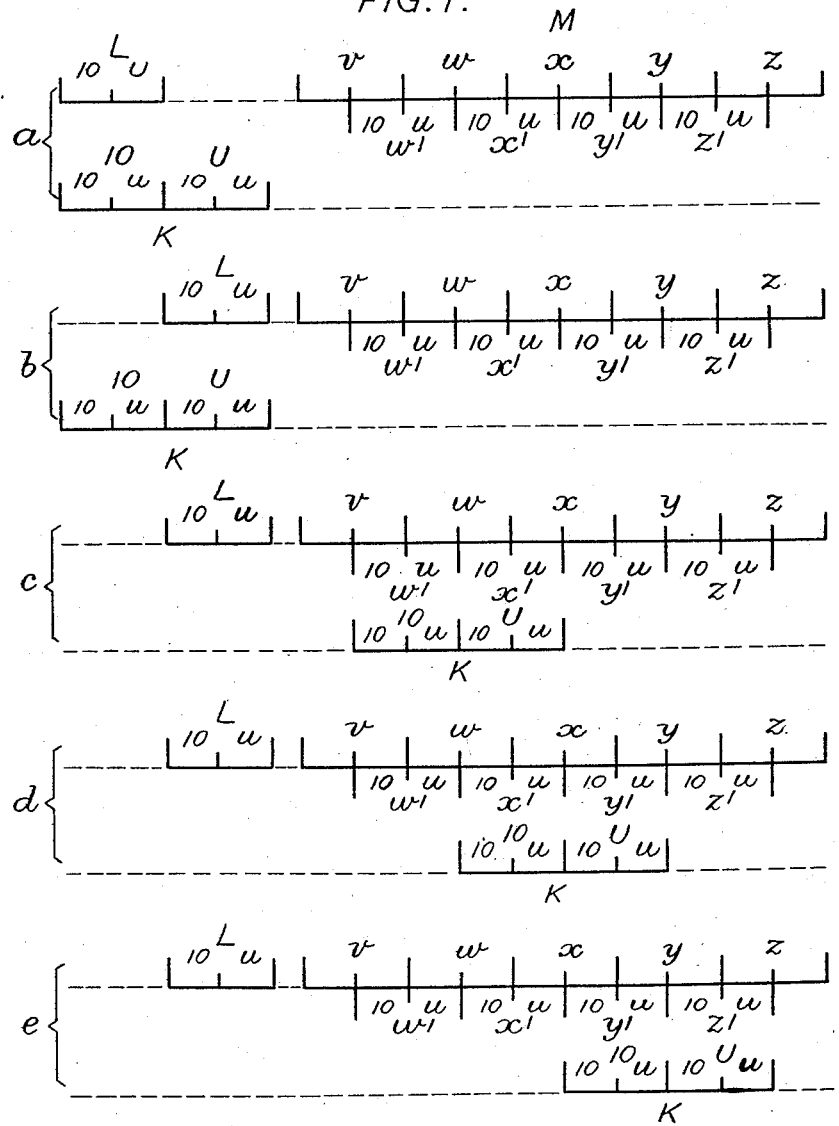
Figure 2:
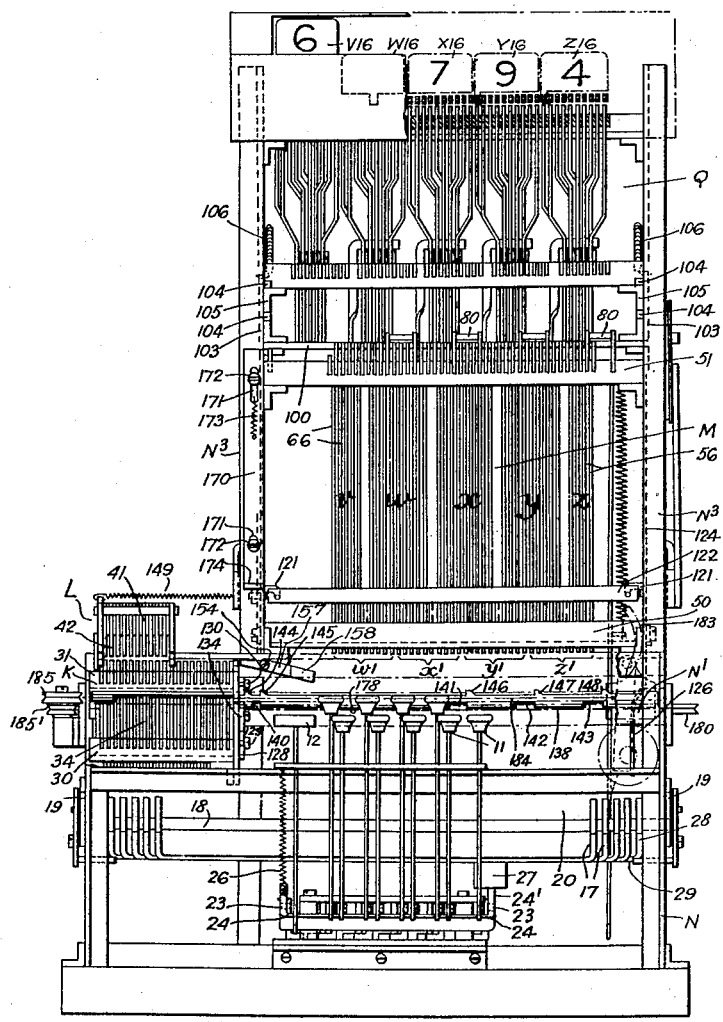
Figure 2 is a front elevation of the apparatus with the casing removed and parts of the framework broken away for the sake of clearness in illustrating the details of construction. This view shows the cam sets and traversing carriage in their respective initial positions before the machine is operated.
Figure 3:
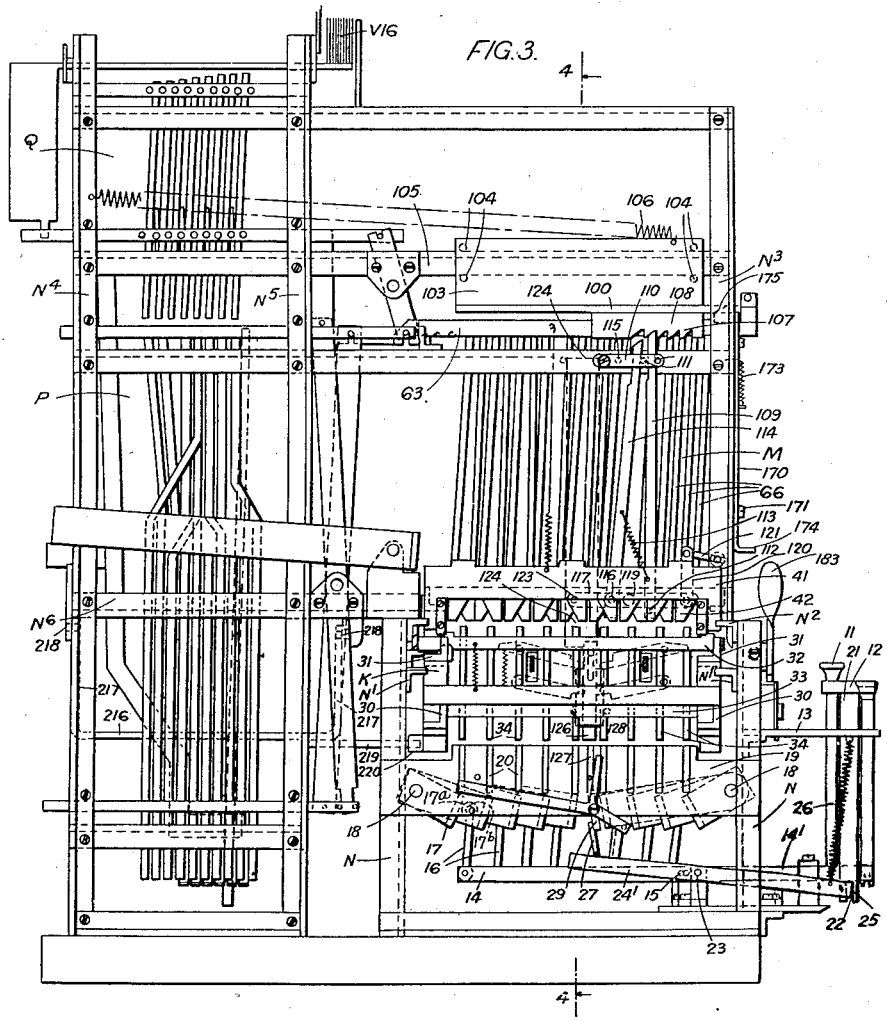
Figure 3 is an elevation of the machine as viewed from the left-hand side of Figure 1 with some parts of the framing removed for the sake of clearness.
Figure 4:
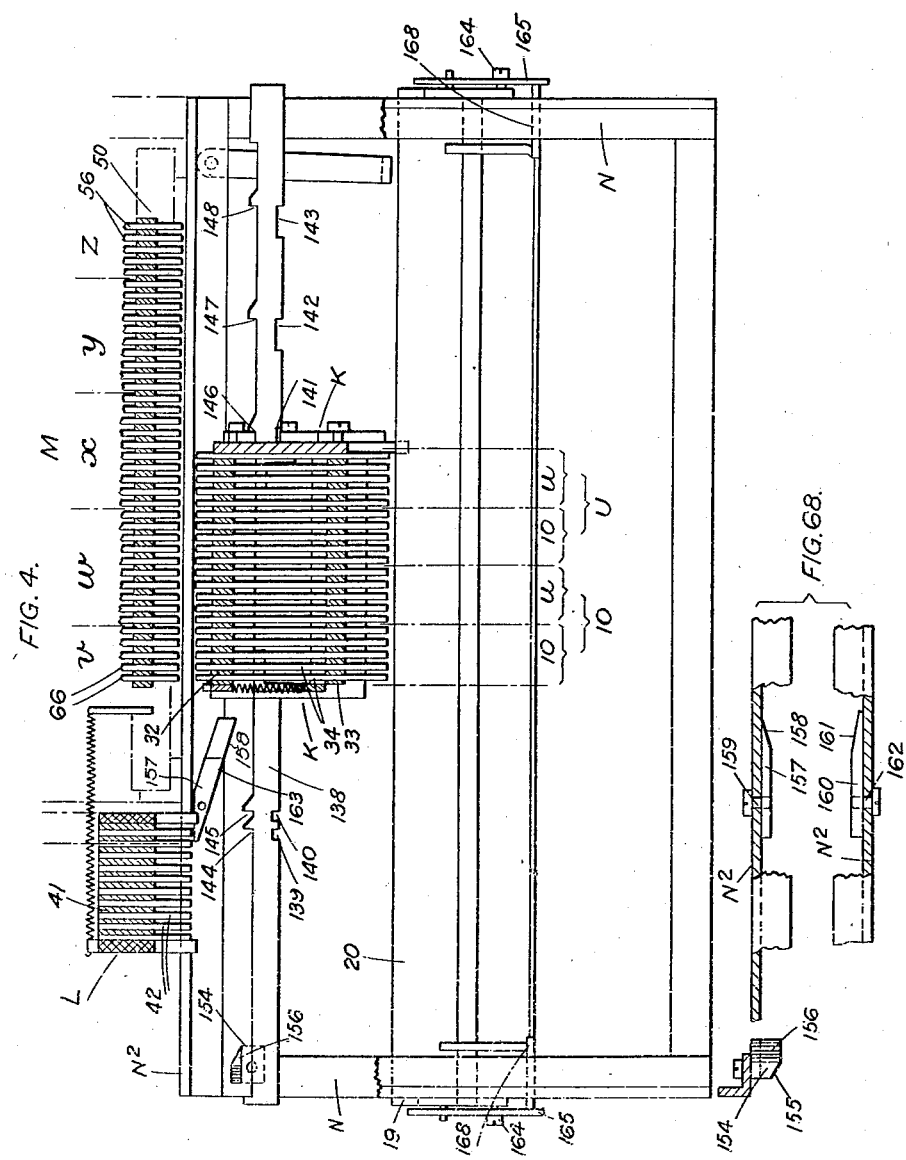

Figure 4 is a front vertical sectional elevation showing on an enlarged scale parts of the mechanism as they appear in Figure 2, the section being taken on or about the line 4—4 in Figure 3 looking in the direction of the arrows there indicated. Various parts of the detail structure are omitted from this sectional view which is intended to show primarily certain details in the arrangement of the rod sets on the carriage, and of the cam sets, and the lower ends and grouping of the rods constituting the product-indicating members. The carriage and cam sets are here shown respectively in the positions occupied by them which are indicated in the diagram c in Figure 1.

Figure 5:
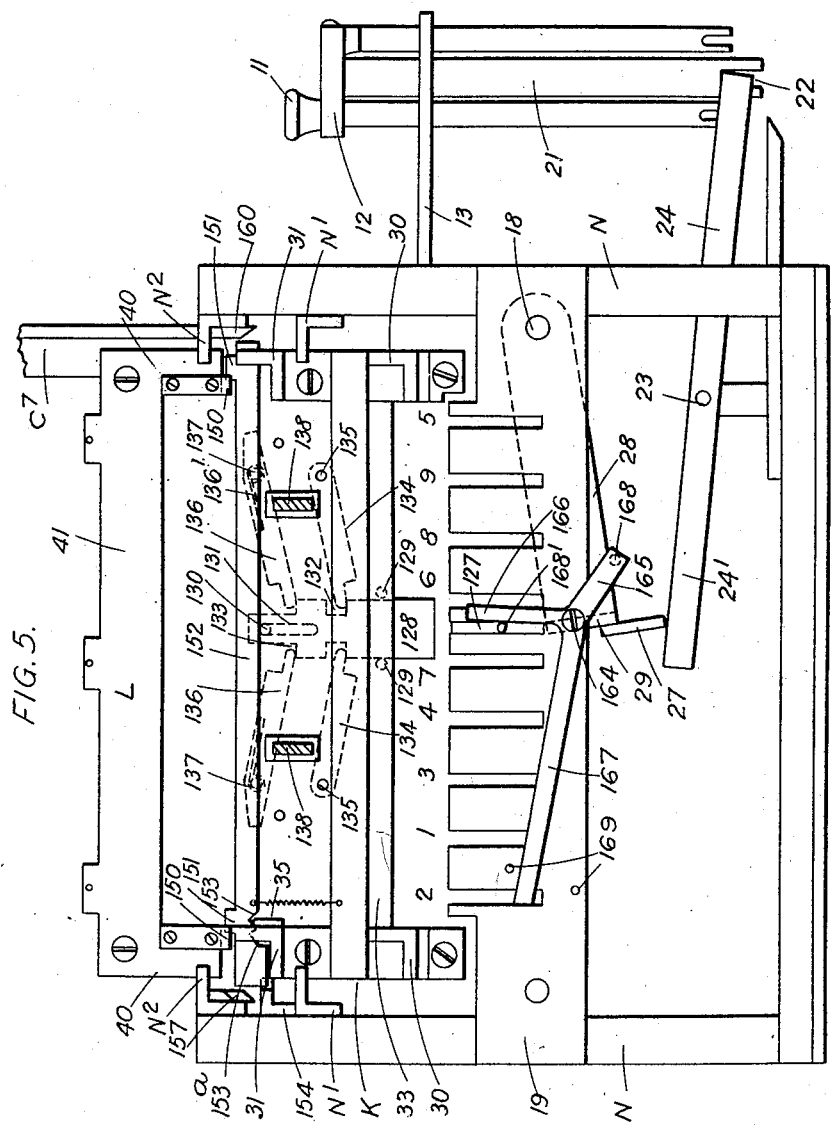

Figure 5 is a transverse vertical section on the same scale as Figure 4. Various parts are removed in this section which is intended to illustrate the mounting of the carriage and the rod sets thereon and the mounting of the carriage on which are arranged the cam sets.

Figure 6:
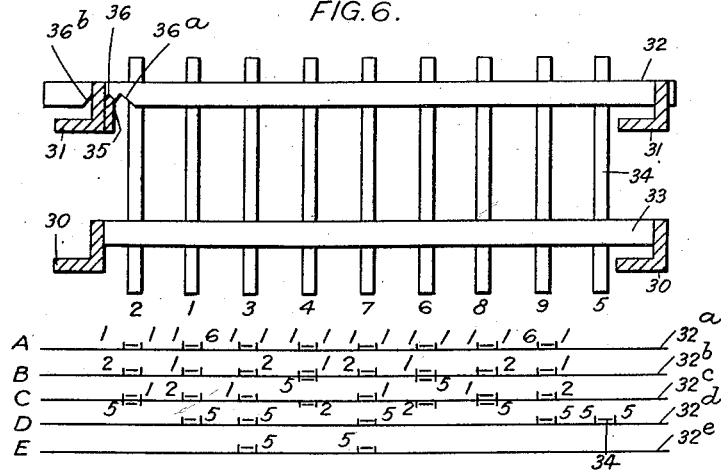

Figure 6 shows in the upper part thereof in side elevation one of the rod sets on the carriage and in the lower part a diagrammatic plan of one of the unit sub-groups of rod sets on the carriage, the disposition of the several rods in these sets being there indicated as also the product indication values obtainable thereby when these rod sets have been swung to left or right.

Figures 7 to 39 comprise a series of vertical sectional views taken as to some of them in planes at right angles to the plane of the paper in Figure 2 through the units or z group of answer-presenting or product-indicating members and the units sub-group of the units main group of rod sets on the carriage, these sectional side elevations serving to illustrate the disposition of the product-indicating members in their several and successive sets and the disposition of the rods in the corresponding rod sets which are adapted to engage with these sets of product-indicating members. Others of these sectional views are taken in planes at right angles to the above, that is to say, in planes substantially parallel to the plane of the paper in Figure 2 and illustrate the disposition of the several product-indicating members in the several sets and the corresponding individual rods in the sets on the carriage which rods are adapted to engage with the product-indicating members when swung to right or left. Accompanying these views are plans of the several rod sets on the carriage and side elevations of the several cam sets which are adapted to cooperate with these rod sets in effecting the swinging of these rod sets, the selective action of this swinging being indicated by these various views.

Figure 40:
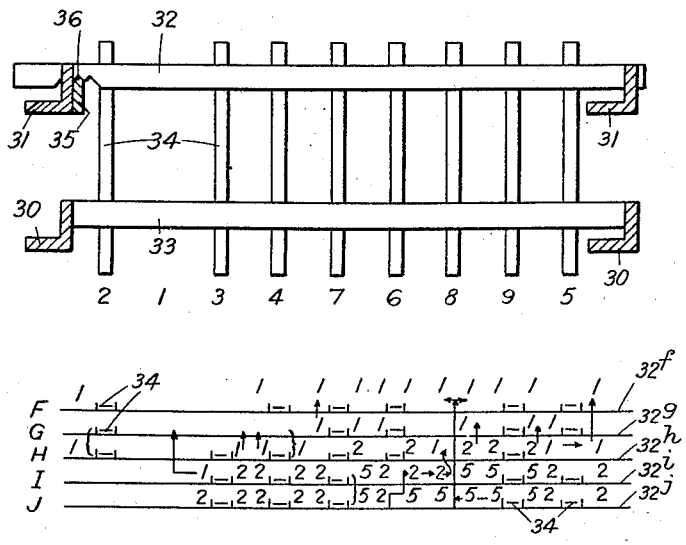

Figure 40 shows in the upper part thereof in side elevation, one of the rod sets on the carriage and in the lower part a diagrammatic plan of one of the tens sub-groups of rod sets on the carriage the disposition of the several rods in these sets being there indicated as also the several product indication values obtainable when these rod sets have been swung to left or right. This figure shows with respect to the tens what is illustrated with respect to the units in Figure 6.

Figures 41 to 67 comprise a series of vertical sectional views generally similar to those comprised in Figures 7 to 39 but illustrative of the answer-presenting or product-indicating members in a tens sub-group. These views show successively the several carriage rod sets which function in respect of tens in the sub-groups, the cams by which these sets are caused to swing, and the product-indicating members with which the carriage rods can register when swung.

Figure 68 is a plan of certain details relating to the traversing carriage and parts associated therewith.

Figure 69 is a plan of the slotted plate referred to hereunder as the grid plate which functions in the mechanical transmission of partial products from the multiplying part of the apparatus into the adding part of the apparatus.

Figure 70 is a perspective diagram illustrative of the manner in which rods are arranged and swung in the adding portion of the apparatus for the purpose of adding together the partial products.

Figures 71 to 76 are a series of views showing in diagrammatic form the arrangement of the rods comprised in the adding part of the apparatus, their grouping with respect to the various denominations and the manner in which they are swung as and when partial products are fed into the adding mechanism from the multiplying part of the apparatus. Each of these views comprises two corresponding diagrams of which that marked a represents the rods as when viewed from the front of the machine while that marked b represents the rods as when viewed from the left-hand side of the apparatus.

Figure 77:
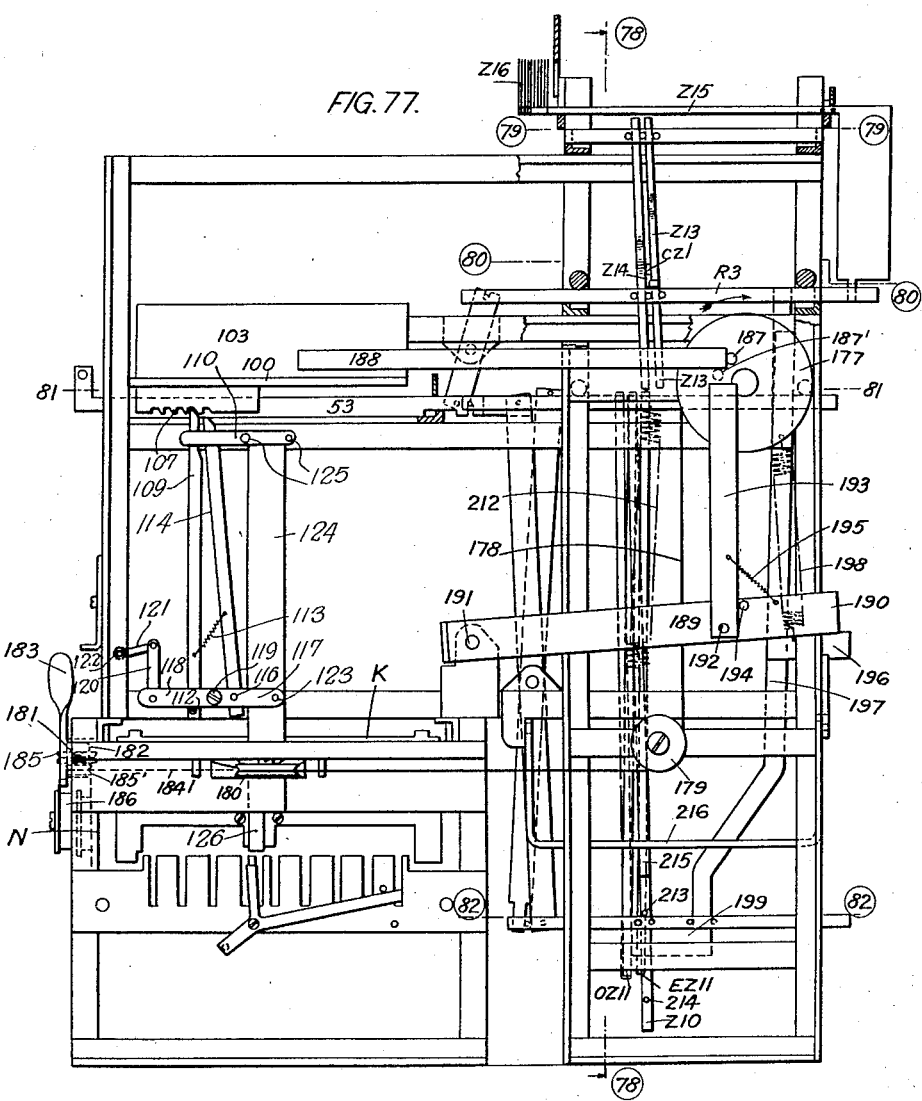
Figure 78:
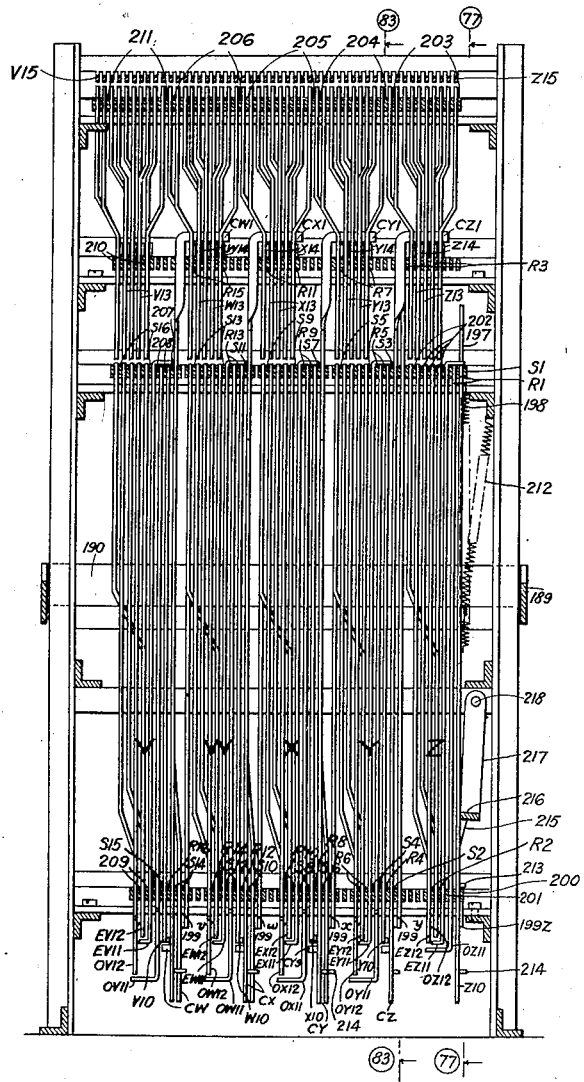

Figure 77 is a partly sectional elevation taken substantially on the line 77—77 in Figure 78 looking in the direction of the arrows and showing certain parts of the mechanism as viewed from the right-hand side of the machine. It is to be noted that in this and in the succeeding figures the numerals indicating the lines on which the several sections are taken are placed in circles to differentiate them from similar numbers used to indicate parts of the apparatus. This view illustrates more particularly some features of the escapement mechanism controlling the grid plate, the main spring and certain parts associated with the traversing movement of the carriage and mechanism employed for resetting the grid plates and rods in the adding portion of the apparatus.

Figure 78 is a sectional elevation on the line 78—78 in Figure 77 looking in the direction of the arrows and showing a general front view of the mechanism embodied in the adding part of the apparatus as it appears after the multiplying part of the apparatus has been removed.

Figure 79 is a sectional plan of the adding part of the apparatus taken on the line 79—79 in Figure 77.

Figure 80 is a similar sectional plan on the line 80—80 in Figure 77.

Figure 81 is a sectional plan on the line 81—81 in Figure 77 showing the horizontally sliding guide bars in the upper part of the multiplying part of the apparatus as well as parts of the adding mechanism.

Figure 82 is a sectional plan on the line 82—82, parts being broken away to show the structures and arrangements at the lower part of the adding mechanism.

Figure 83 is a sectional elevation on the line 83—83 in Figure 78 this line being also indicated in Figure 81 in both cases looking in the direction of the arrows. This sectional elevation shows parts of the adding mechanism.

Figure 84 is a sectional elevation on the line 84—84 in Figure 81 looking in the direction of the arrows and showing parts of the adding mechanism.

Figures 85 and 86 are sectional elevations taken similarly and situated adjacent to the sectional elevation shown in Figure 84.

In the description of the machine it will be convenient to refer first to that part of the apparatus in which multiplication is more particularly carried out and the partial products indicated by the answer-presenting members. Subsequently the structure, arrangement and operation of that portion of the apparatus in which these partial products are added together and the final answer is presented will be dealt with.

Referring in the first place to Figures 1 to 5, there are a series of keys 11 corresponding to and operative in respect of the several numbers from 1 to 9 inclusive. There is also a key 12 operative in respect of 0 which may be said to be in effect a spacing key. Each of the keys 11 is mounted on the end of a vertically sliding rod which passes through and is guided by a plate 13 while the lower end of this rod is pivotally connected to one end of a lever 14 pivoted at 15. The opposite ends of these levers 14 are connected by links 16 with extended U-shaped members 17 which are arranged in two groups respectively pivoted on two rods 18. Each of the U-shaped members 17 has a lug 17ª secured thereto intermediate the length of the transverse connecting portion of the member. This lug is provided with a pin 17ᵇ to which the upper end of the link 16 is pivotally connected as shown in dotted lines in Fig. 3. Thus the operation of either of the keys 11 will cause a U-shaped member 17 to rise. The above described keys and the mechanisms actuated thereby are suitably disposed in and carried by a framing N comprising rigidly connected members built up so as to carry the operative parts of the apparatus. Mounted on the framing N are two guide plates 19 these plates being similarly slotted for the purpose of carrying and guiding a series of plates 20 which may be conveniently referred to as knives. These knives can slide in the vertical direction and extend right across the front part of the machine but behind the keys. The central portion of each U-shaped member 17 makes contact with and when moved serves to cause a knife 20 to slide upwards, the knife maintaining its horizontal position when thus lifted as a result of the depression of a key 11. The knives 20 are equally spaced apart and lie one behind the other in the direction from the front and towards the back of the apparatus, as will be seen in Figure 3.

The carriage K is arranged so that it can be traversed across the front part of the apparatus above the knives 20. The carriage comprises lower and upper horizontal frame members 30 and 31 which run in the direction in which the carriage travels, these members being suitably connected to form a rigid structure which can slide on a pair of horizontal guide bars N' fixed in the framing N.

The horizontal carriage frame members 30 and 31 are respectively slotted or notched at equal distances apart to receive the ends of the upper and lower horizontal guide bars 32 and 33 which carry the sets of rods 34 so that the latter can slide vertically with respect to the guide bars. The ends of each lower rod set guide bar 33 are held in the slotted bars 30 so that the bars 33 cannot move in the direction of their length. The rod set guide bars 32 are, however, mounted in the carriage frame bars 31 so that they can slide in the direction of their length in the bars 31. When the bars 32 are caused to slide thus, they swing all the rods 34 carried thereby either to the right or left, as viewed in Figure 3. The arrangement of the rod sets with their bars 32 and 33 is clearly shown, for example, in the lower part of Figure 7. It will be seen there that one of the horizontal carriage bars 31, preferably that which supports the left-hand ends of the upper rod set guide bars 32, carries a plate 35 the upper end of which is rounded and adapted to engage notches cut in the under edge of the bars 32. These notches are three in number in each bar 32 the central one of these notches 36 being that which is engaged by the edge of the plate 35 when the mechanism is in its initial position. The notches 36ª and 36ᵇ are engaged by the edge of the plate 35 when a rod set is swung either to the left or to the right, as viewed in Figure 7. The notches 36, 36ª and 36ᵇ and the edge of the plate 35 which engages them are all so formed that when a rod 34 has been raised and the side of its upper end makes contact with a member such as a cam which tends to impart a lateral thrust to the end of the rod, the guide bar 32 which carries the rod 34 which has thus been raised will be caused to slide in the direction of its length either to the left or to the right the central notch 36 being then disengaged from the plate 35 and either the notch 36ª or the notch 36ᵇ brought into engagement therewith. These notches serve to retain the guide bars 32 when they have been caused to slide horizontally and thus hold the rods 34 in the positions into which they have been swung by the selective action of the cam members. The pair of guide bars 32 and 33 of each rod set are conveniently connected together by a spring 37 which allows the bar 32 to lift slightly when it is caused to slide and as the notch 36 is disengaged from the plate 35 and one of the other notches brought into engagement therewith, the springs 37 serve merely to reinforce the action of gravity on the bars 32.

It will be seen from Figure 3 that the spacing apart of the rods 34 along the bars 32 and 33 which carry them corresponds to the spacing apart of the knives 20 and since the latter extend across the machine parallel to the guide bars N′ on which the carriage K can be traversed, the knives 20 will always be operative to push upwards the rods 34 irrespective of the position of the carriage K in the path along which it can be traversed. In this way when a key 11 is actuated and the knife 20 raised thereby, certain rods 34 on the carriage will be pushed or caused to slide in the direction of their length, that is, upwards, on the guide bars 32 and 33 which carry these rods, and in this way it is possible to transmit impulses through the rods 34 by the action of a single set of keys in whatever position the carriage K may be located along its path.

There are twenty sets of rods 34 mounted on the carriage K these rod sets occupying parallel vertical planes as indicated in Figure 2, while as mentioned the rods in the sets are spaced apart equally along the guide bars 32 33 so that rods in the several sets lie one behind the other when seen in side view as in Figure 3. The detail arrangement of the rods 34 in the several sets will be described more particularly hereafter but it is to be noted that the disposition of these rods is such with relation to the knives 20 that the raising of one of these knives following the actuation of a key will tend to push upwards simultaneously corresponding rods in more than one of the rod sets by reason of the knives 20 extending transversely across and beneath all the rod sets. Thus if the individual rods in a set as viewed in side elevation in Figure 3 are assigned different numerical values corresponding to the numbers on the keys which when depressed will cause these rods to be respectively pushed up when the keys are actuated, the depression of a key will result in the pushing up of all the rods of corresponding numerical value in the various sets which may contain such a rod.

The cam carriage L is mounted so that it can travel horizontally on a pair of bars N² carried by the framing N. The carriage framing comprises longitudinal members 40 on which are mounted a series of bars 41 which extend across the carriage between the longitudinal frame members 40 to which they are fixed. On the bars 41 and downwardly directed therefrom are fixed the cam members 42 the number and disposition of which vary. These cam members 42 thus constitute a series of members projecting from the under edge of each bar 41 each cam member having an inclined surface 43 which actually forms the operative part of the cam member and is disposed so that when a rod 34 is pushed up, the upper end of this rod will strike a cam surface 43 and as a result the guide bar 32 of the set to which belongs the rod that has been raised will be caused to slide in the direction of its length. As will be noted for example in Figure 9, some of these cam members 42 have inclined cam surfaces 43 disposed on one edge while others have them disposed towards the opposite edge so that while certain cam members will be operative to effect the swinging of a rod set to the right, as viewed in Figure 3 or for example in Figure 7, other cam members will cause the rod sets to be swung to the left. The cam-carrying bars 41 lie parallel and are spaced apart equally their spacing corresponding to the lateral spacing apart of the sets of rods 34, the general arrangement of the cam-carrying bars 41 on the carriage L in relation to the rod sets on the carriage K being indicated in Figure 2.

As already mentioned with reference to the diagram in Figure 1, the cam carriage L can be traversed for a certain distance in the direction across the machine as viewed in Figure 2 so as to occupy either of two alternative positions. This traversing movement is controlled by an escapement which will be described hereafter. As also indicated with reference to Figure 1, the carriage K can be traversed across the machine as viewed in Figure 2, this traversing movement being likewise controlled by an escapement which will be described later. These escapements are under the control of the keys so that when a key is actuated either the cam carriage L or the rod set carriage K will be permitted to move as determined by their respective escapements.

Above the path along which the carriage K can be traversed and suitably fixed in the framework N are two pairs of bars 50 and 51. The bars 50 have mounted thereon a series of guide bars 52 arranged so that they extend between the pair of frame bars 50. The pair of frame bars 51 also carry a series of guide bars 53 but these guide bars lie in slots formed in the frame bars 51 so that the guide bars 53 can slide horizontally in the direction of their length. Each guide bar 53 towards its left-hand end, as viewed for example in Figure 7, and on its under side has formed therein three notches, 54, 54ª and 54ᵇ. These notches are adapted to engage with the rounded upper edge of a plate 55 fixed on and extending parallel to the frame bar 51. The arrangement is very similar to that already described with reference to the sliding guide bars 32 of the rod sets on the carriage so that if a force is applied tending to slide a guide bar 53 in the direction of its length, one of the notches 54 will be disengaged from the plate 55 and after the bar 53 has been caused to slide, the next notch will engage the plate 55 and hold the guide bar in the position in which it has been moved together with the rods which are carried and guided by the bar. Each fixed guide bar 52 and each sliding guide bar 53 together form a pair being positioned above each other in substantially the same vertical plane and each pair of these guide bars carries a set of rods 56. The lower bar 52 serves to guide the lower ends of these rods 56 while the upper bar 53 guides the upper ends of these rods and when this bar is caused to slide in the direction of its length, it will carry with it and swing all the rods whose upper ends are guided thereby. A light spring 57 extends between each pair of guide bars 52, 53 and serves to assist the force of gravity acting on the bar 53 in respect to the engagement of the notches 54 with the plate 55. In their general features, all the rod sets 56 with their guide bars 52 and 53 are substantially similar but the detail structure and arrangement of the rods 56 in the sets differ in certain respects which will be explained hereafter. It will be appreciated that the various groups of sets of rods 56 constitute the part M of the apparatus previously referred to.

In the initial positions of the parts of the apparatus before the rods 34 on the carriage K have been swung by the action of the cams, the upper ends of the rods 34 occupy such positions that no one of them can register as to its upper end with the lower end of any one of the rods 56. If, however, when the rods 34 are located beneath the cams, one or more rods 34 are pushed up in accordance with the selection effected by depression of a key, one or more of these rod sets will be swung and then when the carriage K is located beneath the rod sets 56 the upper ends of certain rods 34 will be positioned where they can register with the lower ends of certain rods 56. Then when a key is depressed the resultant pushing up of one or more rods 34 will cause the rods 56 with which such rods 34 may be in register to be also pushed up to an extent sufficient to cause the upper ends of the rods 56 to project beyond the sliding guide bar 53. In this way by the selective swinging action of the cams on the sets of rods 34 selection can be effected among the rods 56 in the sets of these rods, the ends of these selected rods 56 being caused to project in such a way that they can serve as an indication or representation of partial products.

It is to be noted that whereas in their initial positions the rods 34 lie vertically as indicated for example in Figure 7 with the centre notch 36 of the three notches in the guide bar 32 in engagement with the plate 35, in the case of the rods 56 the initial position of the sliding guide bars 53 is such that the endmost notch 54 of the three notches in the under-side of these bars is in engagement with the plate 55. Thus the rods 34 can be swung either to right or left as seen in side view in Figure 7 and retained as swung by the engagement of either the notch 36ª or the notch 36ᵇ with the plate 35, on the other hand, the sliding of the guide bar 53 which carries the upper ends of the rods 56 takes place with a step by step movement from right to left so that when the notch 54 has been lifted out of engagement with the plate 55, the notch 54ª will be engaged by this plate and subsequently the notch 54ᵇ. When the apparatus is reset the guide bars 53 slide back towards the right so as to bring the notches 54 into engagement with the plate 55. The rods 34 are reset by bringing them back to their central position with the notch 36 in engagement with the plate 35.

Turning now to the arrangement of the rods 34 in their sets and in their relation to the sliding guide bars 32, it will be noted by reference for example to Figures 7 and 8 that the rods 34 lie and are carried at the side of the guide bars 32 and 33. Each rod 34, which is preferably formed as a narrow flat strip of metal, lies and is guided between pairs of rounded pins 38 fixed in and projecting from the sides of the guide bars 32 and 33. Each rod 34 has fixed in it two pins 39 which respectively serve to limit the downward and upward sliding movements of the rod on the guide bars 33 and 32. The guide bars 32 and 33 are of the same thickness and each cam-carrying bar 41 has a similar thickness as also the cam members 42. It is thus possible to arrange the guide bars 32 in parallel vertical planes with the rods 34 carried thereby also in parallel vertical planes which alternate with the planes in which lie the guide bars, while the cam bars 41 will also lie in parallel vertical planes with the cams 42 carried thereby situated in other and alternating parallel vertical planes. The spacing apart of the various vertical planes in which the guide bars 32 and the rods 34 lie and also those in which lie the cam bars 41 and the cam members 42 is such that when the carriage K is located beneath the cam carriage L a cam bar 41 will lie above and in the same vertical plane as a pair of guide bars 32 and 33, while the cam members 42 will lie above and in the same vertical planes as the sliding rods 34.

It will be convenient now to refer to the detail arrangement of the rods 34 in their several sets. Referring to Figure 4, it will be seen that on the carriage K there are twenty sets of rods 34 arranged side by side. These sets are divided into two main groups in each of which are ten sets of rods 34. The one main group which lies to the right, as seen in Figure 4, functions in respect of units, while the other group which lies to the left functions in respect of tens. These main group divisions are indicated in Figure 4 by chain lines. Each of these main groups is divided into two sub-groups of which the right-hand sub-group relates to the units while the left-hand sub-group relates to the tens. Thus, for example, in the unit main group there are five sets of rods which function in respect of units and five rod sets which function in respect of tens of units. Similarly, in the tens main group there are five rod sets which function in respect of units of tens and five rod sets which function in respect of tens of tens.

The disposition of the rods 34 in their sets in each unit sub-group will now be described in detail and subsequently the disposition of the rods 34 in their several sets in the tens sub-groups will be referred to.

From the description given already with reference to Figure 1 as to similarity and similar cooperation between certain groups and sub-groups of rod sets, it will be understood that the description given hereunder with respect to a units sub-group of sets of rods 34 applies equally to the sets of rods in each unit sub-group on the carriage K and the description of the corresponding sets of rods 56 composing a sub-group applies to all those sub-groups in the main groups w, x, y and z which correspond to the sub-groups u in the main groups w', x', y' and z' as indicated in Figure 1. There is a like similarity and a like applicability of description with regard to the two tens sub-groups of sets of rods 34 on the carriage K and the several sub-groups of sets of product-indicating rods in the main groups v, w, x and y with which these sets of rods 34 coact.

Reference will now be made to Figure 6 and more particularly to the diagram which constitutes the lower part of that figure wherein are indicated the several rod sets which compose a unit sub-group of rods 34 on the carriage K. This diagram indicates a plan of the five rod sets in this sub-group the sliding guide bars being shown as lines with each rod 34 also shown as a short line located between the projecting pairs of pins on the guide bar 32 which serve to guide the rods 34 while permitting them to slide freely in a vertical direction. In this diagram for the sake of clearance the rod sets are spaced a greater distance apart than in the actual machine where the rod sets lie so close and parallel to one another that between adjacent guide bars 32 there is only the necessary clearness to permit of the free sliding in the vertical direction of the several rods 34.

It should be noted that since in Figure 6 and also in Figure 7 and other similar figures the rod sets are shown as viewed from the left-hand side of the apparatus, in the same way as the rod sets are illustrated in Figure 3, in the diagrammatic plan comprised in the bottom portion of Figure 6 those ends of the guide bars 32 there shown which lie towards the right of the diagram are directed towards the front of the machine while the opposite ends which are marked with the letters A, B, C, D and E lie towards the back of the machine. Consequently, when hereunder reference is made to the right or left side of a guide bar 32, it will be understood that these designations relate to these guide bars and the rod sets when viewed from the right-hand end of the diagram, that is, the front of the machine. Thus the right-hand side of the guide bar B will mean that side which is adjacent to the guide bar A while the left-hand side of the guide bar B is that which is adjacent to the guide bar C.

The several rod sets are designated A, B, C, D and E for convenience of reference and the same letters of reference will be found indicating the corresponding rod sets in Figures 8, 11, 14, 17 and 20 and in the series of vertical sectional views Figures 22 to 39 inclusive. It should be noted that the rod set shown in elevation in the upper part of Figure 6 comprises a complete set of nine rods 34 and as such is merely an indication of the disposition of the several rods for assistance in interpreting the diagram in the lower part of Figure 6 since in fact no one of the rod sets A, B, C, D or E has such a complete set of nine rods lying in one plane.

The individual rods in a set are assigned different number values as marked at the lower ends of the rods shown in the upper part of Figure 6. These number values are conveniently in the following order:—2, 1, 3, 4, 7, 6, 8, 9, 5, taking them from back to front of the carriage, that is, from left to right as viewed in Figure 6. In a sense, it may be said that these number values are assigned to the positions along the guide bars 32 and 33 in which rods 34 are situated or in other words, that all rods in the several sets lying in a plane which is at right angles to the surface of the paper in Figure 6 and cuts through one of the rods shown in the upper part of that figure, have the same number values assigned to their lower ends. Thus, referring to the diagram in the lower part of Figure 6, it will be seen that distributed through the various rod sets A, B, C, D and E, there are four rods in a position or plane with number value 2, four rods in a similar plane with number value 1, five rods with number value 3, four rods with number value 4, five rods with number value 7, four rods with number value 6, four rods with number value 8, four rods with number value 9, and one rod with number value 5. These number values and the planes at right angles to the surface of the paper in Figure 6 in which lie the rods having like number values correspond to the knives 20 which are severally raised by actuation of the keys 11 (see Figure 3) so that for example if the number 3 key is depressed, all the five rods 34 lying respectively in the sets A, B, C, D and E and having the number value 3 will be pushed up by the knife 20 which lies beneath them. Similarly, depression of the number 6 key will push up four rods all having the number value 6 and so on throughout all the rods.

Taking the individual guide bars 32 and rod sets as viewed in the diagram in the lower part of Figure 6, it will be seen that in the case of the rod set A there are eight rods in this set, all of which lie on the right-hand side of the guide bar $32^a$ and are carried thereby so that when this guide bar $32^a$ is caused to slide in order to bring either the notch $36^a$ therein or the notch $36^b$ into engagement with the plate 35, all the eight rods 34 carried by this guide bar $32^a$ will be swung. The set B also comprises eight rods which lie against and are carried on the right-hand side of the sliding guide bar $32^b$, but this guide bar carries also two rods, respectively with number values 4 and 6 which lie against the left-hand side of the guide bar $32^b$. These two rods with number values 4 and 6 strictly belong to the next or C set of rods in that they lie actually in the same vertical plane as the C set of rods, but in consequence of these two rods being carried and guided by the sliding guide bar $32^b$, when this guide bar is caused to slide, it will swing not only all the eight rods which constitute the B set but also the number 4 and number 6 rods in the C set. The C set comprises eight rods but of these only six are actually carried by and located against the right-hand side of the guide bar $32^c$, the other two rods, namely, those having the number values 4 and 6 being carried, as mentioned, by the guide bar $32^b$. The guide bar $32^c$ has carried on its left-hand side four rods, namely, those with number values 2, 4, 6 and 8, these rods belonging strictly to and actually lying in the same vertical plane as the rods constituting the D set, but by reason of these rods being carried by the guide bar $32^c$, they will be swung with the rods of the C set which are carried on the right-hand side of the guide bar of that set. The D set has only five of the rods which strictly fall in this set carried on the right-hand side of the guide bar $32^d$ and guided by this bar, these rods being those with number values 1, 3, 7, 9 and 5. The guide bar $32^d$ carries no rods on its left-hand side. Finally, the E set comprises only two rods with number values 3 and 7 both of these being disposed on the right-hand side of the guide bar $32^e$.

Thus when the guide bar $32^a$ is caused to slide, it will swing all the eight rods comprised in the A set. When the guide bar $32^b$ is caused to slide, it will swing not only all the eight rods comprised in the B set but also two rods respectively with number values 4 and 6 which belong to the C set. When the guide bar $32^c$ is caused to slide, it will swing the remaining six rods respectively with number values 2, 1, 3, 7, 8 and 9 comprised in the C set and also the rods with number values 2, 4, 6 and 8 belonging to the D set. When the guide bar $32^d$ is caused to slide, it will swing the rods with number values 1, 3, 7, 9 and 5 of those forming the D set. When the guide bar $32^e$ is caused to slide, it will swing the two rods with number values 3 and 7 which compose this set.

Since, as indicated above, the cam members 42 (see Figure 9) in a set all lie in the same vertical plane as the rods comprised in a set, such for example as the A set (see Figure 8), it will be apparent that when a rod 34 is pushed up its end will tend to strike the cam surface 43 of a cam member 42 in that set which lies in the same plane as the rod which has been pushed up, and the swinging of rods that results from this will affect all those rods which are carried by the guide bar which carries, either on the right or left side thereof, the rod that has been pushed up. Thus for example if any rod in the A set is pushed up, it will result in the swinging of all the rods in the A set either to the right or to the left, that is, towards the front or the back of the apparatus. In the case of the C set, however, if say the rod with number value 1 is pushed up, it will cause the guide bar $32^c$ to slide to the right (see Figures 14 and 15) swinging all the rods which are carried by that guide bar, both those which strictly belong to the C set and those which strictly belong to the D set. If, however, the rod with number value 4 in the C set is pushed up, since this is actually carried by the guide bar $32^b$ and swings with the B set of rods, it will cause the guide bar $32^b$ to slide to the left (see Figures 11 and 12) and all the rods carried by the guide bar $32^b$ will be swung to the left. In this way the pushing up of a rod which strictly belongs to one set, for example the C set, in that it lies in the same vertical plane as the other rods which compose that set, may not bring about a swinging of that set of rods, but may result in the swinging of an adjacent set of rods. Since the effect of swinging any particular rod or set of rods is to position them where their upper ends can register with the lower ends of rods 56 when the carriage is located beneath the groups of rods 56, it will be apparent that in the manner described above a selective swinging can be effected in accordance with the results desired in respect of the transmission of impulses to and through the rods 56.

It is necessary to realize now that whereas individual and different number values as indicated above are assigned to the lower ends of the rods 34 in the sets A, B, C, D and E, at their upper ends these rods 34 have a different effective value so far as relates to their registration with and operation on rods 56 in the sets in which these rods 56 are disposed. It has been indicated already when referring to the manner in which the multiplication is performed more particularly with respect to the sum II set out above, how the partial products are built up in their representations from the numbers 1, 1, 2 and 5. It is these number values 1, 1, 2, 5 which are assigned to the sets of rods 56 and thus it may be said that when the rods 34 are swung, their upper ends acquire effective number values on a 1, 1, 2 or 5 basis according to whether the swinging of the rod set takes place towards the right or towards the left as viewed for example in Figure 6. The effective number values thus acquired by the several rods 34 when swung either to the right or to the left are indicated in the diagram in the lower part of Figure 6 by the numbers which are written either to the right or to the left of the several rods. Those numbers which are placed to the right of the rods 34 are the effective number values which the rods in question acquire at their upper ends when swung to the right, while similarly the numbers placed to the left of the rods indicate the effective number values which these rods acquire at their upper ends when swung to the left. Thus, taking for example the 2 rod in the A set, when swung to the right its upper end has an effective number value of 1 and when swung to the left it also has an effective number value of 1. In the case of the 2 rod in the B set when swung to the right this is inoperative, that is to say, its upper end will not register with the lower end of any rod 56. When swung to the left, however, this rod 34 will acquire at its upper end an effective number value of 2. Again, in the case of the C set, the number 2 rod when swung to the right will have an effective number value of 1, but when swung to the left it will be inoperative. In the case of the number 2 rod belonging to the D set but which, as indicated in the diagram in Figure 6, is carried by the guide bar 32$^c$, this rod will be inoperative when swung to the right but when swung to the left will have an effective number value of 5. Following this, it may be stated briefly here, though more fully explained later, that if the number 2 key is depressed when the carriage K is located beneath the cams on the carriage L the guide bar 32$^a$ will be swung to the left, the guide bar 32$^b$ will be swung to the left, and the guide bar 32$^c$ will be swung to the right. As a result, the upper end of the number 2 rod in the A set will have acquired an effective number value of 1, the upper end of the number 2 rod in the B set will have acquired an effective number value of 2 and the upper end of the number 2 rod in the C set will have acquired an effective number value of 1. If now when the carriage K is located beneath the rods 56, the number 2 key is again depressed for the purpose of performing the sum 2 multiplied by 2, such rods 56 will be pushed up as will give a mechanical representation of the product made up of $1+2+1=4$. Again, if the sum to be performed is 2 multiplied by 4, then owing to a 2 key having been first depressed, as mentioned above, the guide bars 32$^a$ and 32$^b$ will both have been swung to the left while the guide bar 32$^c$ will have been swung to the right. Then when the number 4 key is depressed after the carriage K has been located beneath the rods 56, it will be seen that the number 4 rod carried by the guide bar 32$^a$ will have acquired an effective number value of 1, the 4 rod on the right-hand side of the guide bar 32$^b$ will be inoperative but the 4 rod carried on the left-hand side of the guide bar 32$^b$ will have acquired an effective number value of 5, and finally the 4 rod carried by the guide bar 32$^c$ will have acquired an effective number value of 2, and as a result, such rods 56 will be pushed up as will give a mechanical representation of the product made up of $1+5+2=8$.

It will be seen that among the numbers indicating the effective number values which the rods 34 can acquire when swung as indicated in the diagram in the lower part of Figure 6, the number 6 appears associated with the number 1 and number 9 rods in the A set. It may be mentioned that this 6 is made up by two of the rods 56 being pushed up simultaneously owing to their being connected together these rods having respectively product indication or answer number values of 5 and 1. It may be noted here that while in the diagram in Figure 6 the E set is shown as comprising two rods, namely, numbers 3 and 7 only, in fact this set comprises a larger number of rods but only these two rods are effective in transmitting impulses to rods 56 above them. The other rods comprised in the set E which are not indicated in the diagram in Figure 6 are provided for the purpose of acting on cams disposed above them so as to cause a swinging of the guide bar 32$^e$ when the carriage K is located beneath the cams and for example the 2 key is depressed. In that case a number 2 rod in the E set acts on a cam and causes the guide bar 32$^e$ to swing to the right.

From the above description more particularly with reference to the diagram in Figure 6, it will be understood that while an individual rod 34 in a set has assigned to its lower end a number value which may be any number from 1 to 9, all the rods with similar number values assigned to their lower ends have at their upper ends when swung selective powers which give them effective number values of 1, 1, 2 or 5. Thus, in a sense, it may be said that the number value of a rod changes from its lower end which lies in the plane of all the other rods in the same set to another and effective number value where the upper end lies in a plane at right angles to that of the set of rods. This is clearly seen for example in connection with the number 3 rods if it is considered that where shown in elevation in the upper part of Figure 6 the lower end of this rod has the value of 3 but where the upper ends of all the number 3 rods are viewed in plan, as in the diagram in the lower part of Figure 6, these ends are so arranged that reading in a direction at right angles to the plane of any one rod set, the upper ends of the rods have selective number values 1, 1, 2 and 5, and by means of mechanical representations of these figures produced by pushing up rods 56, it is possible to indicate the product or partial product of 3 multiplied by any number from 1 to 9.

It will be convenient now to refer to the several figures indicating the detail structure and arrangement of the several sets of rods 34, their corresponding sets of cams and their corresponding sets of rods 56.

Referring first of all to Figures 7, 8 and 9, Figure 7 is a sectional elevation showing the A set of rods 56 and below it the A set of rods 34. Figure 8 is a plan of the A set of rods 34 as carried by the guide bar 32ª. Figure 9 illustrates in side elevation the A set of cams which can act on the A set of rods 34.

It should be noted that in Figure 7 there are indicated in chain lines the A set of cams so as to show their positions relative to the upper ends of the A set of rods 34 when the carriage K is located beneath the cam carriage L. Further, in this figure there are indicated in chain lines parts of certain rods 56ᵈ with specially formed lower ends in order to indicate their general relationship with the rods composing the sets on the carriage. The lower ends of certain of the A set of rods 56 are broken away and not indicated where they will clash with the chain line representation of these special rod ends. It will be appreciated that the A set of rods 56 as shown in Figure 7 actually form the last set of these rods to the right, as viewed in Figure 2, in a group such as is comprised in the z group of rods. As will be appreciated, however, from what has been said when referring to Figure 1, similar sets of rods 56 will be found in a sub-group in each main group w, x, and y and in the main group z, each such sub-group corresponding to a sub-group u.

It is desirable to interpret the constructions illustrated in Figures 7, 8 and 9 with reference to the diagram forming the lower part of Figure 6. It will be seen that all the rods 56 in the A set are practically similar and that the lower ends of two rods 56ª are disposed on either side of the upper end of each rod 34ª when the latter is in its initial or unswung position. Hence when the guide bar 32ª is swung in either direction each of the rods 34ª will have its upper end positioned where it can register with the lower end of a rod 56ª. The upper end of each rod 56ª has in effect a numerical value in that when one of these rods is pushed up by the raising of a rod 34ª, the projection of the upper end of this rod 56 beyond the upper edge of the transversely sliding bar 53ª constitutes an indication of the number value of the rod thus pushed up, this number value, or the total of the number values indicated simultaneously by several rods 56, as has been explained above, constituting the product or partial product. If for example the upper ends of all the rods 56 are provided with readable numbers corresponding to the number values of the individual rods, then when rods 56 are pushed up, it will be practicable to read the numbers on their ends and by addition if necessary arrive at the actual product or partial product of the sum performed. In the present apparatus, however, this process of addition is performed mechanically in the adding part of the mechanism which will be described hereinafter. It will suffice here, however, to state that when rods 56 have been raised so that their upper ends project beyond the sliding guide bar 53, these projecting ends are engaged by suitable mechanism which causes the guide bar 53 to slide and transmit into the adding part of the mechanism a movement which corresponds, from the point of view of number value, to the number value of the rods 56 that have been pushed up simultaneously. Thus these products or partial products indicated by the raised ends of the rods 56 are automatically fed into the adding part of the mechanism.

In the case of the A set of rods 56, each of the rods forming this set has a number value of 1. It will be seen, however, by reference to the diagram in Figure 6 that the number 1 rod 34ª in the A set when the guide bar 32ª is swung to the right, and the number 9 rod 34ª when the guide bar 32ª is swung to the left enable product indications of 6 to be given in each case when these rods 34ª push up the corresponding rods 56ª. This product indication is obtained by reason of each of these rods 56ª being interconnected with a corresponding rod in the D set of rods 56, each of such rods 56ᵈ having a product-indicating value of 5. The interconnection between these rods is such that when the rod 56ª is raised, it will also carry up with it the corresponding rod 56$^d$ in the D set thus giving a product indication of 5+1=6. The detail manner of interconnection between the rods in these two sets is shown in Figure 25, and will be referred to more particularly hereafter.

It will be seen from the above how it is possible to obtain at the upper ends of the rods 56 in the A set certain answer or product indications when the A set of rods 34 is swung to right or left as shown in the diagram in the upper part of Figure 6.

Figure 8 shows in the plan of the A set of rods 34 the disposition of these rods along the right-hand side of the sliding guide bar 32$^a$ and the manner in which the rods 34$^a$ are guided by the pins 38 fixed in the guide bar 32$^a$.

Figure 9 shows the set of cams carried on the bar 41 which cooperate with the A set of rods 34 to effect the swinging of these rods to right or left. It will be seen that there are eight of these cams 42 corresponding to and respectively operative on the eight rods 34$^a$ composing the A set. Of this set of cams 42, four of them have their inclined surfaces 43 disposed so that they will function to cause the A set of rods 34 to be swung to the right, while the other four cams have their surfaces formed so as to cause swinging of the A set of rods 34 to the left. From a consideration of these cams, it will be seen that if either of the rods 34$^a$ with number values 7, 6, 8 and 9 are pushed up when the carriage K is located beneath the cam carriage L, the A set of rods 34 will be swung to the right. Subsequently when the carriage K is located beneath the groups of rods 56 on the part M of the apparatus, if any one of the rods 34$^a$ is pushed up, it will result in a product indication value as shown in the diagram in Figure 6 by the numbers placed to the right of the rods carried by the guide bar 32$^a$. On the other hand, if either of the rods 34$^a$ with number values 2, 1, 3 or 4 are pushed up while the carriage K is located beneath the cam carriage L, the rod set A will be swung to the left. Subsequently when the carriage K is located beneath the rods 56 in the part M of the apparatus if a rod in the A set is pushed up, it will result in a product indication value through a rod 56 as shown by the numbers in the diagram of Figure 6 placed to the left of the rods carried by the sliding guide bar 32$^a$.

Turning now to Figures 10, 11 and 12, Figure 10 is a sectional elevation showing the B set of rods 56 and below it the B set of rods 34. Figure 11 is a plan of the guide bar 32$^b$ and of the rods 34 carried thereby. Figure 12 illustrates in side elevation the B set of cams which can act on the B set of rods 34. These three views are arranged in the same way as Figures 7, 8 and 9 and illustrate with respect to the sets of rods 56$^b$ rods 34$^b$ and B set of cams 42 the same features as are shown and described in connection with Figures 7, 8 and 9 in respect of the A sets.

All the rods 56 in the B set of these rods have product-indicating values at their upper ends of 1. It will be noted that in addition to there being altogether fewer rods 56$^b$ than would be required to register with all the rods 34$^b$ when swung to the right and also to the left, certain of the rods 56$^b$ are shown at their lower ends in cross-section by reason of the fact that these rods have been bent out of the general plane of the rods 56$^b$. The ends of the rods thus bent out terminate where they can register with rods 34 in the next adjacent or C set. On the other hand, there are shown in Figure 10 the lower ends of four rods 56$^c$ which are the ends of rods belonging to the C set which have been bent out of the plane of that set into the plane of the B set so that the ends of these rods 56$^c$ can register with certain of the rods 34$^b$. These rods 56$^c$ have product-indicating number values of 2. Hence it will be seen how it comes about as indicated in the diagrammatic plan in Figure 6 that when for example the B set of rods 34 is swung to the left and the rod 34$^b$ with number value 2 or the rod 34$^b$ with number value 7 is raised, the upper ends of these rods will register with the lower ends of rods 56$^c$ which can then be pushed up and give product indications of 2. Similarly product indications of 2 will be given when the B set of rods 34 is swung to the right and the rods 34$^b$ with number values 3 and 8 are raised. The remaining rods 34$^b$ when swung to the right or to the left will either give product value indications of 1 or will be inoperative to give any product value indications at all.

Since Figure 10 shows the B set of rods 34 from the left-hand side of this set, there are represented on the left-hand side of the guide bars 32$^b$ and 33$^b$ the two rods 34$^c$ having respectively number values of 4 and 6 which belong to the C set of these rods but are carried by these guide bars and swing with the B set of rods 34. In the plan of Figure 11, the two rods 34$^b$ and 34$^c$ with number value 4 and the two rods 34$^b$ and 34$^c$ with number value 6 are shown in their positions on opposite sides of the guide bar 32$^b$.

Figure 12 shows the B set of cams 42 all of which are arranged for their cam surfaces to act on the upper ends of the rods 34$^b$ when the latter are raised while the carriage K is located beneath the cam carriage L. As will be seen, certain of these cams are operative to swing the guide bar 32$^b$ with all the rods 34 carried thereby to the right while other cams are operative to swing this guide bar and these rods 34 to the left.

Referring to Figures 13, 14 and 15, Figure 13 is a sectional elevation showing the C set of rods 56 and below it the rods 34 carried by the guide bar 32$^c$. Figure 14 is a plan of the guide bar 32$^c$ and of the rods 34 carried thereby. Figure 15 is a side elevation of the C set of cams which can act on the C set of rods 34.

Here, as in the case of the B sets, there is not available the lower end of a rod 56 for registration with each and all of the rods 34ᶜ when swung both to the right and to the left. While certain rods 56ᶜ are straight throughout their length and have their lower ends disposed so that the upper ends of rods 34ᶜ can be brought into registration therewith, certain other rods 56ᶜ have their lower ends bent out of the general plane of the C set of rods 56 and this bending takes place as to some of the rods 56 so that their lower ends lie in the plane of the B set of rods 34 and as to other rods 56 so that their lower ends lie in the plane of the D set of rods 34. Yet further, Figure 13 shows the lower ends of certain rods 56ᵇ which have been bent out of the plane of the B set into the plane of the C set, and also the lower ends of certain rods 56ᵈ which have been bent out of the plane of the D set into the plane of the C set. The lower ends of all the rods thus bent out of their normal planes are guided by the lower guide bar 52ᶜ. While, as mentioned above, all the rods 56ᵇ have a product-indicating value of 1, all the rods 56ᶜ have a product-indicating value of 2, while all the rods 56ᵈ have a product indicating value of 5. Thus reading Figure 13 in conjunction with the diagrammatic plan in Figure 6, it will be seen how after the C set of rods 34 has been swung to the right and the carriage K has been located beneath the part M of the apparatus, when the rod 34ᶜ with number 9 value is pushed up it will register with and give a product indication of 2, but if then the rod 34ᶜ with number value 7 is pushed up, it will give a product indication of 1. With regard to certain of the rods 34ᶜ, such as that with number value 6, it will be noted by referring to Figure 11 that this rod is carried on the guide bar 32ᵇ with the B set of rods 34 and hence when the guide bar 32ᶜ has been moved to swing the rods 34 carried thereby, the two rods 34ᶜ which belong strictly to the C set, but are carried by the guide bar 32ᵇ will not be swung. However, after the B set of rods have been swung to the right by movement of the guide bar 32ᵇ, if the rod 34ᶜ with number value 6 is then pushed up, it will register with the end of a rod 56ᵈ belonging to the D set of those rods and there will be given a product indication of 5.

The plan of the guide bar 32ᶜ in Figure 14 shows that this guide bar carries the rods 34ᶜ with number values 2, 1, 3, 7, 8 and 9, while on the left-hand side of this rod there are carried by it rods 34ᵈ belonging to the D set and having number values 2, 4, 6 and 8.

Figure 15 shows in elevation the C set of cams 42 of which some have their cam surfaces arranged so as to act on the upper ends of rods 34ᶜ and cause the guide bar 32ᶜ to slide and swing the rods carried thereby to the right, while other cams are operative to swing this guide bar and the rods carried thereby to the left. It will be noted that there are no cam members 42 for all the rods 34ᶜ no cams being provided to act on the upper ends of the rods 34ᶜ with number values of 4 and 6 which, as already mentioned, are carried by the guide bar 32ᵇ (see Figure 11). Consequently when the carriage K is located beneath the cam carriage L if the rod 34ᶜ with number value 4 or that with number value 6 is pushed up, it will not cause any sliding of the bar 32ᵇ and swinging of the B set of rods, but coincident with the raising of the rod 34ᶜ with number value 4 or that with number value 6 there will be pushed up a rod 34ᵇ either that with number value 4 or that with number value 6 and the upper end of each of these rods can be acted on by one of the cams 42 in the B set of cams which will result in the swinging of the guide bar 32ᵇ.

Referring to Figures 16, 17 and 18, Figure 16 is a sectional elevation showing the D set of rods 56 and below it those rods 34 of the D set which are carried by the guide bar 32ᵈ. This guide bar 32ᵈ and the rods 34 carried thereby are shown in plan in Figure 17. Figure 18 is a side elevation of the D set of cams which can act on the D set of rods 34.

The rods 56ᵈ are not sufficient in number to make up a complete set but certain of the rods 34ᵈ when raised are adapted to register with the ends of rods 56 from the C set whose ends are bent into the plane of the D set and carried by the lower guide bar 52ᵈ of that set. The rods 34ᵈ having number values 4 and 6 which are actually carried by the guide bar 32ᶜ are those adapted to register with the bent ends of rods 56ᶜ when the guide bar 32ᶜ is swung respectively to the right and to the left. All the rods 56ᵈ have product-indicating values at their upper ends of 5. It will be seen by reference to the diagram in Figure 6 that the D set of rods 34 actually comprises a complete set having separate number values assigned to their lower ends in respect of all numbers from 1 to 9 inclusive. This is the only set of rods 34 which includes one whose lower end has a number value assigned to it of 5. It will be seen that in the D set of rods 56 there are two of these rods whose lower ends are formed with double projections thus differing from any of the other rods in this or in other sets. The double end of each of these rods is constituted by a horizontal part 58 on the lower end of the rod 56 and two downwardly directed projections therefrom adapted to engage separate but adjacent rods 34ᵈ. These two rods with specially formed double ends are also provided at one side of the part 58 with laterally projecting pins 59 whose ends lie over and are adapted to engage laterally projecting pins 59' on two of the rods 56 in the A set of these rods. These pins are shown in Figures 25 and 36 and they are so arranged that when these particular rods 56$^a$ are pushed up, they will carry with them the corresponding rods 56$^d$ and thus give a total product-indicating value of $1+5=6$. On the other hand, the rods 56$^d$ which have the double ends 58 can be pushed up separately by a rod 34 in the D set when a product-indicating value of 5 only will result.

Figure 17 shows the rods 34 of the D set which are carried by the sliding bar 32$^d$, these rods being five in number, the remainder of the rods 34$^d$ being carried as already indicated by the sliding bar 32$^c$.

Figure 18 shows in side elevation the cam members 42 of the D set. It will be seen from this figure that no cams in this set are provided to act on the rods 34$^d$ with number values 2 and 8 but, as will be appreciated, these cams are not necessary since if the rods 34 in the C set with number values 2 and 8 are pushed up, their upper ends will act respectively on cams 42 in the C set and effect sliding of the guide bar 32$^c$ either to right or to the left and a swinging of all the rods 34$^c$ and 34$^d$ which are carried by this guide bar. One of the cams in the D set namely that which acts on the upper end of the rod 34$^d$ with number value 5, functions to cause the guide bar 32$^d$ to slide to the right. Four of these cams, namely those which act on the upper ends of the rods 34$^d$ with number values respectively of 1, 3, 7 and 9, function to cause the guide bar 32$^d$ to slide to the left. The remaining two cams act on the rods 34$^d$ with number values respectively of 4 and 6 which are carried by the guide bar 32$^c$ (see Figures 13 and 14). These two cams function therefore to cause sliding of the guide bar 32$^c$ either to the right or to the left.

Referring to Figures 19, 20 and 21, Figure 19 is a sectional elevation showing the E set of rods 34 and the lower ends of such rods 56 as are adapted to be engaged by the rods 34$^e$. Figure 20 is a plan of the guide bar 32$^e$ showing the rods 34$^e$ carried thereby. Figure 21 is a side elevation of the E set of cams.

It will be seen from Figure 19 that there is no set of rods 56 in the part M of the apparatus corresponding to or lying in the plane of the E set of rods 34 on the carriage K. The only rods 56 with which the upper ends of rods 34$^e$ can register are two rods 56$^d$ the ends of which have been bent out of the plane of the D set of those rods into the plane of the E set of rods 34. The ends of these two rods 56$^d$ are adapted to be pushed up respectively by the rods 34$^e$ with number values 3 and 7 when the latter have been swung either to the right, to effect registration of the upper end of the rod 34$^e$ with number value 3, or to the left to effect registration of the upper end of the rod 34$^e$ with number value 7. Though there are only these two rods 56$^d$ on which the upper ends of the rods 34$^e$ can act, nevertheless the E set of rods 34 comprises eight of these rods having the several number values 1 to 9 inclusive but excluding 5. Figure 20 shows all these rods 34$^e$ carried on the right-hand side of the guide bar 32$^e$.

The elevation in Figure 21 illustrates the E set of cams from which it will be seen that cam members 42 are provided in respect of all the rods 34$^e$. Consequently, while the carriage K is located beneath the cam carriage L, if any one of the rods 34$^e$ is pushed up, its upper end will be acted on by a cam 42 and the guide bar 32$^e$ will be caused to slide and the set of rods 34$^e$ to be swung either to the right or to the left, certain of the cams being arranged to effect right swinging and other cams to effect left swinging.

Reference will be made now to the series of vertical sectional elevations comprised in Figures 22 to 39. These sectional elevations are taken on lines lying in various planes at right angles to the plane of the paper in Figures 7, 10, 13, 16 and 19 and pass transversely through the sets of rods shown in these figures and comprised in one of the unit sub-groups of rods 56 in the part M of the apparatus and in one of the unit sub-groups of rods 34 on the carriage K when the latter is located beneath the part M of the apparatus. Figure 22 is a section taken on the broken line 22—22 indicated in Figure 10 while the section Figure 23 is taken on the broken line 23—22 indicated in Figure 10. The arrows indicate the direction in which the parts are viewed in these sections, namely, from the front of the machine, that is, from the right-hand side in Figure 10. These two sectional views Figures 22 and 23 constitute a pair the lower part of each view showing the same set of rods 34, namely, all those having the number value 2. The upper parts of the sections show the rods 56 with which the upper ends of the rods 34 with number values of 2 can be caused to register when these rods 34 are swung either to the left or to the right. Thus Figure 22 shows the rods 34 with number value 2 as when swung to the left with their upper ends adapted to register with certain rods 56 which are shown in the upper part of the figure. Figure 23 illustrates the same rods 34 with number value 2 when these rods have been swung to the right and their upper ends are positioned to register with the lower ends of certain rods 56 which are indicated in the upper part of this figure.

The succeeding figures are arranged to constitute similar pairs taken on similar broken section lines but for the sake of clearness and to prevent confusion in Figure 10 or in the other similar figures, these section lines are not indicated. It will be appreciated, however, that the section lines fall in the same way as the section lines 22—22 and 23—22, but are placed so that the lower portions of each pair of figures indicate successively the rods 34 having different number values. Thus Figures 24 and 25 show in the lower part of each figure the rods 34 having the number value 1 and in the upper part of the figures are illustrated the rods 56 with which these rods 34 can register when they are swung respectively to the left or to the right. Figures 26 and 27 show in each figure the rods 34 having the number value 3 and in the upper part of the figures are illustrated the rods 56 with which these rods 34 can register when they are swung respectively to the left or to the right. Figures 28 and 29 show in each figure the rods 34 having the number value 4 and in the upper part of the figures are illustrated the rods 56 with which these rods 34 can register when they are swung respectively to the left or to the right. Figures 30 and 31 show in each figure the rods 34 having the number value 7 and in the upper part of the figures are illustrated the rods 56 with which these rods 34 can register when they are swung respectively to the left or to the right. Figures 32 and 33 show in each figure the rods 34 having the number value 6 and in the upper part of the figures are illustrated the rods 56 with which these rods 34 can register when they are swung respectively to the left or to the right. Figures 34 and 35 show in each figure the rods 34 having the number value 8 and in the upper part of the figures are illustrated the rods 56 with which these rods 34 can register when they are swung respectively to the left or to the right. Figures 36 and 37 show in each figure the rods 34 having the number value 9 and in the upper part of the figures are illustrated the rods 56 with which these rods 34 can register when they are swung respectively to the left or to the right. Figures 38 and 39 show in each figure the rods 34 having the number value 5 and in the upper part of the figures are illustrated the rods 56 with which these rods 34 can register when they are swung respectively to the left or to the right.

At the bottom of all the sections the letters A, B, C, D and E are placed so as to indicate the several sets of rods 34. At the upper ends of the rods 56 are set out the product-indicating values of the upper ends of these rods.

It will be convenient to refer briefly to these figures in pairs as mentioned above and to comment on certain features more particularly shown therein. Referring to Figures 22 and 23, it will be seen here how in the one case the lower end of a rod $56^c$ is bent out of its normal plane so as to lie in the plane of the rod 34 in the B set so that when this rod has been swung to the left and is pushed up, it will cause a product-indicating value of 2. On the other hand, when the rods 34 with number value 2 are swung to the right and the rod in the C set is pushed up, its end will register with the lower end of a rod $56^b$ which has been bent out of the plane of the B set of those rods into the plane of the C set and as a result a product-indicating value of 1 will be obtained. It will be seen also that when the rods 34 shown in these sections have been swung to the left, those rods in the C and E sets when pushed up will cause no product indication. Similarly when these rods are swung to the right those rods 34 which lie in the B, D and E sets when pushed up will give no product indications. It will be apreciated that when the number 2 key 11 is depressed, all the rods 34 with number value 2 which are indicated in Figures 22 and 23 will be pushed up by the knife 20 which lies below them. Assuming that while the carriage K was located beneath the cam carriage L such swinging of the sets of rods 34 was effected as to cause all those rods 34 with number 2 value to be swung to the left which will then find rods 56 with which they can register, then when the carriage K is located beneath the part M of the apparatus and the number 2 key is depressed, all the three rods $56^a$, $56^c$ and $56^d$ shown in the upper part of Figure 22 will be pushed up and will give a product-indicating value of $1+2+5=8$. In the same way, if a swinging to the right has been effected of the rods 34 with number 2 value and subsequently the number 2 key is depressed, the two rods $56^a$ and $56^b$ shown in Figure 23 will be pushed up and will indicate a product value of $1+1=2$.

Referring to Figures 24 and 25, which show in their lower portions the rods 34 with number value 1, it will be seen that when swung to the left the rods in the sets A, B and C can function to push up three rods $56^a$, $56^b$ and $56^c$ so as to indicate a product value of $1+1+2=4$. The rods in the D and E sets will then be inoperative. When the rods 34 are swung to the right and pushed up, the two rods $56^a$ and $56^d$ will be pushed up and will give an indication of a product value of $1+5=6$. Here if owing to selective swinging the rod 34 with number value 1 in the A set has been swung to the right but the corresponding rod 34 in the D set has not been swung or has been swung to the left and the rods with number value 1 are pushed up owing to depression of the number 1 key, then the two rods $56^a$ and $56^d$ will both be pushed up and a product value of 6 will be indicated by reason of the interconnection between the rods $56^a$ and $56^d$ by means of the pins 59 and 59'. This is how the product indication of 6 is obtained which was referred to in describing the diagram in Figure 6. As already explained, however, the rod $56^d$ can be pushed up independently of the rod $56^a$.

Referring now to Figures 26 and 27, these show the rods 34 with number value 3 and by swinging these to the left it is possible to obtain a product value indication of 1+1=2. Of the rods in question those in the B, D and E sets are then inoperative while the rod in the C set registers with the end of the rod 56$^b$ which is bent out of its normal plane into the plane of the C set. In Figure 27 the rods 34 with number value 3 are shown as when swung to the right when a total product value indication could be obtained of 1+2+5+5=13. Such a total product indication would, however, only be obtainable if it can be derived from viewing the ends of the rods 56 that have been pushed up and enumerating their several product values. This is not done in the present machine since product values are in fact indicated or transmitted into the adding part of the apparatus by the sliding of guide bars 53 which is caused, in the manner described subsequently, by applying a horizontal force to the ends of the rods 56 which have been pushed up and caused to project beyond the bars 53. Consequently if, as in this case, two rods 56 will have been pushed up in the D plane, whereof the product indicating value is 5, the actual product indication will merely be a single 5 due to the sliding of the guide bar 53$^d$. Thus it comes about that in the machine more particularly described here a total partial product value indication higher than 9 is not obtainable by the simultaneous sliding of the guide bars 53 in respect of the sets A, B, C, D and E. Moreover, referring to what is shown in Figure 27, it is not actually possible in this machine to swing simultaneously to the right all the rods 34 with number value 3. By selective swinging, however, various product value indications, such for example as 1+2+5=8 can be obtained here. Here it will be seen that each of the rods 34 except that in the C set will register with the lower end of a rod 56. The rod 34 in the B set can register and push up the end of a rod 56$^c$ which is bent into the plane of the B set. The upper end of the rod 34 in the E set can register with the lower end of a rod 56$^d$ which is bent out of its normal plane into that of the E set. The rod 34 in the D set can also push up a rod 56 in the D set since the upper end of this rod 34 is here positioned to register with one of the two projections from the cross piece 58 on the end of a rod 56$^d$, as will be seen by reference to Figure 16.

Referring to Figures 28 and 29, these illustrate the results obtained by swinging the rods 34 with number value 4. When these rods are swung to the left and pushed up, a product value of 5+1=6 is indicated as shown in Figure 28. This is obtained by means of the rods 34 in the A and C sets respectively which are adapted to register with two rods 56$^a$ and 56$^d$ the lower end of the latter being bent out of its normal plane into the plane of the C set. The rods 34 in the B, D and E sets are here inoperative. When these rods 34 are swung to the right and pushed up a product value of 1+1+2=4 will be indicated by pushing up the rods 34 in the A, B and D sets when they will act on the lower ends of rods 56$^a$, 56$^b$ and 56$^c$ the lower end of the latter being bent out of its normal plane into the plane of the D set. The rods 34 in the C and E sets will then be inoperative.

Referring to Figures 30 and 31, these show the product-indicating values that can be obtained by swinging the rods 34 with number value 7. When these rods are swung to the left, a product value of 1+2+5=8 is obtainable while when swung to the right a product value of 1+1+5=7 can be obtained. The manner in which certain rods have their lower end bent out of their normal planes is clearly shown.

Referring to Figures 32 and 33, these illustrate the effects of swinging the rods 34 with number value 6. When swung to the left, it is possible for these rods to obtain a product indication of 1+1+2=4, while when swung to the right a product indication of 1+5=6 is given.

Referring to Figures 34 and 35, these illustrate the effects of swinging the rods 34 with number value 8. When swung to the left, it is possible with these rods to obtain a product indication of 1+1=2, while when swung to the right a product indication of 1+2+5=8 can be given. It will be noted in Figure 35 that the rod 34 in the D set when swung to the right will register with one of the projections from the cross piece 58 which is carried on the end of a rod 56$^d$, see Figures 13 and 16.

Referring to Figures 36 and 37, these illustrate the effects of swinging the rods 34 with number value 9. When swung to the left only one rod, namely that in the A set, will register with a rod 56 and this would normally tend to give only a product indication of 1. However, since this rod 56$^a$ is provided with the laterally projecting pin 59' which engages with the pin 59 projecting laterally from the cross piece 58 of a rod 56$^d$, this latter rod will also be lifted so that the resultant product indication will be 1+5=6. It will be seen by comparing this figure with Figure 16 that the upper end of the rod 34 in the D set lies between but does not register with the double ends of the rod 56$^d$ which project from the cross piece 58. A portion of this cross piece is shown in section in Figure 36 together with the laterally projecting pin 59 carried thereby. When the rods 34 with number value 9 are swung to the right, it will be seen from Figure 37 that the rods 34 in the sets A, B and C register respectively with rods 56ª, 56ᵇ and 56ᶜ, while the rod 34 in the D set can now register with one of the ends projecting from the cross piece 58 of a rod 56ᵈ. Thus a product indication will be given here of 1+1+2+5=9.

Referring to Figures 38 and 39, these illustrate the effects of swinging the rod 34 with number value 5, there being only one such rod which is operative on rods 56 and this rod 34 is carried by the guide bar 32ᵈ and forms one of the D set of rods 34. (See diagram in Figure 6 and Figures 16 and 17.) When this rod 34 is swung either to the left or to the right, it registers in each case with a rod 56ᵈ which will give a product indication of 5.

It will be understood that while it is possible to obtain the indication of product value totals as shown and described in connection with Figures 22 to 39 when all the rods 34 having similar number values are swung either to the right or to the left, the effect of a selective swinging of these rods 34 which takes place when keys are depressed at the time when the carriage K is located beneath the cam carriage L will be such as to give various other product value totals by suitable combinations of 1, 1, 2 and 5. Thus referring, for example, to Figure 22, the selective swinging may be such that certain of the sets of rods 34 may be swung to the left and others to the right or while some of them are swung either to the right or to the left, others may not have been swung at all. By reading Figures 22 to 39 with Figures 7, 10, 13, 16 and 19 in conjunction with the diagram in Figure 6, it is possible to see the various combinations in the selective swinging that take place when the several number keys are depressed first to effect the selective swinging when the first factor in the sum to be performed is fed in and secondly when a key is depressed to feed in the second factor and as a result impulses are transmitted to and through the rods 56 in the part M of the apparatus.

Having thus described the arrangement of the sets of rods 34 on the carriage and the sets of rods 56 which function in respect of units, reference will be made to Figures 40 to 67 which illustrate the sets of rods 34 on the carriage K and the sets of answer-presenting rods in the part M of the apparatus which function in respect of tens.

Certain general features may be noted here with respect to the tens carriage rods and answer-presenting members. As in the case of those rods which function with respect to units, so those which function in respect of tens are similar and function similarly in so far as relates to a complete sub-group of tens whether in the case of the carriage rods 34 this sub-group lies in the unit main group or in the tens main group, or in the case of the answer-presenting members whether this tens sub-group lies in a main group $w$, $x$ or $y$, or in the group which constitutes the $v$ group of answer-presenting members (see Figures 1, 2 and 4). Thus the following description and the views of Figures 40 to 67 herein referred to may be regarded as applicable equally to any one of these tens sub-groups.

Referring first to Figure 40, the upper part of this figure shows in sectional elevation a specimen set of rods 34 as mounted on the carriage K and functioning in respect of tens. These sets of rods 34 are arranged and can be swung by the horizontal sliding of guide bars 32 in the same way as the similar sets of rods 34 which function in respect of units, the sets when swung either to the left or right being retained in the manner already described. The rods 34 in each set are assigned individual and separate number values, in the same way as the rods 34 which function in respect of units, the order of the numbers assigned to these rods being also the same as with the rods 34 which function in respect of units, namely, 2, 1, 3, 4, 7, 6, 8, 9, 5. It is to be noted, however, that in this case there is no rod 34 to which the number 1 is assigned but, with two exceptions, each set of tens rods 34 comprises a complete set of such rods with number values 2 to 9 inclusive, the remaining sets being complete sets with number values from 3 to 9 inclusive. All these rods are spaced apart along the guide bars 32 and 33 in the same way as the rods 34 which function in respect of units, but with a corresponding interval left where the number 1 rod would come if it were provided and a similar space where the number 2 rod would come in those sets where this rod is omitted. Further, in contra-distinction to the arrangement of the rods 34 which function in respect of units, the rods 34 which function in respect of tens and form a set are all carried on the same side, that is to say, the right-hand side of the pair of guide bars 32, 33, the latter guide bar being fixed while the guide bar 32 can slide in the direction of its length.

There are five sets of these rods 34 which will be referred to respectively by the letters F, G, H, I and J, as indicated in the diagram in the lower part of Figure 40. These letters are used also to designate the several planes in which the sets of rods 34 lie and function. In the diagram in Figure 40 the guide bars 32ᶠ, 32ᵍ, 32ʰ, 32ⁱ, 32ʲ which respectively carry the F, G, H, I and J sets of rods 34, are indicated by lines with the rods 34 shown also by lines on the right-hand sides of the several guide bars. As in the diagram in Figure 6. so in the diagram in Figure 40, there is placed either to the left or to the right-hand side of each rod 34 a number which indicates the value of the product indication that can be obtained after a rod 34 has been swung either to the left or to the right and when the carriage K has been located beneath the product-indicating members and an impulse is transmitted to such members by pushing up a rod 34. Certain brackets in this diagram signify interlocking or cross-connections between rods 34 in the several sets, while arrows indicate that certain rods 34 when swung are adapted to register with the ends of or with parts connected to certain product-indicating members which lie in other vertical planes. These features in the diagram will be elucidated in the course of the following description.

Referring to Figure 41, this shows in elevation the F set of rods 34 on the carriage K and the set of answer-presenting or product-indicating members which are disposed in the part M of the apparatus above the F set of rods 34 and in the same plane as that set when the carriage K is located beneath the part M of the apparatus. These product-indicating rods 66$^f$ are carried towards their lower ends by a guide bar 62$^f$ which is fixed, and towards their upper ends by a guide bar 63$^f$ which can slide in the direction of its length. The arrangement is the same as that already described with respect to the rods 56 which function for units and are carried by the guide bars 52 and 53.

It may be noted here that there are five sets of product-indicating rods 66 which, as to the main parts of these rods, lie in five planes corresponding to the five planes in which lie the carriage rod sets F, G, H, I and J. The disposition of these rods 66 in these five planes is shown in the cross-sectional elevations Figures 52 to 67 which will be referred to more particularly hereafter. It will be seen from these figures, however, that at their upper ends the rods 66 have product-indicating values in accordance with the planes in which these rods lie these product-indicating values for the sets lying in the several planes being as follows:—

For the set F a product-indicating value of 1.
For the set G a product-indicating value of 1.
For the set I a product-indicating value of 2.
For the set J a product-indicating value of 5.

These values are marked in Figures 52 to 67 above the several sets of rods 66. With regard to the H set of rods 66, the effective product-indicating value of these is 2 but inasmuch as the arrangement of the upper ends of these rods with respect to the guide bar properly belonging to this set differs from that of the other rods 66 in a manner which will be described hereafter, a blank is shown above the plane of the H set.

From Figure 41, which shows the F set of rods, it will be seen that all the rods 66$^f$ with the exception of one are plain straight rods the lower end of each of which is adapted to register with one of the rods 34$^f$ on the carriage K when these rods 34$^f$ are swung either to the left or to the right. One of the rods 66$^f$ is provided towards its lower end with a cross piece 68$^f$ from which extend downwards two projections either of which may register with the upper end of the rod 34$^f$ with number value 8. This cross piece 68$^f$ carries a laterally projecting horizontal pin 70 which extends from the left-hand side of the cross piece through the planes of all the other sets G, H, I and J. This pin 70 is adapted to be engaged by specially formed parts of rods 66 in other sets so that when either of these rods is raised, the rod 66$^f$ which actually carries the pin 70 will be pushed up also thus adding a product indication of 1 to whatever product indication may be obtained by pushing up the rod in the other set.

Towards the lower end of one of the rods 66$^f$ is a laterally projecting lug 69' adapted to be engaged by a corresponding projection 69 on a rod 66 in the next adjacent or G set. (See Figure 58). These rods 66$^f$ and 66$^g$ which can thus be interlocked are adapted to register with the upper ends of either a rod 34$^f$ or a rod 34$^g$ with number value 7 when either the F set or the G set of rods has been swung to the left. The arrangement permits either the rod 66$^f$ with the lateral projection 69' to be pushed up by itself or when the rod 66$^g$ with the lateral projection 69 is pushed up, it will carry with it also the interlocked rod 66$^f$ thus giving a product indication of 1+1=2.

The set of rods 34$^f$ on the carriage K have what may be described as a normal construction and arrangement, a complete set of these rods being provided having separate number values at their lower ends of from 2 to 9 inclusive. There is no rod with number value 1.

Figure 42 shows in elevation the bar 41 mounted on the cam carriage L on which are disposed the cam members 42 adapted to cooperate with the rods 34 in the F set in order to effect the swinging of these rods to left or right. When the carriage K is located beneath the cam carriage L, the cams shown in Figure 42 will lie above and in the same plane as the rods 34$^f$. The cams 42 in this F set are three in number of which two are adapted to act on the upper ends of the rods 34$^f$ with number values 2 and 3 and cause swinging of the F set of rods 34 to the right, while the third cam 42 is adapted to act on the upper end of the rod 34$^f$ with number value 5 and cause swinging of the F set of rods 34 to the left.

Referring to Figure 43, this shows in elevation the G set of rods 66 in the part M of the apparatus and the corresponding set of rods 34 mounted on the carriage. Of the rods 66$^g$, eight have straight lower ends adapted to register with the upper ends of the rods 34$^g$ when swung either to the left or to the right. Four of these eight rods 66$^g$ are of simple construction and call for no further comment. Of the remainder, two have fixed to them by laterally projecting pins or studs 71 short rod-like members 76ᵍ which lie in the plane of the next adjacent rod set H. (See Figure 45). The lower ends of these short rods 76ᵍ are adapted to register with the upper ends of the rods 34 with number values 2 and 4 in the H set of these rods when this H set is swung either to the left or to the right. Thus when the H set is swung and either the number 2 or the number 4 rod 34ʰ is pushed up, a short rod 76ᵍ will be pushed up and as a result a rod 66ᵍ will be pushed up giving a product indication at its upper end of 1. Each of the other two straight rods 66ᵍ is provided with a laterally projecting lug or pin 69′ adapted to engage with a corresponding laterally projecting lug or pin 69 on a rod 66 in the next adjacent or H set. (See Figures 63 and 65). These lugs allow these rods 66ᵍ to be pushed up alone, but if a corresponding rod in the H set is pushed up, it will carry with it and push up also a rod 66ᵍ. Of the remaining rods 66ᵍ two have their lower ends bent out of the G plane into the H plane, the ends of these two rods being adapted to register respectively with the rods 34ʰ with number values 3 and 4 when the H set of rods 34 is swung either to the right or to the left. (See Figure 45). Another rod 66ᵍ has its lower end similarly bent out of the G plane into the H plane the end of this rod being adapted to register with the upper end of the rod 34ʰ with number value 3 when the H rod set is swung to the left. (See Figure 45). The end of this rod 66ᵍ is provided with a lateral lug or pin 69′ adapted to be engaged by a corresponding lateral pin 69 on a rod 66 in the I set. (See Figure 62). By this means, while this rod 66ᵍ can be pushed up by itself, on the other hand, if the corresponding rod 66ⁱ is pushed up, it will carry with it the rod 66ᵍ. Finally, there is one rod 66ᵍ whose end is bent out from the G plane into the H plane and this end is provided with a cross piece 68ᵍ with two downwardly directed projections either of which is adapted to register with the upper end of the rod 34ʰ with number value 5. (See Figure 45).

One of the rods 66ᵍ, namely, that which as seen in Figure 43 stands second from the left-hand end, has its lower end bent out from the G plane into the H plane but the actual end of this rod lies where there is no rod 34 whose upper end can register therewith. It would thus register with a rod 34ʰ with number value 1 if such a rod was provided which, however, is not the case as will be seen in the elevation of the H set of rods 34 in the lower part of Figure 45. There is attached to the end of this rod 66ᵍ by lateral studs or pins 71 a short rod-like member 86ᵍ which lies in the plane of the I set. The width of this short rod member 86ᵍ is double that of the lower end of a normal rod 66. (See Figure 47.) This short rod 86ᵍ is positioned where it can register with the upper end of the rod 34 with number value 3 in the I set when this set is swung to the left. The lower end of this rod 66ᵍ and the attached short rod 86ᵍ are also shown in Figure 53. This arrangement enables the rod 34ⁱ to push up a rod in the G plane and give a product indication value of 1. The G set comprises a complete set of rods 34 with number values from 2 to 9 inclusive.

In Figure 44 there is shown an elevation of the G set of cams 42. These are four in number, two being arranged to cause sliding of the guide bar 32ᵍ and consequent swinging of the rods 34ᵍ carried thereby to the left while two cams 42 operate to effect swinging of the rods 34ᵍ to the right. These cams act respectively on the upper ends of the rods 34ᵍ with number values 3, 7, 6 and 9.

Turning to Figure 45, this shows the H set of product-indicating rods 66 and the corresponding set of rods 34 on the carriage K. There are only five rods 66ʰ of full length in this set and all these rods have normal straight lower ends. At their upper ends, in place of these rods being guided by pins which project laterally from the left-hand side of the sliding guide bar 63ʰ, they are guided by pins 73ⁱ which project from the right-hand side of the guide bar 63ⁱ which serves primarily to guide the upper ends of the rods 66ⁱ which belong to and lie in the plane of the I set. (See Figure 47.) These pins 73ⁱ are shown in section in Figure 45 as the plane of this sectional elevation lies just on the right-hand side of the guide bar 63ⁱ shown in Figure 47. By reason of this arrangement, it is possible to cause the bar 63ʰ to slide in the direction of its length by other means than by applying a horizontal force which acts on the projecting end of a product-indicating rod 66 guided by this bar as in the case of the other bars 63 and 53. On the other hand, when one of the upper rods 66ʰ has been pushed up and its end caused to project, a device engaging this projecting end and exerting a horizontal force will result in the guide bar 63ⁱ being caused to slide in the direction of its length while the bar 63ʰ is not moved. This elucidates the blank in respect of the H plane in the product value indications given at the top of Figures 52 to 67. In effect, no product value indication derived from impulses transmitted by rods 34ʰ to rods 66ʰ, that is to say, rod members in the H plane, can result in a sliding movement of the bar 63ʰ for the purpose of transmitting a product value. The sliding of the bar 63ʰ is effected as and when the rod 53ᵇ is caused to slide in connection with the B unit set of product-indicating rods 56, (see Figure 10), these two guide bars 53ᵇ and 63ʰ being connected by a horizontal transverse bar 80. In addition to the lower ends of the straight rods 66ʰ, there lie in the H plane where they can register with the upper ends of the rods 34ʰ the bent in ends of sundry rods 66ᵍ and the two short rod members 76ᵍ which are attached to rods 66ᵍ as shown in Figure 45 and as already described in connection with the G set.

Figure 46 shows the cams 42 for the H set these cams being four in number and adapted to act on the upper ends of the rods 34ʰ with number values 4, 8, 9 and 5. By means of these cams, swinging of the rods 34ʰ is effected either to the left or to the right.

Turning to Figure 47, this shows the I set of product-indicating rods 66 and the corresponding set of rods 34 on the carriage K. Of the rods 66ⁱ, only one, namely that which is adapted to register with the upper end of the rod 34ⁱ with number 6 value when swung to the left, can be said to be of normal formation since this is a straight rod of narrow width at its lower end. Five of the rods 66ⁱ have their lower portions bent out from the plane of the I set into the plane of the J set. (See Figure 50). The particular formation of the ends of these rods will be described when referring hereunder to the J set. Of the other rods 66ⁱ, there are three provided with broad lower ends 72ⁱ these ends being practically double the width of the end of a normal straight rod. By reason of this extra width, it is possible for the ends of these rods to register with the upper ends of two adjacent rods 34ⁱ when swung respectively to right and left. Thus for example, the second rod 66ⁱ from the left as viewed in Figure 47 has its lower end 72ⁱ arranged so that it may be engaged by the upper end of either the rod 34ⁱ with number value 3 when swung to the right or the rod 34ⁱ with number value 4 when swung to the left. The broad end 34ⁱ of one of these rods 66ⁱ which lies between and can register with the upper ends of either of the rods 34ⁱ with number value 6 or 8 is formed with two lugs one of which 74ⁱ is directed towards the left and is conveniently of rectangular form, while the other 75ⁱ is directed towards the right and has a horizontal upper edge with an inclined lower edge. The pin 70ᶠ which is carried by the horizontal part 68ᶠ of one of the rods 66 in the F set (see Figure 41) lies over this lug 75ⁱ so that when this rod 66ⁱ is raised, it will carry with it the rod 66ᶠ and thus give a product value indication of 2+1=3, since the product-indicating value of the upper end of each of the rods 66ⁱ is 2, while the corresponding value of each of the rods 66ᶠ is 1. Beneath the lug 74ⁱ lies a pin 79ⁱ which is carried by the end of the rod 66ⁱ, the main portion of which is shown as appearing in Figure 47 above the lug 74ⁱ, the end of this rod 66ⁱ being bent out into the J plane (see Figures 50 and 60a). The disposition of this rod will be more particularly described when referring to the J set, but it will be apparent that when this rod is pushed up by means of a rod 34 in the J set, it will carry with it the rod 66ⁱ on which are formed the lugs 74ⁱ and 75ⁱ and the latter lug will in turn cause the rod 66ᶠ to be pushed up which carries the pin 70ᶠ. It is to be noted further that on the right-hand side of the broad end 72ⁱ which has the lugs 74ⁱ and 75ⁱ there is the lateral lug or pin 69 which lies under the lug 69′ on the rod 66ᵍ which has its end bent into the H plane. (See Figures 45 and 62). In the I set there is a rod 66 which is provided towards its lower end with a cross piece 68ⁱ with two downwardly directed projections adapted to be engaged by the upper end of the rod 34ⁱ with number value 5 whether this rod is swung to the right or to the left. In the I plane there lie also the ends of short rod members connected to rods which themselves belong to other sets of rods 66. One of these is the short rod of double width 86ᵍ attached by pins 71 to the end of a rod 66ᵍ which is bent out of the G plane into the H plane (see Figure 45). This short rod of double width 86ᵍ is adapted to register with the rod 34ⁱ with number value 3 when swung to the left. Another of such short rod members is that 76ʲ attached by pins 71 to a rod 66 in the J set, both this short rod 76ʲ and the rod 66ʲ which carries it being adapted to register with the upper ends respectively of rods 34ⁱ and 34ʲ with number value 7 when swung to the right. (See Figures 50 and 59). Finally there is the end of a rod 66 which is bent into the I plane out of the J plane. This rod 66ʲ has on its end a cross piece 68ʲ with two downwardly directed projections one of which 72ʲ is of double width. These projections lie on either side of and can register with the upper end of the rod 34ⁱ with number 9 value when swung either to right or left, while the projection 72ʲ can also register with the upper end of the rod 34ⁱ with number 8 value.

Figure 48 is a plan of the guide bar 63ⁱ which carries not only on its left side the upper ends of the rods 66ⁱ but also on its right side the upper ends of the five rods 66ʰ the latter being guided by the pins 73ⁱ (see Figure 45). From Figure 48 it will be seen clearly how when a rod 66ʰ has been pushed up and its upper end has been engaged and a horizontal force applied thereto, the guide bar 66ⁱ will be caused to slide to the left in the same way as will result when a rod 66ⁱ has been pushed up and its upper end engaged and a horizontal force applied thereto.

Figure 49 shows the cams 42 in the I set. These are only two in number adapted to act respectively on the upper ends of the rods 64ⁱ with number values 6 and 8 and cause the I set of rods 34 to swing to left or to right.

Referring to Figure 50, this shows the J set of product-indicating rods 66 and the corresponding set of rods 34 on the carriage K. There are only five rods 66ʲ whose upper ends are carried by the guide bar 63ʲ and two of these rods are of normal straight structure. One of them, however, namely that adapted to register with the upper end of the rod 34ʲ with number value 7 when swung to the right, carries attached thereto by pins 71 the short rod 76ʲ of normal width which lies in the I plane and is adapted to register with the upper end of a rod 34ⁱ with number value 7 when swung to the right. Two of the rods 66ʲ have their ends 72ʲ of double width. One of these lies between and can register with the upper end of either the rod 34ʲ with number 6 value or that rod with number 8 value according as the J set of rods 34 is swung to the right or to the left. The other rod 66ʲ with end 72ʲ of double width can register with either of the rods 34ʲ with number 8 or number 9 value and is provided with a lug 75ʲ which projects towards the left and has a horizontal upper edge and an inclined lower edge. This lug 75ʲ lies beneath and can engage the pin 70ᶠ which is carried by one of the rods 66ᶠ so that the latter will be raised when this rod 66ʲ is pushed up. The remaining rod 66ʲ has its end bent out into the I plane and is provided with a cross piece 68ʲ with two downwardly directed projections as already described and shown in Figure 47. In the J plane there lie and are guided by the bar 62ʲ the ends of several rods 66ⁱ. Taking these in order from the left towards the right, there is first the end of one of these rods 66ⁱ which is of normal narrow width and is adapted to register with the upper end of the rod 34ʲ with number 3 value when swung to the left. Then come the ends of two rods 66ⁱ each of which 72ⁱ is of double width so that it can be engaged by either of two rods 34ʲ according as the J set of these rods is swung to right or left. Further, along the guide bar 62ʲ comes the specially formed end 78ⁱ of a rod 66ⁱ. This end is formed of narrow width and arranged so as to register with the upper end of the rod 34ʲ with number value 6 when swung to the left. This end 78ⁱ also carries a laterally projecting pin 79ⁱ which, as will be seen in Figure 47, lies beneath the lug 74ⁱ on the end 72ⁱ of one of the rods 66ⁱ. By this means when the rod 34ʲ with number 6 value has been swung to the left and is pushed up, it will lift two rods 66ⁱ, one of which lifts also by the lateral lug 69 a rod in the G set and by the lug 75ⁱ and pin 70ᶠ a rod in the F set. The fact that two rods in the same set I are pushed up simultaneously is immaterial, but the arrangement permits of a rod 66 in the I set to be pushed up by the rod 34 with number 6 value in the J set when this set is swung to the left, while when this set is swung to the right, the same rod 34ʲ with number 6 value will register with a rod 66ʲ. Finally, towards the extreme right-hand end of the guide bar 62ʲ there lies the end of a rod 66ⁱ which is provided with a cross piece 68ⁱ with two downwardly directed projections adapted to register with the upper end of the rod 34ʲ with number 5 value when the J set is swung either to the right or to the left.

Figure 51 shows the cams 42 comprised in the J set. These cams are only two in number adapted to act on the upper ends respectively of the rods 34ʲ with number values 7 and 9 and to cause the J set of these rods 34 to be swung to the left or to the right.

Reference will be made now to the series of vertical sectional elevations comprised in Figures 52 to 67. These views correspond to and the sections are taken in a similar way to those comprised in Figures 22 to 39 described above but whereas those figures illustrated the product-indicating members whose function was in respect of units, Figures 52 to 67 show the product-indicating members which function in respect of tens when impulses are transmitted from a tens group of rod sets 34 on the carriage K. The sectional elevations in Figure 52 to 67 are taken on lines lying in planes at right angles to the plane of the paper in Figures 41, 43, 45, 47 and 50 and pass transversely from the sets of rods shown in these figures and comprised in one of the tens sub-groups of rods 66 in the part M of the apparatus. The lines on which these several sections are taken are arranged in a substantially similar manner when Figures 54 to 67 are considered in pairs, Figures 52 and 53 being isolated sections. To avoid confusion, the lines of these sections for all figures are not indicated but as an example there is shown in Figure 43 the broken section line 58—58 on which the section shown in Figure 58 is taken and the broken section line 59—58 on which the section shown in Figure 59 is taken. In this pair of views Figure 58 shows the product-indicating rods 66 with which the rods 34 with number value 7 will register when all these rods 34 have been swung to the left. On the other hand, Figure 59 shows the product-indicating rods 66 with which the same rods 34 with number value 7 will register when these rods 34 have been swung to the right. The other pairs of figures illustrate the product-indicating rods 66 with which the rods 34 in the carriage sets with different number values will register when swung respectively to left or right, the number values of these rods 34 which will function with the rods 66 shown in each pair of figures being indicated at the bottom of the figures. In the case of the rods 34 with number value 2, these do not function when the rod sets on the carriage are swung to the right but only when swung to the left, the rods 66 with which they then engage being shown in Figure 52. As already indicated, there is no rod 34 with number value 1 in either of the sets on the carriage K but there is a rod 66 which might function if there was a rod 34 with number value 1 in the H set or in the I set this rod in fact functioning in the I set but by reason of its registering with the rod 34 with number value 3 when swung to the left. Figure 53 shows this rod 66 as if it were engaged with a rod 34 with number value 1 when swung to the right.

In Figures 52 to 67, the several sets of rods 34 are not shown as they were in the corresponding views Figures 22 to 39 since in those figures and in the case of units the sets of rods 34 comprised certain differences in the arrangement of these rods and therefore it was advisable to show the rods 34 in these figures. In the case of each tens group of sets of rods 34 on the carriage, all these rod sets are similar except that the I and J sets include no rods 34 with number value 2. Hence there is no necessity to show these rod sets 34 in Figures 52 to 67. The planes of the several rod sets are, however, indicated by the letters F, G, H, I, J, and placed adjacent to the lower ends of the rods 66 in each of the figures, these letters indicating the planes where no rods actually appear. At the upper ends of the planes in which lie the rods 66 there are marked the product values that can be indicated by rods 66 when pushed up in the several planes. These product values are respectively as follows:—plane F value 1; plane G value 1; plane H a blank; plane I value 2; plane J value 5. The arrangement under which there is strictly a blank in plane H has been explained above. It may be noted that Figure 60a illustrates a special rod 66 which is operative with the other product-indicating rods when the rods 34 with number value 6 are swung to the left as shown in Figure 60, but in that figure the structure of this particular rod cannot be shown conveniently without confusion.

It will be convenient to refer to these several figures in order and, with the exception of Figures 52 and 53, in pairs. In describing these figures, reference should be made also to the side elevations of the several rod sets which are shown in Figures 41, 43, 45, 47 and 50. These Figures 52 to 67 will be found to elucidate the product-indicating values shown in the diagram in the lower part of Figure 40.

Referring to Figure 52, this vertical section is taken so as to show the rods 66 with which the upper ends of the rods 34 with number value 2 will register when swung to the left. As will be appreciated from Figures 41, 43, 45, 47 and 50 referred to above, there is a rod 34 with number value 2 only in the F, G and H sets, this rod being absent from the I and J sets. Consequently, as shown in Figure 52, it is only necessary to provide product-indicating members in the F, G and H planes. These comprise the straight rod $66^f$ through which a product indication of 1 can be given and the straight rod $66^g$ with the short rod member $76^g$ attached thereto which lies in the H plane (compare Figures 43 and 45 with Figure 52). By means of this rod $66^g$ a product indication of 1 will be given when a rod 34 with number value 2 is pushed up either in the G or in the H set. As already mentioned, no product indication members are provided to register with the upper end of the rods 34 with number value 2 when swung to the right.

Referring to Figure 53, as has been explained above, there are no rods 34 with number value 1, but there is the rod $66^g$, referred to when describing the rods in the G set, which has its lower end bent so that it lies in the H plane, and to its lower end is attached the short rod $86^g$ of double width which could register with a rod 34 with number value 1 if it existed in the I set and that set was swung to the right. The section in Figure 53 is really supplementary to that shown in Figure 54, the section in Figure 53 being taken rather more towards the left along the sets of rods, as they appear for example in Figure 47, than the section shown in Figure 54.

Referring to Figures 54 and 55, these sections show the product-indicating members with which the upper ends of the rods 34 with number value 3 will register when these rods are swung either to the left (Figure 54) or to the right (Figure 55). From these figures it will be seen that the rods 34 with number value 3 in both the F and G sets find no rods with which their upper ends can register either when these rods 34 are swung to the left or to the right. The operative rods 34 with number value 3 are to be found in the H, I and J sets. Figure 54 shows the rod $66^g$ whose lower end is bent into the H plane and carries the short rod $86^g$ which lies in the I plane and, as mentioned above, is shown in Figure 53. Thus if a rod 34 with number value 3 when swung to the left in either the H or I set is pushed up, it will result in a product indication of 1. Figure 54 shows also a rod $66^i$ whose lower end is bent out into the J set. This rod will give a product indication of 2 when pushed up by a rod 34 in the J set. Figure 55 shows the rod $66^g$ whose lower end is bent into the H plane and the rod $66^i$ with its end $72^i$ of double width. There is also seen here in the J plane a part of the broad lower end $72^i$ of a rod $66^i$ which is bent out of the I plane into the J plane. The lower end of this rod is shown in Figure 50. From Figure 55 it will be seen that if a rod 34 with number value 3 after being swung to the right is pushed up in the H plane, it will give a product indication of 1, while if rods of similar value similarly swung are pushed up respectively in the I or J planes, each will result in a product indication of 2.

Referring to Figures 56 and 57, these show the product-indication members whose lower ends will register with rods 34 with number value 4 when these latter rods are swung respectively to the left (Figure 56) or to the right (Figure 57). From Figure 56 it will be seen that in the F plane a straight rod $66^f$ will be pushed up giving a product indication of 1. In the G plane no product indication member is provided. In the H plane there is the lower end of a rod $66^g$ which has been bent into the H plane, this rod giving a product indication of 1. In the I plane there is shown the broad lower end $72^i$ of a rod $66^i$ which will give a product indication of 2. In the J plane there lies the broad end $72^i$ of a rod $66^i$ which has been bent out into the J plane. This will give a product indication of 2. From Figure 57 it will be seen that when the rods 34 with number value 4 are swung to the right, the rod 34 in the F plane finds no product-indicating member with which to register. In the G plane there is the lower end of a rod $66^g$ which when pushed up will give a product indication of 1. Attached to this rod is the short rod member $76^g$ which lies in the H plane so that when the rod 34 in the H plane is pushed up a product indication of 1 will result. In the I plane there is the broad lower end $72^i$ of a rod $66^i$, seen in Figure 47, and when this is pushed up it will give a product indication of 2. In the J plane there is the broad lower end $72^i$ of a rod $66^i$ which has been bent out of the I plane and when pushed up will result in a product indication of 2.

Referring to Figures 58 and 59, these show the product-indicating members whose lower ends register with the rods 34 with number value 7 when swung respectively to the left (Figure 58) or to the right (Figure 59). When swung to the left, it will be seen that a product indication of 1 is obtained through a straight rod $66^f$ when a rod 34 is pushed up in the F plane. When a rod 34 is pushed up in the G plane, it will push up a straight rod $66^g$ and also the rod $66^f$ since these two rods are interconnected by the lugs 69 and 69'. This will result in a product indication of $1+1=2$. There is here no product-indicating member in the H plane. In the I plane there is the broad lower end $72^i$ of a rod $66^i$ which will give a product indication of 2. In the J plane there is the broad lower end $72^i$ of a rod $66^i$ which has been bent out of the I plane into the J plane. This will give a product indication of 2. When the rods 34 with number value 7 are swung to the right as shown in Figure 59, these rods 34 in each of the planes F, G and H will register with straight rods $66^f$, $66^g$ and $66^h$. The rods $66^f$ and $66^g$ will each result in a product indication of 1. In the case of the rod $66^h$, however, since, as has been explained, product indications are derived from horizontal movements of the guide bars 63, this horizontal movement following the application of a horizontal force to the end of the rod pushed up, the pushing up of the rod $66^h$ will result in a product indication of 2 since, as explained with reference to Figures 45 and 48, this rod is guided on the right-hand side of the guide bar $63^i$. In the I plane there lies the short rod member $76^j$ which is attached to the lower end of the rod $66^j$ which itself lies in the J plane. Thus a rod 34 with number value 7 when pushed up in either the I or the J plane will result in a product indication of 5.

Referring to Figures 60 and 61, these show the product-indicating members whose lower ends will register with the upper ends of rods 34 with number value 6 when swung respectively to the left (Figure 60) or to the right (Figure 61). From Figure 60, it will be seen that in the F and G planes there are straight rods $66^f$ and $66^g$ which call for no comment these rods each giving a product indication of 1. There is no product-indicating member in the H plane. In the I plane there lies the straight product-indicating member $66^i$ which will give a product indication of 2. In the J plane there is the specially formed end $78^i$ of the rod $66^i$ which has been bent out from the I plane into the J plane. The lower part of this rod is shown in Figure 60a, a side view of the end being shown in Figure 50. If this rod could be pushed up alone it would give a product indication of 2 only, but actually it carries the laterally projecting pin $79^i$ which lies under the lug $74^i$ (see Figure 47), this lug projecting in the I plane from the broad end of a rod $66^i$ which rod will also be lifted carrying with it, by reason of the engagement of its lug $75^i$ with the pin $70^f$, a rod $66^f$ which has a number value of 1. Since the pushing up of two rods $66^i$ will only give the same product value indication as will be given if one rod is pushed up, the product indication resulting from pushing up a rod 34 with number value 6 when swung to the left will be $2+1=3$. It will be appreciated from this and from reference to Figure 47 that the lugs $74^i$ and $75^i$ on the broad end of the rod 66 function as a connection between the rod $66^i$ with the lateral pin $79^i$ whose end lies in and is pushed up by a rod 34 in the J plane and the rod $66^f$ that carries the pin 70. In Figure 61 it will be seen that when the rods 34 with number value 6 are swung to the right, one of them will register with a straight rod in the F plane, which will give a product indication of 1, and another will register with a straight rod in the H plane which will result in a product indication of 2, since this rod when pushed up will result in the guide bar $63^i$ being moved horizontally. In the G plane there is no product-indicating member. In the I plane there is the broad lower end $72^i$ of the rod $66^i$ which carries the lug $75^i$ (see Figure 47) so that when this rod $66^i$ is pushed up it will lift through the pin $70^f$ a rod $66^f$, thus giving a product indication of 2+1=3. In the J plane there is the broad lower end 72$^j$ of a rod 66$^j$ (see Figure 50), which will give a product indication of 5.

Referring to Figures 62 and 63, these show the product-indicating members with which the rods 34 with number value 8 register when swung respectively to the left (Figure 62) or to the right (Figure 63). Here, as will be seen in Figure 62, in the F plane there is the rod 66$^f$ with the laterally projecting pin 70$^f$ which extends through all the planes G, H, I and J (see Figure 41). This rod 66$^f$ can be pushed up by itself by a rod 34$^f$ to give a product indication of 1. There is no product-indicating member in the G plane. In the H plane there is the end of a rod 66$^g$ which is bent into the H plane and this rod can be pushed up by itself by a rod 34$^h$ so as to give a product indication of 1. In the I plane there is the rod 66$^i$ with broad lower end 72$^i$ having the lateral lug 75$^i$ which lies beneath the pin 70$^f$ (see Figure 47). This broad end 72$^i$ is interconnected by the lateral lugs 69 and 69' with the end of the rod 66$^g$ which is bent into the H plane. Consequently if the rod 34$^i$ with number value 8 is swung to the left and pushed up, it will give a product indication of 2+1+1=4. In the J plane there is the broad end 72$^j$ of a rod 66$^j$ which when pushed up will give a product indication of 5. When the rods 34 with product value 8 are swung to the right, as seen in Figure 63, in the F plane, there will be pushed up the rod 66$^f$ which carries the pin 70$^f$, since as shown in Figure 41, this rod has two downward projections adapted to be engaged by the rod 34$^f$ with number value 8 when swung either to the left or to the right. This will give a product indication of 1. In the G plane a straight rod 66$^g$ will be pushed up giving a product indication of 1. In the H plane there is a straight rod 66$^h$ which will be pushed up and will give through the guide bar 63$^l$ a product indication of 2, but this rod will also carry up with it a rod 66$^g$ giving a product indication of 1 owing to the interconnection between these rods by means of the lateral lugs 69 and 69'. Hence pushing up the rod 34$^h$ will result in a product indication of 2+1=3. In the I plane there is the broad downward projection 72$^j$ from the cross piece 68$^j$ (see Figure 47) on the lower end of the rod 66$^j$ bent out from the J plane into the I plane, so that when this rod is pushed up a product indication of 5 will be given. In the J plane there is the broad end 72$^j$ of the rod 66$^j$ having the lug 75$^j$ (see Figure 50) which engages the pin 70$^f$, so that when this rod 66$^j$ is pushed up a product indication of 5+1=6 will be given.

Referring to Figures 64 and 65, these show the product-indicating members with which the upper ends of rods 34 with number value 9 register when swung respectively to the left (Figure 64) or to the right (Figure 65). From Figure 64 it will be seen that when these rods 34 are swung to the left there is a straight rod in the F plane which when pushed up will give a product indication of 1. There is no product-indicating member in the G plane. In the H plane there is a straight rod which through the guide bar 63$^l$ will give a product indication of 2. In the I plane there is the broad projection 72$^j$ from the cross piece 68$^j$ on a rod 66$^j$ whose lower end is bent out from the J plane into the I plane (see Figure 47). When pushed up this rod will give a product indication of 5. In the J plane there is the broad lower end 72$^j$ of the rod 66$^j$ having the lateral lug 75$^j$ (see Figure 50) which engages the pin 70. When this rod 66$^j$ is pushed up there will result a product indication of 5+1=6. When the rods 34 with product value 9 are swung to the right, it will be seen from Figure 65 that there are straight rods in the F and G planes each of which will result in a product indication of 1. There is also a straight rod in the H plane which by itself would give through the guide bar 63$^l$ a product indication of 2, but by means of the lugs 69 and 69' it will carry up with it also the rod 66$^g$ thus giving a total product indication of 2+1=3. In the I plane there is the narrow downward projection from the cross piece 68$^j$ on the end of the rod 66$^j$ which is bent out from the J plane into the I plane (see Figure 47). This will give a product indication of 5. In the J plane there is a straight rod 66$^j$ which will give a product indication of 5.

Finally, turning to Figures 66 and 67, these show the product-indicating members which will register with the upper ends of the rods 34 with number value 5 when swung respectively to the left (Figure 66) or to the right (Figure 67). In the F plane, as seen in Figure 66 there is no product-indicating member. In the G plane there is a straight rod giving a product indication of 1. In the H plane there is the downward projection from the cross piece 68$^g$ on the end of a rod 66$^g$ (see Figure 45) bent out of the G plane into the H plane. This will give a product indication of 1. In the I plane there is a downward projection from the cross piece 68$^i$ of a rod 66$^i$ (see Figure 47), which will give a product indication of 2. In the J plane there is a downward projection from the cross piece 68$^i$ on the end of a rod 66$^i$ (see Figure 50) which is bent out of the I plane into the J plane. This will give a product indication of 2. When the rods 34 with number value 5 are swung to the right as seen in Figure 67, there is a straight rod in the F plane which will give a product indication of 1. There is no product-indicating member in the G plane. In the H plane there is the second downward projection from the cross piece 68ᵍ (Figure 45) on the end of a rod 66ᵍ which has its lower end bent out of the G plane into the H plane. This will give a product indication of 1. In both the I and J planes there are downward projections from the cross pieces 68ⁱ respectively on the ends of two rods 66ⁱ one of which is bent out from the I plane into the J plane so that in each case a product indication of 2 will be given.

It may be remarked here that with a machine of the capacity of that which has been described, namely, one in which the limiting sum that can be performed is 99 multiplied by 999, the total of the product indications ever required to be given in a units group may be any number from 1 to 9 inclusive, but in any tens group the highest total of product indications cannot exceed 8 since 9×9=81.

From a consideration of what has been said above with respect to the structure and arrangement of the product-indicating members and by reference to Figure 1 and the accompanying description, it is possible to see how various sums may be performed and the products and partial products indicated merely by key operation, the traversing of the cams and the cam carriage L and the carriage K with rods 34 being automatic.

A simple example may be given at this stage to show the operation of the apparatus, the example dealing, however, for the sake of clearness with units only.

If say the number 2 key is depressed when the carriage K is positioned beneath the cam carriage L (as shown in diagram b in Figure 1), then the sets of rods 34 in the units sub-group in the units main group will be swung respectively as follows. The A set will be swung to the left, the B set will be swung to the left, the C set will be swung to the right, the D set will not swing at all, and the E set will be swung to the right. In this case the D set will not be swung by reason of the fact that there is no rod 34 with number value 2 which is carried by the guide bar 32ᵈ (see Figure 16), the rod 34ᵈ with number value 2 being carried by the guide bar 42ᶜ (see Figures 13 and 14). If now the carriage K is traversed and positioned under the part M of the apparatus, for example, as indicated in the diagram e in Figure 1, and the number 3 key is depressed, all the rods 34 with number value 3 will be pushed up with the following results:—

No. 3 rod in A set will push up a rod 56 and indicate____ 1
No. 3 rod in B set will not register with a rod 56_____ 0
No. 3 rod in C set will not register with a rod 56_____ 0
No. 3 rod in D set will not register with a rod 56_____ 0
No. 3 rod in E set will push up a rod 56 and indicate____ 5

Total product thus indicated_____ 6

It will be understood that the same positioning by swinging of the sets of rods 34 in the units sub-group in the tens main group on the carriage K will take place if the cam carriage L is in its initial position as shown in diagram a in Figure 1, but if such swinging has been effected by depression of the number 2 key and after the carriage K has been traversed to the position shown in diagram e, Figure 1, the number 3 key is now depressed, the same product indications will be given as are set out above, but in the y group of product-indicating members, so that this product indication will in fact be 60. Similarly, it will be seen how product indications of 600, 6,000 or 60,000 can be given.

Product indications can be obtained by a direct reading from the ends of the product-indicating members 56 and 66 as these are pushed up or by direct or indirect action of these members on number indicating devices which can then be totaled as desired. In the present machine, however, the product indications are collected and totalized mechanically. This is effected by means of a device which moves horizontally over the guide bars 53 and 63 and is adapted to engage the ends of any rods 56 and 66 which are pushed up and caused to project beyond the guide bars 53 and 63. When thus engaged, the horizontally moving member causes those bars 53 and 63 to slide in the direction of their length which guide the rods 56 and 66 whose ends have been caused to project. Since the rods 56 and 66 guided by these bars 53 and 63, in accordance with the set-planes in which they are arranged, have product-indicating values respectively of 1, 1, 2 and 5, it may be said that the several guide bars 53 and 63 have in themselves these separate number values 1, 1, 2 and 5 for product-indicating purposes, each of these bars indicating or being operative to transmit its number value 1, 1, 2 or 5 as and when it is caused to slide by the action of the horizontally moving member above it. By this sliding movement of these bars 53 and 63, partial products, composed in the manner described above, by individual or collective number values 1, 1, 2 and 5, can be passed into that part of the mechanism wherein these partial products can be added together, the mechanical process of transmitting these partial products into the adding mechanism being utilized to effect relative positioning by swinging of sets of rod-like members. Such positioning by swinging of rod-like members for the purpose of performing addition has been described in the specification of the present applicants' prior application for Letters Patent of the United States of America, Serial No. 727,564, the mechanism being there indicated in a simple form, whereas in the present machine this apparatus is embodied in a practical working form which will be described hereafter.

The horizontally moving member by means of which the guide bars 53 and 63 are caused to slide in the direction of their length is controlled by an escapement so that it has a step-by-step movement which takes place directly after keys have been depressed and impulses transmitted through rods 34 to rods 56 and 66 so as to cause the ends of the latter rods to project and be engaged by the horizontally moving member. This member thus moves a step after each key has been depressed when the carriage K has been positioned beneath the part M of the apparatus and therefore, as will be seen from the diagrams in Figure 1, the horizontally moving member can travel three steps in the apparatus here described, these steps corresponding to the three positions of the carriage K shown in diagrams c, d and e in Figure 1. Thus this horizontally moving member operates to feed into the adding part of the mechanism the partial products indicated by a key depression while the carriage K is located beneath the part M of the apparatus.

The escapement controlling this horizontally moving member is actuated by the keys and is associated with the escapements which control the traversing of the cam carriage L and the traversing of the carriage K. These escapements will now be described with reference more particularly to Figures 2, 3, 4 and 5, but it will be convenient to refer in the first place to the construction and arrangement of the horizontally moving member by means of which the guide bars 53 and 63 are caused to slide for the purpose of transmitting the partial products into the adding portion of the mechanism.

In Figure 3 the adding portion of the mechanism is indicated at P as being situated behind the multiplying portion of the mechanism M. The upper part of the adding portion of the mechanism indicated at Q terminates with the display mechanism for exhibiting the final answers.

The horizontally moving member above referred to is comprised by a plate 100 the front view of which can be seen in Figure 2 while the side view appears in Figure 3 in the upper portion of the part M of the apparatus. This plate 100 can slide horizontally within the vertical main frame members $N^3$ of the machine the direction of movement of the plate 100 being from the front of the machine towards the back, that is to say, towards the adding portion P of the apparatus. The plate 100, which for convenience may be referred to as a grid plate by reason of its appearance, is shown in plan in Figure 69 where it will be seen that it has a series of parallel slots 101 formed therein and running across and through it. These slots 101 extend in a direction transverse to the direction in which the grid plate slides, that is to say, while as seen in Figure 3 the grid plate slides from right to left with a step-by-step movement, the slots 101 extend across this plate at right angles to the plane of the paper in Figure 3. Light bars 102 (Figure 69) for strengthening purposes run across the upper surface of the grid plate at right angles to the slots 101.

The width of each of the slots 101 is equal to the width of the upper end of each of the product-indicating rods 56, 66, so that when any one of these rods is pushed up the end of a rod can enter a slot 101 and thereby be engaged by the grid plate in such a manner as to cause a guide bar 53 or 63 to slide in the direction of its length by reason of the force applied thereto by the grid plate to the end of the projecting product-indicating member or members 56, 66. The slots 101 are suitably rounded to facilitate the entry into them of the ends of the product-indicating rods. The grid plate is clearly shown at the top of Figure 7 and in other similar figures already referred to and described above.

The grid plate is attached along its side edges to two cheek plates 103 each of which has fixed in it and projecting from the inner face thereof four pins 104 which serve to guide and support the plate 100 on two horizontal bar members 105 which extend from the vertical frame members $N^3$ at the front of the machine to similar vertical frame members $N^4$ at the back of the machine these bars 105 being also attached intermediately to other vertical frame members $N^5$. The frame members $N^4$ and $N^5$ with certain horizontal frame members carry the adding part of the apparatus indicated at P and Q. Two coiled springs 106 are attached as to one end to the cheek plates 103 and as to their other ends to the frame members $N^4$ so that these springs exert a pull on the grid plate tending to cause it to slide from the front towards the back of the machine, that is to say, from right to left, as seen in Figure 3. This sliding movement is controlled by an escapement described in detail hereunder. Teeth 107 are cut on the under edges of angle members 108 which are attached to the under side of the grid plate 100 and lie substantially in the plane of the cheek plates 103. These teeth form two racks extending under the side edges of the grid plate. Between these angle members 108 lie all the guide bars 53 and 63 above the upper edges of which lies and slides the grid plate 100. Sufficient clearance is allowed between the upper edges of the guide bars 53 and 63 and the under side of the grid plate 100 to allow of the guide bars lifting in order that the notches on their under edges may be disengaged from and re-engaged with the detent plate 55 (Figure 7). The position of the grid plate is also determined with relation to the extent to which the upper ends of the product-indicating rods 56 and 66 will be caused to project above the guide bars 53 and 63 when pushed upwards as a result of key actuation.

Since the racks 107 are in duplicate on either side of the grid plate, the greater part of the escapement mechanism is also duplicated. This escapement comprises the following parts which are shown in Figure 3 and also in Figure 77. A rod 109 which extends substantially vertically has its upper end formed to engage the teeth 107. The upper part of this rod 109 lies against a plate 110 and is guided by two pins 111 in this plate. At its lower end the rod 109 is provided with a pin 112 which serves to check its upward movement in a manner which will be described. A spring 113 has one end attached to the rod 109 so as to tend to draw this rod upwards, the other end of the spring being attached to a second rod 114 which is very similar in form and disposition to the rod 109, its upper end being formed so as to engage the teeth 107. The upper end of the rod 114 also lies against the plate 110 and is guided by one of the pins 111 and a third pin 115 which is spaced apart from the pin 111 so as to allow a certain movement of the end of the rod 114 in the plane of the paper Figure 3 or Figure 77. The lower end of the rod 114 is pivoted at 116 to one arm of a two-armed lever 117, 118, which is pivoted at 119 on the framework. The lower end of the rod 109 lies against the arm 118 of this lever under the lower edge of which lies the stop pin 112 so that downward movement of this lever arm 118 will pull down the rod 109 and disengage its arm from the teeth 107. At the same time the other arm 117 of the lever will move upwards and cause the end of the rod 114 to enter into engagement with the teeth 107. The end of the lever 118 is connected by a link 120 with a crank pin 121 carried on the end of a rock shaft 122 which extends across the front of the part M of the apparatus, as shown in Figure 2. These crank pins 121 and the rock shaft 122 serve to connect the escapement mechanisms on the two sides of the apparatus. The arm 117 of one of the levers pivoted at 119 is somewhat longer than that of the other similar lever and is pivotally connected at 123 to a flat rod 124 which lies vertically and is carried at the right-hand side of the apparatus, where it can be seen indicated in dotted lines in Figure 2. This flat rod 124 can slide vertically being guided at its upper end by two pins 125 fixed in a horizontal frame member. The lower end of this flat rod 124 is also guided in some convenient manner so that the bar can slide freely vertically. The lower end of the flat rod is shown bent inwards at 126 in Figure 2. The extreme lower end of this flat rod lies over the upper edge of a knife 127 which is carried in slots in the plates 19 in the same way as the knives 20 are carried which are pushed up by key actuation and impart vertical sliding movement to the rods 34. When therefore this knife 127 is pushed up, by means described hereunder, it will strike the lower end 126 of the vertical flat rod 124 and push this rod upwards. This will cause each lever 117, 118 to turn about its pivot 119 and will withdraw from engagement with the teeth 107 the upper end of the rod 109 and bring into engagement with the next tooth the rod 114. By reason of the movement in a vertical plane which is allowed to the upper end of the rod 114 between the pins 111 and 115, the grid plate 100 can then move towards the back of the machine to the extent of one step by reason of the pull exerted on it by the springs 106. As soon as the knife 127 drops, the flat rod 124 will also drop turning back again the lever 117, 118. This will pull the end of the rod 114 out of engagement with the tooth in the rack 107 and the spring 113 will then pull up the rod 109 so that its end will once more engage the rack, but this engagement will now be with a tooth 107 which is next to that which was previously engaged by the end of the rod 109. The grid plate will then be held in the new position into which it has moved. In this way, each time the plate 127 is pushed up, the grid plate will move one step carrying with it certain guide bars 53, 63.

Turning now to the escapement mechanism for the carriage K and the cam carriage L, this is to a considerable extent shown in Figure 5. A plate-like member 128 is mounted on the right-hand side of the carriage K, as viewed in Figure 2, so that this plate can slide vertically being guided by two lateral pins 129 on the carriage framework and by a pin 130 which engages a slot 131 in the plate. This plate is formed as to its lateral edges with two oppositely disposed and similar notches 132 and with two oppositely disposed and similar shoulders 133. With each notch 132 there engages the end of a pawl lever 134 pivoted at 135 on the side of the carriage K. On each shoulder 133 rests the end of a pawl lever 136 pivoted at 137 on the side of the carriage K and acted on by a spring which tends to press the pawl outwards on its pivot. The arrangement is such that if the plate member 128 is pushed upwards, it will lift both pawls 134 and both pawls 136 and when the plate member 128 descends again all these pawls will also descend. These pawls engage notches and teeth formed respectively on the lower and upper edges of two similar rack bars 138 which lie parallel and extend horizontally across the front of the machine between the frame bars N' on which the carriage K travels. A pawl 134 engages notches on the under side of each rack bar 138 while a pawl 136 engages teeth on the upper side of each rack bar. This thus forms a double escapement for controlling the movements of the carriage. One of the bars 138 is shown in elevation in Figure 2 and also in Figure 4 and it will be seen that there are formed in the under side of the rack bar the following series of notches. First a notch 139 situated towards the left-hand end of the bar this notch being shown in Figure 4, but in Figure 2 not actually visible but its position indicated by the reference line since in Figure 2 it is concealed behind the pawl mechanisms on the carriage K. Next, there is a notch 140 both this notch and the notch 139 being of small dimensions. Then at a substantial distance from the notch 140 is a wider notch 141 and this is followed at equal distances apart by two other notches 142 and 143 which are similar to the notch 141. On the upper side of the bar there is the following series of teeth. First a tooth 144 positioned above and just to the right of the notch 139. Next, a tooth 145 corresponding to the notch 140. There are then three teeth 146, 147 and 148 equally spaced apart in positions corresponding to the notches 141, 142 and 143. In each case the vertical face of a tooth is directed towards the left and is in line with the right-hand edge of the adjacent notch, the back of the tooth being beveled off. Each pawl 134 with the pawl 136 above it together form a pair acting on one and the same rack bar 138. The pawls 134 and 136 forming each pair are so positioned in relation to each other and to the notches and teeth on the rack bar and are so acted on by the plate-like member 128 that the lower pawl 134 will enter into engagement with a notch, such as the notch 141, on the under-side of the rack bar 138 just before the upper pawl 136 has been lifted clear of the tooth 146 above the notch. When the pawl 136 is thus lifted clear of the tooth with which it was in engagement the spring 136' acting on the side of this pawl gives it a slight movement sideways on its pivot pin 137 with the result that the pawl cannot drop back into engagement with the same tooth on the rack bar, but when the plate member 128 is released and descends and the pawls are allowed to fall, the carriage will be free to travel until each upper pawl 136 engages the next tooth, for example 147, on the rack bar. In this way and by these means the movements of the carriage K can be controlled as it travels beneath the part M of the apparatus.

By reference to the diagrams in Figure 1, it will be appreciated that the teeth 146, 147 and 148 operate to hold the carriage successively in the positions indicated in the diagrams c, d and e in Figure 1. The tooth 144 retains the carriage in its initial position as shown in the diagram a in Figure 1. The tooth 145 retains the carriage K after the cam carriage has moved into the position indicated in the diagram b in Figure 1, the carriage K actually being allowed a small amount of travel when the cam carriage L is moving this movement of the carriage K being necessary to actuate the release mechanism of the cam carriage and allow it to travel. This movement of the cam carriage and its control is effected in the following way. The cam carriage L has attached thereto the ends of three springs 149 the other ends of which are attached to a horizontal frame member $N^6$ (Figure 3) which extends from the vertical member $N^3$ across the path of the cam carriage at the right-hand end of this path. Each of the members 40 which support the endmost cam bridge member 41 carries a lug 150 each of which is adapted to lie in the path of a lug 151 formed on the upper edge and towards the end of a bar 152 which, in so far as its general structure and mounting is concerned, resembles the guide bars 32 for the vertically sliding rods 34. The bar 152 is in effect, however, a dummy guide bar, but it is provided on its under edge with only two notches 153 and $153^a$ adapted to engage the detent plate 35 (see Figure 5). This bar 152 is carried in the last of the series of slots in the plates 31 towards the left-hand end of the carriage K as viewed from the front of the machine as in Figure 2 and the bar 152 can slide in these notches in the direction of its length. So long as the bar 152 is positioned with its notch 153 engaging the detent plate 35, the lugs 151 will engage with the lugs 150 on the cam carriage L and this carriage will be retained in its initial position in which it is shown in Figure 2 and as indicated in diagram a in Figure 1. As and when, however, the bar 152 is caused to slide towards the right, as viewed in Figure 5, that is towards the front of the machine, so as to cause the notch $153^a$ to engage with the detent plate 55 the lugs 151 will be disengaged from the lugs 150 and the carriage L will be released. It will then be caused to travel by the springs 149 until the right-hand side of the carriage L buts up against part of the frame member $N^3$. The carriage will then be positioned as shown in diagram b in Figure 1.

The movement in the direction of its length of the bar 152 necessary to effect this release of the carriage L is effected in the following manner. On a frame member N (Figure 5) and adjacent to the left-hand end of the bar 152 as viewed in that figure, there is fixed a block 154 which is formed on its lateral face with an inclined surface 155 and at its upper side with an inclined surface 156 (see Figure 68). If now the escapement controlling the carriage is operated so as to allow the carriage to move until it is engaged and held by the second tooth 145, the end of the bar 152 will strike the inclined face 155 of the block 154 and, as a result, the bar 152 will be caused to slide towards the front of the machine, that is to say, towards the right as viewed in Figure 5. This will disengage the lugs 151 from the lugs 150 and will release the cam carriage L.

Figure 68 shows the block 154 in detail and in plan and this figure also shows the pawl devices which function to effect the resetting of the guide bars 32 when the carriage is pushed back again from right to left after it has completed its travel. Two pawls are mounted opposite each other, one 157 being provided with an incline 158 on its inner face and pivoted at 159 while the other pawl 160 has an incline 161 on its inner face and is pivoted at 162. One of these pawls can be seen in elevation in Figure 2, while Figure 68 shows them in plan. These pawls are located in or about the horizontal plane in which lie the guide bars 32. When the guide bars 32 are all in their initial or central positions, that is, with notches 36 engaging the detent plate 35 the ends of these guide bars will clear the pawls 157 and 160 as the carriage travels along its path. If, however, any guide bar has been caused to slide in the direction of its length so as to effect a swinging of the rods 34 carried thereby either to the right or to the left, one end or the other of this guide bar will project into the path of a pawl 157 or a pawl 160. By reason of the fact that the pawls hang normally in the position indicated in Figure 2 so that each presents an inclined under edge 163 to the projecting end of a guide bar 32, approaching the pawl from the left, the pawl will not act on the guide bar and cause it to slide, but the pawl will be lifted by the guide bar whose end will pass beneath the pawl. In this way the carriage as it travels to the right will not have the setting of the guide bars and rods 34 disturbed by the pawls 157 and 160. On the return movement of the carriage towards the left, however, for resetting of the apparatus, the ends of the guide bars 32 will strike the inclined faces 158 and 161 of the pawls and these guide bars will be pushed thereby back into their central positions and the rods 34 thus reset. The pawl 160 will act in this way on the front end of the bar 152 and by pushing it back into its initial position will cause the lugs 151 to engage the lugs 150 on the cam carriage L as the carriage K is drawn towards the left (Figure 2) so that the cam carriage L will be picked up by the carriage K and moved back with the carriage K to its initial position and there held when the carriage K is in its extreme left-hand position and there retained by the teeth 144 on the rack bars 138.

The key-actuated mechanism by means of which the knife 127 is pushed up and the above described escapements are operated comprises the following features, reference being made to Figures 3 and 5. The 0 or spacing key 12 is mounted on the end of a rod 21 which can slide vertically through the plate 13 which serves to guide the rods on which the other keys 11 are carried. In the bottom of this rod 21 is a notch 22. Pivoted at 23 are two levers each of which has an arm 24 extending towards the front of the machine and a second arm 24' extending towards the back of the machine on the opposite side of the pivot 23. The arms 24 of these levers are connected by a bar 25 this bar and the levers thus forming a U-shaped member. The bar 25 lies in the notch 22 on the end of the key rod 21 and also runs along under all the key lever arms 14'. A spring 26 pulls the whole U-shaped member 24, 25 upwards so that the bar 25 lies against the under side of the key levers 14'. One of the lever arms 24' bears against the edge of a plate-like projection 27 which extends downward from the lower edge of the central and horizontal part of a U-shaped member carried on the same pivot 18 as the U-shaped member 17. This U-shaped member has side arms or levers 28 and a cross piece constituting a horizontal bar 29 which runs across the machine, its upper edge lying immediately beneath the knife 127. By means of this mechanism if the key 12 is depressed, the U-shaped member 28, 29 will be lifted and the knife 127 will be pushed up and since this knife extends right across the machine below the path traversed by the carriage K, it will act on and push up the vertically sliding plate member 128 on the carriage K irrespective of the position of this carriage and thus actuate the carriage escapement. The knife 127 will also push up the flat rod 124, 126 and actuate the grid plate escapement. Since the horizontal universal bar 25 carried by the levers 24 lies under all the levers 14' of the keys 11, it follows that whenever one of these keys is depressed, the escapement mechanism will be actuated in the same way and irrespective of the position of the carriage K.

It will be noted and can be seen in Figure 3 that the bottom end of the sliding flat rod 124 which actuates the grid plate escapement extends downwards further than the bottom end of the sliding plate 128 which actuates the carriage escapement. Consequently when the knife 127 is pushed up, it will push up the flat rod 124, 126 and permit the grid plate to move one step before the carriage escapement is operated, but the timing of the operation of these respective escapements relative to the pushing up of product indicator rods is such that the grid plate will not move, following a key depression, until the product-indicating rods which are pushed up by the actuation of this key have their ends projecting sufficiently to enter into engagement with the grid plate.

It is necessary that the rods 34 on the carriage K should be given an opportunity to drop before the carriage traverses its next step. Therefore a device to cause a delay in the operation of the carriage escapement is preferably employed such device embodying for example the following features which will be seen in Figure 5. On each of the slotted plates 19, there is pivoted at 164 a lever having three arms 165, 166 and 167. The arm 165 carries a lateral pin 168 which lies beneath the lower edge of the adjacent side member 28 of the U-shaped member which lifts the knife 127. On each end of the knife 127 is a pin 168' which is so situated that when the knife 127 has been pushed up by the U-shaped member 28, 29, each pin 168' can rest on the square end of a lever arm 166 which has been moved slightly owing to the weight of the third lever arm 167 whose movements are limited by stop pins 169 fixed on the slotted plate 19. When the key is released which had raised the U-shaped member 28, 29, this member will fall, but the knife 127 cannot fall with it since it is held up by the lever arms 166 and the pins 168'. Just as the U-shaped member 28, 29 approaches the end of its downward movement it will strike the pin 168 on each lever arm 165 and cause the levers 166 to turn sufficiently to disengage their ends from the pins 168', when the knife 127 can fall.

It will be appreciated that when the carriage K makes its first two movements, that is, from its initial position where it is held by the tooth 144 to the position where it is held by the tooth 145 and subsequently to the position where it is held by the tooth 146, the grid plate must not be allowed to move since no product-indicating members have been pushed up into engagement with it. To ensure this the following device is employed. On a vertical frame member $N^3$ on the left-hand side of the machine as viewed in Figure 2, a flat rod 170 is mounted so that it can slide on the frame member. This rod is slotted as at 171 with studs 172 passing through the slots to guide the rod 170 and limit its movements on the frame member $N^3$. The rod 170 is pulled upwards by a spring 173. The bottom end of the rod is turned outwards at right angles at 174 (see also Figure 69) to form a finger piece or key by means of which the rod 170 can be pulled down. The upper end of this rod is turned inwards at right angles and formed with a tooth 175 adapted to engage a notch 176 in the side edge of the grid plate 100. When the tooth 175 engages the notch 176 the grid plate is prevented from moving even if its escapement is actuated. Thus until the rod 170 is pulled down the grid plate will not move, but must remain stationary during the actuation of the keys while the carriage K is located beneath the cam bridge L. When a number key 11 is actuated to feed in the first figure in the first factor of the sum to be performed, the carriage K will make its first small movement so as to be held by the tooth 145 on the rack bar 138. At the same time the cam carriage L will be released and will move to its second position. When another key 11 is depressed in respect of the second figure of the first factor of the sum to be performed, the carriage K will make its second movement up to and will then be held by the tooth 146. The key 174 is then depressed so as to pull down the rod 170 and the grid plate will be released and can make a slight horizontal movement when it will be held by the bar 109 engaging the first tooth in the rack 107. When further keys 11 are depressed, the grid plate will proceed to make its step-by-step movements and the carriage also will traverse up to the end of its path.

The carriage K is caused to travel across the front of the machine by the action of a spring which is coiled within and operates to rotate a drum 177 mounted on the right-hand side of the apparatus and towards the back, as will be seen in Figure 77. As this drum rotates, it winds thereon a cord 178 which passes round two pulleys 179 and 180 whence it runs across the front of the machine and its end is attached to the carriage K. When the carriage has completed its travel to the right, it is returned by hand. Various means may be provided for this purpose but conveniently the following arrangement is employed. Across the front of the machine behind the keys extends a rod 181 which would appear in Figure 2 but is not shown in that figure nor are certain other details now to be described, these parts having been omitted for the sake of clearness. The features, so far as is necessary, are shown, however, in Figure 77. On the rod 181 can slide a block 182 which carries a finger piece 183. This block is suitably guided so as to keep the finger piece 183 directed upwardly. From this block 182 extends a cord 184 which passes round and is wound on a pulley 185 mounted on the left-hand side of the apparatus (see Figure 2). Attached to the pulley 185 is a second pulley 185' of smaller diameter on which is wound a cord 184' passing thence along the left-hand side of the apparatus round another pulley, arranged in the same way as the pulley 180 on the right-hand side of the apparatus. The end of this cord 184' is attached to the carriage K. As the carriage travels from left to right across the front of the apparatus, the block 182 will be drawn by the cord 184 from right to left across the front of the apparatus. When the carriage has completed its travel, the block 182 will have been drawn along the rod 181 from right to left so that when the carriage has completed its travel this block will be on the left-hand side of the front of the apparatus. By pressing on the finger piece 183 and pushing the block back again from left to right, the carriage will be returned from right to left into its initial position being pulled by the cords 184, 184'. In order to keep these cords 184, 184' taut, a cord is attached to the under side of the block 182 and wound round a drum 186 which is mounted on the frame member N at the right-hand side of the apparatus. This drum 186 contains a coiled spring which tends to rotate the drum 186 in such a manner as to wind the cord thereon and exert a light pull on the block 182 this pull being in opposition to the pull exerted on the cords 184, 184' by the carriage and main spring in the drum 177.

As the carriage is returned after it has completed its travel, it is necessary to reset certain parts in the adding portion of the apparatus and also to return the grid plate 100 and reset it in its initial position. These resetting processes have to be so timed that the resetting of the rods in the adding part of the apparatus must take place first and subsequently the grid plate is pushed back carrying with it all the guide bars 53, 63. This resetting mechanism is shown in Figure 77. On the face of the main spring drum 177 is fixed a laterally projecting pin 187, this pin being shown in full lines in the position which it occupies when the carriage K is in its initial position at the left-hand side of the front of the machine, the cord 178 being then unwound off the drum 177 to its fullest extent. In dotted lines at 187' there is indicated the position which the pin 187 will occupy when the carriage K has completed its travel to the right and the drum 177 has rotated to its limit after winding thereon the cord 178. From this it will be seen that the drum 177 can never make a complete revolution. When the carriage K is in its initial position and the drum 177 has been rotated so that the pin 187 is positioned as shown in full lines, it will be seen that it lies against the end of a flat rod 188 which extends rearwardly from the cheek plate 103 of the grid plate 100 which lies on the right-hand side of this grid plate. From this it will be seen that when the drum 177 rotates counter-clockwise as viewed in Figure 77, the pin 187 will bear against the end of the bar 188 and operate to push the grid plate 100 towards the front of the machine. The grid plate will then pick up and return to their initial positions all the guide bars 53, 63, which will thus be reset. Two similar levers 189, the ends of which are connected by a cross piece 190, are pivoted at 191 on frame members at opposite sides of the apparatus. The levers 189 and the cross bar 190 together form a U-shaped member the centre portion of which lies across the back of the apparatus and serves to connect the levers 189 so that they will move together. Pivoted at 192 on the right-hand lever 189 is a flat bar 193 which extends upwardly with its end lying adjacent to the face of the drum 177. This bar 193 in effect operates as a pawl being retained in the position shown in Figure 77 against a stop pin 194 by a spring 195. As the carriage K travels from left to right, the drum 177 will rotate in the direction indicated by the arrow in Figure 77, that is to say, clockwise. At a certain stage in this rotation, the pin 187 will strike the side of the pawl bar 193 and after pushing it to one side the pin will reach the position indicated at 187' when the pawl bar 193 will return to the position in which it is indicated in the figure. The pin 187 is now situated opposite to the end of the pawl bar 193. When the carriage is reset thereby unwinding in the manner described the cord 178 from the drum 177, which will then rotate counter-clockwise, the pin 187 will press on the end of the pawl bar 193 and will push down the U-shaped member 189, 190. As this U-shaped member descends, it will press on the lateral projections 196 carried by a series of vertically suspended and guided flat rods 197, each of which is pulled upwards by a spring 198. These springs acting through the rods 197 and projections 196 pull upwardly the U-shaped member 189, 190. The lower end of each of these flat rods carries a horizontally extending lug 199. By means of the downward movement of these flat rods 197 in a manner to be described hereafter, the rod members in the adding portion of the mechanism will be reset. As the rotation of the drum 177 continues in a counter-clockwise direction in the process of resetting the carriage, the pin 187 will strike the end of the flat rod 188 and as the drum 177 completes its rotation the grid plate will be pushed back to its extreme position and held by the catch 175 engaging the notch 176 until it is released by pressing down the key 174 so as to be held and have its further movements controlled by the escapement.

Turning now to the adding portion of the mechanism into which the partial products are fed and in which they are added together so as to exhibit mechanically the answers to the sums as performed, reference will be made more particularly to Figure 70 and the succeeding figures in the accompanying drawings.

In the first place, it will be desirable to refer briefly and in a general sense to the manner in which the partial products are passed into the adding mechanism and there dealt with. By reference to the sum number V set out above, it will be seen that the digits in the several partial products fall into columns indicated by the letters $v, w, x, y$ and $z$. If the figures in these several columns are added up separately without carrying the tens digit from one column into the next, the sum may be set out in the following way:—

| VI. | | | 9 | 9 | | |
|---|---|---|---|---|---|---|
| | | | | 9 | 9 | 9 |
| | | 8 | 1 | 0 | 0 | |
| | 8 | 1 | 0 | 0 | 0 | |
| | | | 8 | 1 | 0 | |
| | | 8 | 1 | 0 | 0 | |
| | | | | 8 | 1 | |
| | | | 8 | 1 | 0 | |
| | 8—17—18—10—1 | | | | | |
| | $v$ | $w$ | $x$ | $y$ | $z$ | |

From this it will be seen that the sum of the digits in the column $y$ equals 10, that is to say, there is a 1 to be carried into the $x$ column. In the $x$ column the sum of the digits is 18 with a 1 to be carried into the $w$ column. Similarly, the sum in the $w$ column is 17 with a 1 to be carried into the $v$ column. It will be appreciated from the above description of the manner in which the partial products are mechanically indicated in the multiplying part of the present apparatus, that this indication in each of the $w$, $x$ and $y$ denominations is given in tens and units. Thus looking at the figures in the $y$ column in the sum VI, the 8 which appears in this column has come into it as a result of product indications by rods 66, as through the sub-group 10 of the main group $z'$ (Figure 1 diagram $e$) into the units of tens part of the main group $y$. This partial product 8 will therefore be transmitted into the adding mechanism by guide bars 63 in the form $1+2+5$. The two 1's in the column $y$ in the sum VI will have come as through the sub-group $u$ of the main group $y^1$ into the units part or sub-group of the main group $y$ where as a result of indications by rods 56 and by the sliding of guide bars 53 these partial products of 1 will be transmitted into the adding mechanism. In the adding mechanism these several partial products 1, 8, 1, will be received therefore in the form of $1+(1+2+5)+1=10$. In that mechanism a 0 will be indicated as the answer figure in the tens column and the 1 will be passed as the carry into the $x$ column and added up therein. In the $x$ column following the same procedure there will be received in this denomination in the adding mechanism the following partial products $$1+(1+2+5)+1+(1+2+5)+1=19.$$

Here the last 1 is the carry figure from the $y$ column. The adding mechanism will indicate the 9 as the answer figure in respect of the hundreds denomination and the 1 will be carried into the thousands or $w$ column. In this way the totals in the several denomination columns will be made up and the corresponding figures are then exhibited.

From a consideration of the totals in the several columns as set out in the sum number VI, it will be seen that by simple calculation it can be ascertained what are the possible "carry" figures that have to be provided for in the several denominations. In a machine having the capacity of that here described, these maximum figures are as follows. In the $z$ or units column no carry figure can occur so that it is not necessary to provide therefor. In the $y$ column, either 1 or 2 may have to be carried, in the $x$ column either 1, 2 or 3 may have to be carried, in the $w$ column either 1 or 2 may have to be carried.

By reference to the diagrams in the drawings accompanying the specification of the present applicants' prior application for Letters Patent of the United States of America, Serial No. 727,564, it will be seen as described in that specification that addition may be performed by swinging each of a series of sets of rods through a unit distance, each unit swing feeding in 1. If the set of rods is swung through two unit distances, 2 will be fed in. Alternatively, in place of swinging the upper ends of one set of rods through two unit spaces to the left, the upper ends of this set of rods is swung through only one unit space to the left while the lower ends of the set of rods above is swung through one unit space to the right, $1+1=2$ will be fed in. It may be pointed out now that if the upper ends of the rods in a set are inclined alternately in opposite directions transversely to the plane in which the whole set can be swung, a single unit space swing imparted to the upper ends of this set of rods will feed in 2. This will be made clear by reference to the perspective diagram in Figure 70.

It may be noted that in this and in the succeeding diagrams the directions in which rod sets may be swung, will be designated in the one case as in an R direction or being an R swing, indicating that in the actual apparatus the swinging takes place towards the front of the machine, that is to say, to the right, when the adding part of the apparatus is looked at from the left-hand side of the machine, while in the other case a swinging movement in the opposite direction will be referred to as taking place in an S direction or constituting an S swing, that is, towards the rear of the apparatus when it is viewed from the left-hand side. The several pairs of diagrams constituting the Figures 71 to 75 show respectively the rods necessary for dealing with the partial products which have to be added together in the several denominations here indicated by the letters V, W, X, Y and Z.

Figure 70 shows four superimposed sets of rods and indicates the general arrangement of these rods as in either denomination. For convenience here this figure may be taken as showing the rod sets in the Z denomination, though actually there are fewer rods in the Z denomination than here shown and as will be explained hereunder. There are four sets of rods $Z^{10}$, $Z^{11}$, $Z^{12}$, $Z^{13}$. Each of the rods $Z^{10}$ has a separate and individual number value these number values being from 0 to 9 inclusive, as marked at the lower ends of these rods in Figure 70. The lower ends of all these rods $Z^{10}$ are guided so that they can slide vertically in a fixed bar 200. The upper ends of these rods are guided so that they can slide vertically in a horizontally sliding bar indicated by the line $S^1$ to which an S sliding movement can be imparted, which will swing the upper ends of the rods $Z^{10}$ through a single unit distance. The upper ends of these rods $Z^{10}$ register with the lower ends of a similar number of rods $Z^{11}$. The lower ends of these rods pass through a guide plate indicated by the line $R^1$ which can slide and thereby swing the lower ends of the rods $Z^{11}$ in an R direction. The upper ends of the rods $Z^{11}$ are spread laterally out of the plane in which lie the rods $Z^{10}$ this spreading being arranged so that the rods $Z^{11}$ having even number values, some of which are indicated $EZ^{11}$, lie with their heads or upper ends to one side of and equidistant from the said vertical plane, while the other rods $Z^{11}$ having odd number values, some of which are indicated $OZ^{11}$, are inclined so that their heads lie similarly on the opposite side of this vertical plane. The odd and even rods have their heads arranged, however, so that they lie side by side in pairs as shown in Figure 70, the rod heads in each pair lying in a vertical plane which is normal to the vertical plane in which lie the rods $Z^{10}$. Thus the heads of the rods with values 0 and 1 lie in the same vertical plane while the heads of the rods with values 2 and 3 lie in another and parallel vertical plane and so on. The heads of all these rods are suitably guided in a fixed guide bar 201.

The next series of rods $Z^{12}$ register as to their lower ends with the heads of the rods $Z^{11}$ the lower ends of these rods $Z^{12}$ being carried in a sliding guide plate $R^2$ which can be moved so as to cause the lower ends of these rods $Z^{12}$ to swing in an R direction relatively to the upper ends of the rods $Z^{11}$. These rods $Z^{12}$ are inclined as to their upper portions so as to spread their heads laterally and cause these heads to fall into two parallel lines each of which lies in a vertical plane normal to the plane in which lie the lowest series of rods $Z^{10}$. In each of these groups are the heads of rods $Z^{12}$ arranged as shown with their respective number values indicated. The heads of these rods are suitably guided in a fixed guide plate 202. Above these two groups of rod heads comes the next set of rods $Z^{13}$. The lower ends of these rods $Z^{13}$ are guided by a sliding bar or plate indicated only by the line $R^3$ which can move and swing the rods in an R direction. The upper ends of these rods $Z^{13}$ are arranged in two parallel planes at right angles to the plane of the set of rods $Z^{10}$, one plane containing the ends of the rods with number values 0 to 4 and the other the rods with number values 5 to 9. The rods $Z^{13}$ thus fall into two groups which lie in parallel planes when viewed from the side the lower ends of these rods being spaced apart and situated in the guide plate $R^3$ so that while initially the lower ends of the group of rods $Z^{13}$ with number values 0 to 4 will register with the upper ends of the group of rods $Z^{12}$ with corresponding number values, yet when the set of rods $Z^{13}$ is swung by the sliding of the guide plate $R^3$ the second group of rods $Z^{13}$, which are the rods with number values 5 to 9, will have their lower ends brought into registration with the upper ends of the rods $Z^{12}$ with number values 0 to 4. The upper ends of the rods $Z^{13}$ are, however, spread out as they would be viewed from the front of the apparatus so that when seen from this point of view the upper ends of all the rods $Z^{13}$ will appear to be equally spaced apart in the order of their number values reading from left to right, 9, 4, 8, 3, 7, 2, 6, 1, 5, 0, though in side view, as mentioned the two groups of rods $Z^{13}$ will lie in two parallel planes.

It may be remarked here that in the diagram in Figure 70 the relative spacing apart of the several planes into which the rods are deflected is exaggerated for the sake of clearness, but in the actual apparatus in the spreading of the rod members, which may be effected by bending these rods, and their general arrangement, the spacing is designed so that the sliding of each guide bar or plate in an R or S direction takes place through a distance which is substantially equal or bears a definite proportion to the spacing apart of the rods in each set such standard spacing apart being indicated for example in the $Z^{10}$ set. This is referred to as unit spacing in respect of the rods or rod ends, and as unit movement with respect to the swinging of these rods. Thus the actual spacing apart of the upper ends of the rods $Z^{11}$ with number values 1, 3, 5, 7 and 9 as they emerge from the fixed guide bar 201 is equal to the spacing apart of the rods $Z^{10}$. The upper ends of the rods $Z^{11}$ with number values 0, 2, 4, 6, 8 are also equally spaced apart in the direction in which the lower ends of the rods $Z^{12}$ are swung by the plate $R^2$. On the other hand, the lower ends of the rods $Z^{11}$ which are adapted to register with the upper ends of the rods $Z^{10}$ are all equally spaced apart in the one plane. Then again, the plane in which lies one group of the upper ends of the rods $Z^{12}$ is in the actual apparatus spaced a unit distance apart from the plane in which lies the upper ends of the other group of these rods $Z^{12}$ so that the swinging of the lower ends of the rods $Z^{13}$ by means of the sliding guide plate $R^3$ takes place through a unit distance. In this way and by these means all transmitting movements from the guide bars 53, 63 can be determined on a unit basis.

It will be seen that if the upper ends of the rods $Z^{10}$ are swung one unit space by the guide member $S^1$ in an S direction, 1 will be added in. Similarly, if the lower ends of the rods $Z^{11}$ are swung one unit space by the guide member $R^1$ in an R direction, 1 will be added in. On the other hand, if the lower ends of the rods $Z^{12}$ are swung one unit space by the member $R^2$ in an R direction, 2 will be added in. Finally, if the lower ends of the rods $Z^{13}$ are swung one unit space by the member $R^3$ moving in an R direction, 5 will be added in. Thus by movement of either or all of the guide members $S^1$, $R^1$, $R^2$, $R^3$, or any two or more of them, such swinging of the several sets of rods will be performed as will result in the adding in of any number from 1 to 9. This selective swinging is effected by the sliding of the several guide bars 53 in the multiplying part of the apparatus due to the step-by-step movement of the grid plate 100 and is in accordance with the product or partial product values indicated by the rods 56 as described above.

It is to be noted that in Figure 70 a complete set of rods $Z^{10}$ is shown to demonstrate the general arrangement, but in fact in the apparatus only a single rod 0 is required in the rods dealing with the Z or lowest denomination. This rod is used to start and transmit the impulses through the rods in the other sets. If now it is supposed that the guide bar $S^1$ is moved, thereby feeding in 1, the other rod sets all being in their initial positions as shown in Figure 70, then if the 0 rod $Z^{10}$ is pushed up, it will be seen that 1 will be indicated at the upper end of the number 1 rod $Z^{13}$, whose lower end will register with the upper end of the rod $Z^{12}$. By means of suitable mechanism, this rod $Z^{13}$ can then indicate the answer 1. Again, if the guide bars $S^1$, $R^1$ and $R^2$ are all moved, thus feeding in $1+1+2=4$, and the 0 rod $Z^{10}$ is pushed up, it will push up the number 4 rod $Z^{12}$ and through the corresponding rod $Z^{13}$ the answer 4 can be indicated. If in addition to the swinging described above of the guide bars $S^1$, $R^1$, $R^2$, the guide bar $R^3$ is also moved so as to swing the set of rods $Z^{13}$, thereby feeding in 5, it will be seen that the number 9 rod $Z^{13}$ will have its lower end swung to bring it into register with the upper end of the number 4 rod $Z^{12}$ so that when this rod is pushed up the number 9 rod $Z^{13}$ will be pushed up and the answer $$1+1+2+5=9$$

will be indicated.

Figure 76:
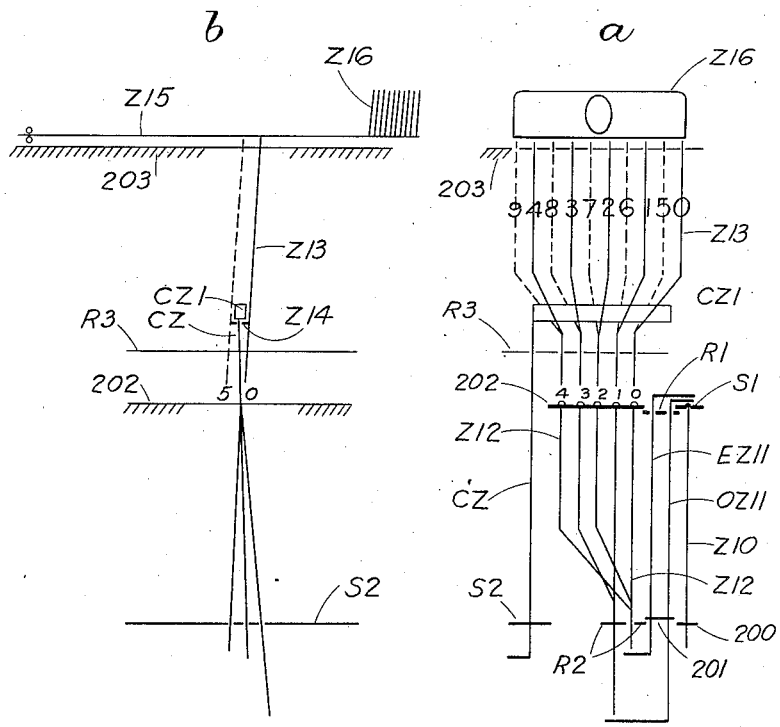

It will be convenient now to refer to the series of pairs of diagrams set out in Figures 71 to 75. These diagrams indicate the arrangements of the several rod sets and the relative swinging thereof that is effected as and when partial products are fed into the adding mechanism. It is to be understood that in the diagrams for the sake of clearness and simplicity of description the rod sets are all represented as being superimposed. It is obvious, however, that if the rod sets were thus superimposed in the machine, the apparatus would have inconvenient dimensions even if the length of individual rods was reduced as far as might be practicable. In the machine as designed for construction, however, the rod sets are arranged to a considerable extent one behind the other with the ends of rods in certain sets hooked over to engage the ends of rods in adjacent sets. Thus instead of the transmission of impulses being by a push to all the rods dealing with one denomination so that all these rods are in compression, in the working apparatus when an impulse is transmitted some rods will be in compression transmitting a push, while other rods will be in tension transmitting a pull from the upper ends of the rods in one set to the lower ends of the rods in another set. As already mentioned, in this pair of diagrams that marked $a$ represents the rod sets as they would appear from the front of the machine while the diagram marked $b$ shows the rod sets when viewed from the left-hand side of the machine. The diagrams forming a pair are so arranged side by side that the positions of corresponding rod sets and parts coincide. Each figure represents the rod sets for dealing with a separate denomination. Thus Figure 71 shows the rod sets for the Z denomination, Figure 72 the rod sets for the Y denomination, Figure 73 the rod sets for the X denomination, Figure 74 the rod sets for the W denomination and Figure 75 the rod sets for the V denomination. Figure 76 shows in similar pairs of diagrams the actual arrangement of the rod sets in the Z denomination and the mechanism for giving visual indications of the answers, the rod sets being shown here, as far as is practicable in diagrams, as they are situated in the apparatus. In these diagrams Figures 71 to 75, as in the diagram Figure 70, guide bars or like members referred to by numbers with the letter R prefixed are employed to swing rods towards the front, that is, in what has been termed an R direction, while guide bars or like members referred to by a number with the letter S prefixed serve to swing rod sets towards the rear or in what has been termed an S direction. It will be noted that in each of these diagrams the number which is placed in a circle adjacent to a sliding S or R guide bar is indicative of the split partial product figure that is fed in by swinging of this guide bar.

Referring first of all to Figure 71, these two diagrams show what has been already shown in diagrammatic perspective in Figure 70 and described with respect to that figure. In Figure 71, however, the rod sets are indicated as they would appear in true front and side elevations assuming that they were all superimposed. In these diagrams only a single rod $Z^{10}$ is shown this rod alone being necessary as already explained. Only three rods $Z^{11}$ are needed since comparison of the $a$ and $b$ diagrams with respect to the rods $Z^{11}$ shows how the upper ends of these rods are spread out in the plane of the paper in the $a$ diagram, that is, at right angles to the plane of the paper as shown in the $b$ diagram. In this spreading the heads of the rods are separated into odd and even number values, the heads of those rods with odd number values, indicated $OZ^{11}$, lying towards the left as shown in the $a$ diagram, while the heads of the rods with even numbers, indicated $EZ^{11}$, lie towards the right. There are five rods $Z^{12}$ the number values of which range from 0 to 4 inclusive. The upper ends of these rods $Z^{12}$ as seen in diagram $b$ all lie in a single plane which is in the plane of the paper in the case of the $a$ diagram. These rods form one of the groups of rods $Z^{12}$ indicated in Figure 70 the second group not being needed in practice. The upper ends of these rods $Z^{12}$ are carried in the fixed guide plate 202. The rods $Z^{13}$ are ten in number and lie in parallel planes which planes are parallel to the plane of the paper in the $a$ diagram where the spreading out fanwise of these rods towards their upper ends is indicated. This spreading out serves to permit actuation by these rods of the mechanism for exhibiting the answer numbers. The plates bearing these answer numbers lie one behind the other in ten planes and are carried on levers which will be moved, so as to push up a number plate, when any one of the rods $Z^{13}$ is pushed up. The upper ends of the rods $Z^{13}$ are all carried by a fixed guide plate 203 while their lower ends can be swung by the guide bar $R^3$. Each of the rods $Z^{13}$ has towards its upper end a laterally projecting lug $Z^{14}$ these lugs being directed inwardly in the manner indicated in the $b$ diagram. A single rod $CZ$ carries at its lower end a cross bar $CZ^1$ which is so positioned between the groups of rods $Z^{13}$ that when any one of these rods is pushed up its lug $Z^{14}$ will engage with the cross bar $CZ^1$ and the rod $CZ$ will be pushed up. This rod $CZ$ may be designated the carry rod though in the present apparatus in the case of the Z denomination, no actual carry can take place into the Y denomination. The rod $CZ$ serves therefore merely to transmit into the rods in the Y denomination the impulse which starts with the rod $Z^{10}$. It may be noted that in the actual apparatus the rods in the sets $Z^{10}$, $Z^{12}$ and $Z^{13}$ indicated in the diagrams are all in compression, that is to say, they are pushed up and transmit impulses by being pushed up. On the other hand, the rods in the set $Z^{11}$ as also the rod $CZ$ are in tension, being pulled up by hooking over the ends of rods. This will be seen in Figure 76 as referred to hereunder.

Turning now to Figure 72, in which the $a$ and $b$ diagrams illustrate the rod sets in the Y or tens denomination, it will be seen that the lowest set of rods $Y^{10}$ comprises three rods whose lower ends are adapted to register with the upper end of the rod $CZ$. The upper end of this rod $CZ$ is carried by a sliding guide bar $S^2$ which can be moved so as to cause the rod $CZ$ to swing in an S direction through one unit space. The lower ends of the rods $Y^{10}$ are carried by a sliding guide bar $R^4$ which can be moved to swing these rods in an R direction through one unit space. The upper ends of the rods $Y^{10}$ are carried by a sliding guide bar $S^3$ which can be moved to swing these ends of the rods $Y^{10}$ in an S direction through two unit spaces. These rods $Y^{10}$ have number values 0, 1 and 2 and all lie in a single plane, which is the plane of the paper in the $b$ diagram. The next set of rods $Y^{11}$ have their lower ends carried by a sliding guide bar $R^5$ which can swing the rods in an R direction through two unit spaces. The lower ends of these rods all lie in the same plane and can register with the upper ends of the rods $Y^{10}$. The upper ends of the rods $Y^{11}$ are spread laterally into two planes and equally spaced apart in these planes in the same way as the rods $Z^{11}$, as indicated in Figure 70. The upper ends of these rods $Y^{11}$ are carried by a sliding guide plate $S^4$ which can be moved to swing the upper ends of these rods in an S direction through one unit space. There are seven rods $Y^{11}$ with number values 0 to 6 inclusive and they are spread at their upper ends so that they fall into groups of odd and even numbers, as can be seen in the $a$ diagram. The lower ends of the rods $Y^{12}$ lie in two planes which correspond to and are adapted to register with the upper ends of the rods $Y^{11}$. The lower ends of these rods $Y^{12}$ are carried by a sliding guide plate $R^6$ which can be moved to swing the lower ends of these rods in an R direction through two unit spaces. There are thirteen $Y^{12}$ rods with number values 0 to 12 inclusive and their upper ends are spread out laterally in the manner indicated in the $a$ diagram so as to fall into three groups as can be seen from the $b$ diagram where the upper ends of the rods $Y^{12}$ are carried by a sliding guide plate $S^5$ which can be moved so as to swing the upper ends of these rods in an S direction with a single unit move. The arrangement of the rods $Y^{12}$ in two of the groups are indicated separately side by side in the $a$ diagram with their number values placed adjacent to their upper ends, only the number values of the rods in the third group being shown in their corresponding positions. It will be understood therefore that, viewed in plan, the upper ends of these rods lie with respect to their number values in the following way:—

```
          12  11  10
      9  8  7  6  5
      4  3  2  1  0
```

From this it will be seen that any number in one row differs from the correspondingly placed number in the next row by an increment of 5.

There are twenty-seven rods $Y^{13}$ with number values from 0 to 26 inclusive, and their lower ends are arranged in groups adapted to register with the upper ends of the rods $Y^{12}$, the lower ends of the rods $Y^{13}$ being guided by a sliding plate $R^7$ which can swing all these rods in an R direction through two unit spaces. The upper ends of all the rods $Y^{13}$ are carried in a fixed guide plate 204. The rods $Y^{13}$ throughout their lengths lie in six planes when viewed from the side, as seen in the $b$ diagram. Their lower ends when viewed from the front, see the $a$ diagram, lie in five planes to register with the upper ends of the rods $Y^{12}$. As seen also in the $a$ diagram, the upper ends of the rods $Y^{13}$ in the several groups are spread out fanwise in their respective planes but staggered. The upper ends of these rods are arranged so that their number values when read from the front (see the $a$ diagram) are grouped first in three rows across the front, these rows containing the following numbers: 0 to 9, 10 to 19 and 20 to 26. Secondly, the numbers in these rows are arranged relatively behind each other so that in each front-to-back row there lie all numbers containing the same unit digit. Thus there are in one such row the numbers 5, 15 and 25, in the next 1, 11 and 21, in the next 6, 16 and 26, and so on, as indicated at the upper ends of the rods $Y^{12}$ by the placing of the numbers in the $a$ diagram. The next set of rods comprises the carry rods CY which are three in number. On the lower end of each of these rods is a cross piece $CY^1$ adapted to be engaged by laterally projecting lugs $Y^{14}$ formed towards the upper ends of the rods $Y^{13}$. The arrangement is such that whenever a rod $Y^{13}$ is pushed up, it will also push up a rod CY. The upper ends of the carry rods CY are carried in a sliding guide plate $S^6$ which can be moved to swing the upper ends of these rods in an S direction. The answer figures for the Y or tens denomination are presented by the upward movements of the several rods $Y^{13}$.

Referring to Figure 73 which shows the X or hundreds denomination rods, there are seven rods $X^{10}$ with number values 0 to 6 inclusive. The lower ends of these rods are adapted to register with the upper ends of the carry rods CY and are carried by a sliding guide bar $R^8$ by means of which the lower ends of these rods can be swung in an R direction. The upper ends of the rods $X^{10}$ are carried by a guide bar $S^7$ by means of which the upper ends of these rods can be swung in an S direction. The upper ends of the carry rods CY can be swung by the guide bar $S^6$ through two units spaces, the lower ends of the rods $X^{10}$ can be swung by the rod $R^8$ through two unit spaces and the upper ends of the rods $X^{10}$ can be swung by the guide bar $S^7$ through two unit spaces. All the rods $X^{10}$ lie in a single plane as will be seen from the $a$ diagram. The general arrangement of the other sets of rods in the X denomination resembles that already described with respect to the Y denomination except that the numbers of rods in the sets differ. They will be enumerated as briefly as possible as follows. There are eleven rods $X^{11}$ with number values from 0 to 10 inclusive. Their lower ends can be swung through two unit spaces by a guide bar $R^9$ while their upper ends can be swung through two unit spaces by a guide bar $S^8$. These rods diverge at their upper ends into two planes as shown in the $a$ diagram, that on the left dealing with odd numbers and that on the right with even numbers. There are nineteen rods $X^{12}$ with number values from 0 to 18 inclusive. Their lower ends, divided into groups respectively containing rods of odd and even number values, can be swung through two unit spaces by a guide bar $R^{10}$. The upper ends of these rods $X^{12}$ can be swung through two unit spaces by a guide bar $S^9$. The upper ends of these rods are spread laterally as shown in the $a$ diagram and divided into four groups as indicated in the $b$ diagram. There are thirty-seven rods $X^{13}$ with number values from 0 to 36 inclusive their lower ends being arranged to register with the upper ends of the rods $X^{12}$ and being swung by a guide bar $R^{11}$ through two unit spaces. The upper ends of these rods are carried by a fixed guide plate 205. These rods lie parallel when viewed from the side as in the $b$ diagram and they carry lateral lugs $X^{14}$. There are four carry rods CX each of which is provided with a cross piece $CX^1$ adapted to be engaged and pushed up by the lugs on the rods $X^{13}$. The upper ends of the rods CX are carried by a guide bar $S^{10}$ by means of which the ends of these rods can be swung through two unit spaces. The answer figure for the hundreds is displayed by movement derived from the upper ends of the rods $X^{13}$ when pushed up. It will be seen from the grouping of the upper ends of the rods $X^{13}$ in accordance with their number values, as these number values are indicated above the ends of these rods in the $a$ diagram, that the arrangement is similar to that described above with respect to the arrangement of the upper ends of the rods $Y^{13}$. This facilitates the display or presentation of the unit figures in respect of hundreds by the action of upward movement of the rods $X^{13}$. Thus for example, since the ends of all the rods with number values 6, 16, 26 and 36 lie one behind the other as viewed from the front in diagram $a$, if either of these rods $X^{13}$ is pushed up, it will display the answer 6 in the hundreds, the tens figure being carried by pushing up one of the carry rods CX.

Passing to Figure 74, this shows the rods for the thousands or W denomination. These are again very similar to the rod sets in the other denominations except for the numbers of the rods in the several sets. They will be enumerated briefly as follows. In the first set $W^{10}$ this comprises eight rods with number values 0 to 7 inclusive. Their lower ends can be swung through two unit spaces by the guide bar $R^{12}$ and register with the upper ends of the carry rods CX which can also be swung through two unit spaces by the guide bar $S^{10}$. The upper ends of the rods $W^{10}$ can be swung through one unit space by the guide bar $S^{11}$. The lower ends of the rods $W^{11}$ can be swung through one unit space by the guide bar $R^{13}$ while their upper ends can be swung through two unit spaces by the guide bar $S^{12}$. There are ten rods $W^{11}$ with number values from 0 to 9 inclusive. There are sixteen rods $W^{12}$ with number values from 1 to 15 inclusive, whose lower ends can be swung through one unit space by the guide bar $R^{14}$ while their upper ends can be swung through two unit spaces by the guide bar $S^{13}$. There are twenty-nine rods $W^{13}$ with number values from 0 to 28 inclusive. Their lower ends can be swung through one unit space by the guide bar $R^{15}$ while their upper ends are carried by the fixed guide bar 206. There are three carry rods CW each provided with a cross piece $CW^1$ adapted to be lifted by lugs $W^{14}$ with which the rods $W^{13}$ are provided. The upper ends of the carry rods CW are carried by a guide bar $S^{14}$. The upper ends of the rods $W^{13}$ function to effect display of the answer figure for the thousands in the same way as in the other denominations.

Figure 75 shows the rods for the V or ten thousands denomination. Here fewer rods are obviously required in the sets, which may be particularized briefly as follows. The upper ends of the carry rods CW can be swung by a guide bar $S^{14}$ through one unit space. There are five rods $V^{10}$ with number values from 0 to 4 inclusive all lying in one plane. The lower ends of these rods are carried and can be swung through one unit space by a guide bar $R^{16}$. The upper ends of these rods are carried in a fixed guide bar 207. There are five rods $V^{11}$ whose lower ends are carried by a fixed guide bar 208 these rods diverging into separate lateral planes for odd and even. The upper ends of these rods are carried and can be swung through one unit space by the guide bar $S^{15}$. There are seven rods $V^{12}$ with number values from 0 to 6 inclusive, whose lower ends are carried by the fixed guide bar 209. Their upper ends can be swung by the guide bar $S^{16}$ through one unit space. There are ten rods $V^{13}$ arranged in two parallel planes as seen in side view, diagram $b$, and spread out fanwise as indicated in diagram $a$ when viewed from the front. The lower ends of these rods are carried in a fixed guide bar 210 while their upper ends are also carried in a fixed guide bar 211. The answer figures for the ten thousands are displayed by movements derived from the upper ends of the rods $V^{13}$ when pushed up.

Turning now to Figure 76, the two diagrams there set out purport to show as far as practicable in a diagram how the rod sets are disposed side by side and generally arranged in the mechanism as embodied in the apparatus. The two diagrams show views, $a$ from the front and $b$ from the left-hand side, as in the case of the $a$ and $b$ diagrams in the figures to which reference has just been made. Figure 76 shows the rod sets for the Z or units denomination and the mechanism for displaying the answer numbers is also indicated. It will be seen that the upper ends of the rods $Z^{10}$ are adapted to register with the hooked over ends of the next rod set $Z^{11}$ the rods in this latter set, as indicated in the diagrams in Figure 71, being separated into odd and even number rods. Those rods for the odd numbers $OZ^{11}$ are shown in the diagram $a$ in Figure 76 as lying behind the rods $Z^{10}$ while behind the rods $OZ^{11}$ lie the even number rods $EZ^{11}$ whose ends are also hooked over to register with the rods $Z^{10}$ with even numbers. It will be appreciated that while in the diagrams Figure 71 the upper ends of the rods $Z^{10}$ are shown as registering with the lower ends of the rods $Z^{11}$, in the constructional arrangement where these sets of rods are arranged side by side and the ends of certain rods are hooked over, the upper ends of the rods $Z^{10}$ register with the upper ends of the rods $Z^{11}$ the latter rods being pulled up. The lower ends of the rods $Z^{11}$ are hooked over and register with the lower ends of the rods $Z^{12}$ which are pushed up. In the $a$ diagram, Figure 76, certain of the rods $Z^{12}$ are shown as being bent to correspond to the spreading of the upper ends of these rods as shown in the $a$ diagram Figure 71. The set of rods $Z^{13}$ is arranged above the rods $Z^{12}$ in substantially the same way as indicated in the diagrams in Figure 71. The upper ends of these rods $Z^{13}$ engage a series of horizontally arranged levers $Z^{15}$ at points intermediate in the length of these levers. Each of these levers is pivoted towards one end and towards the other end carries a plate $Z^{16}$ on which is marked a number. The arrangement is such that when a rod $Z^{13}$ is pushed up, it will lift a lever $Z^{15}$ and raise a number plate $Z^{16}$, thus exhibiting the answer number coresponding to the rod $Z^{13}$ that has been pushed up. The cross piece $CZ^1$ which is acted on by the lugs $Z^{14}$ is shown diagrammatically and it will be seen that in the actual mechanism the rod CZ is pulled up instead of being pushed up as shown in the diagrams Figure 71.

In the diagrams comprised in the Figures 71 to 75 described above, there will be seen certain figures placed in circles adjacent to the lines indicating the sliding guide bars. These numbers in circles are the product values 1, 1, 2 or 5, which will be fed into the several denominations in the adding mechanism as and when the guide bars are moved to swing the rod sets in an R or S direction. It will be seen further in some cases that a T is placed beside the circle containing a product number value. This T indicates that the product value with which the letter is associated is fed into the adding apparatus by the sliding of a guide bar 63 and it will be appreciated from what has been said above that the partial product thus fed in is derived from a tens sub-group of a main group of product-indicating rods 66 in the M part of the apparatus. The product values which are in circles having no letter T associated with them are derived from the movements of guide bars 53 which transmit partial products indicated by rods 56 in the M part of the apparatus. It may be noted that in the diagrams in each denomination the lowest sliding guide bar, that is to say, the guide bars $R^4$, $R^8$, $R^{12}$ and $R^{16}$ feed in from the tens while if there is a carry practicable into any denomination the sliding guide bar which holds the upper ends of the carry rods from the denomination next below is connected to and swung by the tens feeding in mechanism, for example, the guide bars $S^6$, $S^{10}$, $S^{14}$. The guide bar $S^2$ will not function for a carry though swung by the tens, since, as mentioned, there can be no carry figure from the units or Z denomination in the present apparatus.

In the above description with reference to the diagrams in Figures 71 to 75, mention has been made of the swinging of the rod sets by sliding of the guide bars in an R or S direction through one or in some cases two unit spaces. It is to be understood that where this swinging takes place through two unit spaces it is effected with a step-by-step movement, corresponding to and originating with the step-by-step movement of the grid plate 100, that is to say, the rod sets are swung first through one unit space and subsequently through a second unit space. By reference to the diagrams in Figure 1, it will be understood how it comes about that the swinging can take place through one unit space after another. Taking for example the position of the carriage K as indicated in the diagram $d$ in Figure 1, it will be apparent that if and when partial products have been indicated by the product-indicating members 66 and 56 respectively in the main denomination groups $x$ and $y$ as the result of impulses transmitted through carriage rod sets in the main group U of such rod sets, swinging of rod sets in the adding part of the mechanism will have taken place as these partial products are fed into this part of the apparatus. Such swinging of each rod set in the adding part of the mechanism, however, will be only through one unit space corresponding to and resulting from the movement of the grid plate 100 through one step. When subsequently the carriage K has been traversed into the position indicated in the diagram $e$ in Figure 1, it is apparent that as a result of impulses transmitted from the tens main group of rod sets on the carriage K, a second set of partial products may have been indicated by the product-indicating rods 66 and 56 respectively in the main denomination groups $x$ and $y$. The feeding in of these partial products into the adding part of the mechanism may result in the swinging of certain rod sets in the adding mechanism through a second unit space as a result of the grid plate advancing another step. Thus a rod set in the adding part of the mechanism can be swung through two unit spaces. From a consideration of the diagrams $c$, $d$ and $e$ in Figure 1, it will be apparent that impulses transmitted from rod sets on the carriage K cannot pass into the same groups and sub-groups of product-indicating members more than twice in succession during a single traversing movement of the carriage K. Hence it comes about that rod sets in the adding part of the apparatus cannot be swung through more than two unit spaces nor is there any necessity for them to be swung through a greater distance.

With respect to the number of carry rods CY, CX and CW that are needed and the amount of the "carry" that has to be provided for, it may be remarked that, taking the case of a sum in which there are two figures in the first factor and three figures in the second factor and setting out a hypothetical sum in which all the partial product figures are 8 and 9, that is, supposing that the partial product of the multiplication of any two digits in the factors is 89, then the following figures are arrived at:—

```
      8 9
    8 9
        8 9
      8 9
          8 9
        8 9
   ─────────────
   8—25—34—26—9
   ─────────────
    v  w  x  y  z
```

This shows the maximum totals in each denomination column $v$, $w$, $x$, $y$ and $z$. Further, it will be seen that from the $y$ column the carry cannot be more than either 1 or 2, from the $x$ column the carry cannot be more than either 1, 2 or 3, while from the $w$ column the carry in fact cannot be more than 1, the 2 as set out above being hypothetical and in excess of what is possible. In this way is determined the number of the carry rods requisite in a machine having the capacity of that which has been described above.

Reference will now be made to Figures 77 to 86. These figures illustrate mainly the constructional forms of the features described above and illustrated diagrammatically in Figures 71 to 76. By comparing these diagrams with the figures illustrating the construction and since similar reference letters and numerals are used in each case for the same parts, it is possible to identify in Figures 77 to 86 the various rod sets in the adding part of the apparatus, the detail construction and disposition of these rod sets and their manner of functioning in respect of the several demoninations. Certain points wherein parts of the apparatus in their constructional forms differ from the corresponding parts as indicated in the diagrams may be commented on as also other features.

As has been mentioned, the transmission of an impulse to the rod sets for the purpose of adding together mechanically the partial products fed in and in order to present the answer, is caused by spring action when a certain member is released following the completion of the traversing movement of the carriage K. The rod with which the transmission of this impulse originates is the single rod $Z^{10}$ in the Z or units demonination. Attached to this rod is one end of a coiled spring 212 the other end of which is attached to some part of the fixed framing (see Figure 78). This spring tends to pull upwards the rod $Z^{10}$ which, as already described, is guided at its upper end in the sliding guide bar $S^1$ while at its lower end it is guided by the fixed guide bar 200. The downward movement of the rod $Z^{10}$ in this guide bar 200 is limited by a laterally projecting pin 213 while the upward movement of this rod is limited by a lateral pin 214. These features are shown in Figure 77 as well as in Figure 78. Reference has been made above to the series of flat rods 197 shown in Figure 77, which can be pushed downward against the action of a spring by the downward movement of the U-shaped member 189, 190, acting on a lateral projection 196 with which each flat rod 197 is provided, while on the lower end of each of these flat rods 197 is a horizontally extending lug 199. One of these horizontally extending lugs 199 which is shown in Figure 77 and Figure 78, is designated $199^z$ and lies adjacent to the side of the lower end of the rod $Z^{10}$ above the lateral pin 214. When the flat rod 197 is pushed down its end lug $199^z$ will come against the pin 214 and push downward the rod $Z^{10}$ assuming that this rod has been released and allowed to move upward for the purpose of transmitting an impulse. The rod $Z^{10}$ is then held in this position by a lateral projection 215 on the side of the rod $Z^{10}$ which can be engaged by a bar 216 carried on the ends of two levers 217 pivoted on the frame at 218. This swinging bar 216 and the levers 217 which carry it are shown in Figure 3. The swinging bar 216 carries an arm 219 which projects towards the front of the apparatus the end of this arm lying in the horizontal path of a lug 220 formed on the lower part of the carriage K. The position of this arm 219 is such that just as the carriage K completes its travel, the lug 220 will strike the end of the arm 219 and cause the levers 217 to turn sufficiently to move the bar 216 out of engagement with the lug 215. The rod $Z^{10}$ is then released and will be pulled upwards by the spring 212 and the impulse will be started through the rod sets in the adding part of the mechanism.

When referring to the construction and arrangement of the rod sets in the diagrams in Figures 71 to 76, the carry rods CZ, CY, CX, CW, which function to transmit impulses through the rod sets composing each demonination and also, where necessary, to feed in the carry figures were shown diagrammatically and referred to as plain rods which could be pushed up through the action of other rods on the cross pieces $CZ^1$, $CY^1$, $CX^1$, $CW^1$. In the actual construction, however, it is necessary to form each carry rod member in two parts, the arrangement in effect operating as a relay for transmission of the impulses from one denomination into the next. The structure of these carry members will be seen in Figures 83 and 84, reference being made more particularly in the following description to Figure 84, which shows the carry members CY. In this case, as already described with reference to the diagrammatic figures, there are three carry members CY, each of which can be pulled upwards by its cross piece $CY^1$. The lower end of each of these carry members takes the form of a flattened strip $CY^2$ in one edge of which is formed a notch $CY^3$. Pivoted at $CY^4$ on the fixed guide bar or plate 204 is a pawl $CY^5$, provided with a tail $CY^6$ which engages the notch $CY^3$ in the carry member. On the opposite side of the pivot $CY^4$ lies the nose $CY^7$ of the pawl which engages the upper end of the downwardly directed carry rod $CY^8$. The lower end of this rod is guided by the swinging guide bar $S^6$ and projects below this guide bar. From one side of the lower end of this rod $CY^8$ projects a pin 214 which functions as the laterally projecting pin 214 already described on the rod $Z^{10}$. That is to say, this pin is adapted to be engaged by the horizontal lug $199^x$, (see Figure 78 as well as Figure 84) on the end of the resetting bar $197^x$ when this bar is pushed down. On the opposite side of the lower end of the rod $CY^8$ is a laterally projecting lug $CY^9$ which can engage the lower end of either of the rods $X^{10}$ when the rod $CY^8$ moves upwardly. A coiled spring $CY^{10}$ is attached at one end to the rod $CY^8$ and at the other end to a fixed plate 204 and tends to pull the rod $CY^8$ upwards. In operation when a carry member CY is pulled upwards, it will turn the pawl $CY^5$ until the nose of the pawl $CY^7$ trips off the upper end of the rod $CY^8$. This rod being thus released will be pulled upwards by the spring CY$^{10}$ and through its lateral lug CY$^9$ will transmit an impulse through a rod X$^{10}$ and the other positioned rods in the X denomination. When the rod CY$^8$ is pulled down to reset the parts, the nose of the pawl CY$^7$ will engage the end of the rod CY$^8$ and hold it down. The other rods then drop by the force of gravity. The number values of the carry members CY and rod CY$^8$ are indicated in Figure 84 above the carry members and opposite the bottom ends of the carry rods CY$^8$. The carry apparatus is the same in respect of each denomination and all these carry members are reset similarly and simultaneously by the action of the swinging bar 190 on the lugs 196 projecting from the spring-actuated flat rod 197. The downward movement of the swinging bar 190 originates from the rotation of the main spring drum 177 as already described.

The transmission of the partial products as swinging movements into the adding part of the apparatus is effected by means of levers from the ends of the sliding guide bars 53, 63, when moved by the step-by-step motion of the grid plate 100. The manner in which these movements are transmitted is indicated more particularly in Figures 77, 83, 84 and 86. The connections with the guide bars 53, 63 are effected by way of slots 221 which engage pins 222 so that assembly is facilitated. Referring, for example, to Figure 86, a slot 221 extending from the under edge of the end of a guide bar 53 engages with a pin 222 carried by the end of a two-armed vertically arranged lever 223 which is pivoted at 224, the lower end of this lever engaging the end of the swinging guide bar R$^{10}$ by means of a pin 225 on the end of the lever and a slot 226 in the end of the swinging guide bar. In Figure 84, the lower end of a similar two-armed lever 223 engages the end of the swinging guide bar S$^6$ by means of pins 227 fixed in the end of the guide bar. Again, by similar pin-and-slot connections swinging movement will be imparted from a guide bar 53 or 63 through two-armed levers 228 pivoted at 229 to other sliding guide bars such as R$^{11}$, Figure 86, by means of which a set of rods such as X$^{13}$ can be swung. By means of certain levers 228 dummy guide bars 230, Figure 84, can be caused to slide each of these sliding bars being provided with a downwardly directed arm 231 whose lower end engages as by means of pins a horizontal sliding guide bar which serves to swing the upper ends of a set of rods. By this mechanism the movement towards the back of the machine of a guide bar 53 or 63 will effect swinging towards the front of the machine of the upper ends of a set of rods in the adding part of the apparatus.

It is to be understood that the details of construction of the above described calculating apparatus may be modified as necessary to meet particular requirements. Thus if the machine is to deal with larger factors, further rod sets and mechanism constructed and arranged as in the manner indicated may be added. It will be appreciated that from the constructional point of view the manufacture of the parts of the mechanism is simplified by reason of the amount of repetition work involved owing to the similarity of many of the rods. The manner of assembly is also simplified by the preferred arrangement described above whereby sliding guide bars or like members are carried in slotted plates into which these guide members can be dropped.

What we claim as our invention and desire to secure by Letters Patent is:—

1. A calculating machine for performing multiplication comprising in combination, a plurality of sets of individually movable indicating members, a plurality of sets of rod-like members which can slide individually in the direction of their length and also be swung in a direction transverse to their length, key-actuated means whereby selected rod-like members can be caused to slide, means for swinging selected rod-like members, and means for traversing the sets of rod-like members from a position where they are inoperative on the indicating members into a position where rod-like members that have been swung can register with and when caused to slide can impart movement to indicating members.

2. A calculating machine for performing multiplication comprising in combination, a series of sets of individually movable indicating members, a plurality of sets of rod-like members which can slide individually in the direction of their length and also be swung in a direction transverse to their length, key-actuated means whereby selected rod-like members can be caused to slide, means comprising cams operative to effect a swinging of selected rod-like members, and means for traversing the sets of rod-like members from a position where they are inoperative on the indicating members into a position where rod-like members that have been swung can register with and when caused to slide can impart movement to indicating members.

3. A calculating machine for performing multiplication comprising in combination, a plurality of sets of individually movable indicating members, a plurality of sets of rod-like members which can slide individually in the direction of their length and also be swung in a direction transverse to their length, means for swinging selected rod-like members, key-actuated means whereby the means for swinging the rod-like members can be caused to function and whereby selected rod-like members can be caused to slide, and means for traversing the sets of rod-like members from a position where they are inoperative on the indicating members into a position where rod-like members that have been swung can register with and when caused to slide can impart movement to indicating members.

4. A calculating machine for performing multiplication comprising in combination, a plurality of sets of individually movable indicating members, a plurality of sets of rod-like members which can slide individually in the direction of their length and also be swung in a direction transverse to their length, means comprising cams operative to effect a swinging of selected rod-like members, key-actuated means whereby selected rod-like members can be caused to slide and either cooperate with the cams to bring about swinging of rod-like members or impart movement to indicating members, and means for traversing the sets of rod-like members from a position where they are inoperative on the indicating members into a position where rod-like members that have been swung can register with and when caused to slide can impart movement to indicating members.

5. A calculating machine for performing multiplication comprising in combination, a plurality of sets of individually movable indicating members, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating members into a position where rod-like members that have been swung can register with and when caused to slide can impart movement to indicating members, mechanism into which number values can be fed and by which these number values will be added together mechanically, and means for feeding into this adding mechanism number values indicated as partial products by the indicating members which have been moved.

6. A calculating machine for performing multiplication comprising in combination, a plurality of sets of individually movable indicating members, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating members into a position where rod-like members that have been swung can register with and when caused to slide can impart movement to indicating members, mechanism into which number values can be fed and by which these number values will be added together mechanically, means for feeding automatically into this adding mechanism number values indicated as partial products by the indicating members which have been moved, and means whereby the adding mechanism will add together these number values and will present the final answer automatically.

7. A calculating machine for performing multiplication comprising in combination, a plurality of sets of individually movable indicating members which as a whole occupy a fixed position relative to other parts of the apparatus, a plurality of sets of rod-like members which can slide individually in the direction of their length and also be swung in a direction transverse to their length, means for traversing these sets of rod-like members from a position at one side of the fixed position of the indicating members into successive positions so adjacent to the indicating members that selected rod-like members can register with and when caused to slide can impart movement to indicating members, means for swinging selected rod-like members when these are positioned clear of the indicating members, rod-like members that are thus swung then being capable of registration with indicating members when subsequently the rod-like members are positioned adjacent to the indicating members, and key-actuated means whereby selected rod-like members can be caused to slide irrespective of the position occupied by these members due to their traversing.

8. A calculating machine for performing multiplication comprising in combination, a plurality of sets of individually movable indicating members which as a whole occupy a fixed position relative to other parts of the apparatus, a plurality of sets of rod-like members which can slide individually in the direction of their length and also be swung in a direction transverse to their length, means comprising cams operative to effect a swinging of selected rod-like members, these cams being disposed towards one side of the sets of indicating members, means for traversing the sets of rod-like members from a position below the cams when a swinging of selected rod-like members can be effected into successive positions below the indicating members when selected rod-like members which have been swung can register with indicating members, and key-actuated means whereby selected rod-like members can be caused to slide irrespective of the position occupied by these members due to their traversing the sliding of those rod-like members which have been swung and can register with indicating members causing these indicating members to move and give a mechanical indication of a product value.

9. A calculating machine for performing multiplication comprising in combination, a plurality of sets of individually movable indicating members which as a whole occupy a fixed position relative to other parts of the apparatus, a plurality of sets of rod-like members which can slide individually in the direction of their length and also be swung in a direction transverse to their length, a carriage on which these sets of rod-like members are mounted, means for traversing this carriage from a position to one side of the fixed position of the indicating members into successive positions adjacent to the indicating members when selected rod-like members on the carriage can register with and when caused to slide can impart movement to indicating members, means for swinging selected rod-like members when the carriage is positioned to one side and clear of the indicating members, the rod-like members that are then swung being capable of registration with indicating members when subsequently the carriage is positioned adjacent to the indicating members, and key-actuated means whereby selected rod-like members can be caused to slide irrespective of the position occupied by the carriage.

10. A calculating machine for performing multiplication comprising in combination, a plurality of sets of individually movable indicating members the sets being disposed side by side and assigned numerical values which will be indicated when members in these sets are moved, a plurality of sets of rod-like members the sets being disposed side by side while the rod-like members can slide individually and be swung collectively in sets, the upper ends of these rod-like members when swung being adapted to register with indicating members, means for swinging selected rod-like members, means for traversing the sets of rod-like members from a position in which this selective swinging of rod-like members can be effected into successive positions where selected rod-like members that have been swung can register with indicating members, and key-actuated means whereby selected rod-like members can be caused to slide and if in registration with indicating members will impart movement to such indicating members thereby giving a mechanical representaton of product values.

11. A calculating machine for performing multiplication comprising in combination, a plurality of sets of individually movable indicating members which as a whole occupy a fixed position relative to other parts of the apparatus, a plurality of sets of rod-like members which can slide individually in the direction of their length and also be swung in a direction transverse to their length, means for traversing the sets of rod-like members from a position where they are clear of and inoperative on the indicating members into a position where selected rod-like members can register with and when caused to slide can impart movement to indicating members, means for swinging selected rod-like members when the latter are positioned clear of the indicating members, and key-actuated mechanism whereby selected rod-like members can be caused to slide, such sliding when the rod-like members are positioned clear of the indicating members being operative on the swinging means but when the rod-like members are positioned where those that have been swung can register with indicating members such sliding being operative to impart movement to indicating members.

12. A calculating machine for performing multiplication as claimed in claim 11 in which a single set of keys and key-actuated mechanism is operative by the sliding of rod-like members first to effect a selective swinging of rod-like members and subsequently to impart movement to indicating members, through selected rod-like members, the keys being actuated successively in the order in which occur the number values of the factors in the problem to be performed.

13. A calculating machine for performing multiplication comprising in combination, a plurality of sets of individually movable indicating members which as a whole occupy a fixed position relative to other parts of the apparatus, a plurality of sets of rod-like members which can slide individually in the direction of their length and also be swung in a direction transverse to their length, a carriage on which these rod-like members are mounted, means comprising cams operative to effect a swinging of selected rod-like members, a carriage on which these cams are mounted disposed towards one side of the sets of indicating members, means for traversing the carriage on which the rod-like members are mounted from a position below the cam carriage into successive positions adjacent to the indicating members, means for traversing the cam carriage into successive positions adjacent to the sets of rod-like members on their carriage, swinging of the sets of rod-like members being effected when they are positioned adjacent to the cams while when the rod-like members are positioned adjacent to the indicating members selected rod-like members that have been swung can register with and when caused to slide can impart movement to indicating members, and key-actuated means whereby selected rod-like members can be caused to slide irrespective of the position occupied by the carriage on which these rod-like members are mounted.

14. A calculating machine for performing multiplication comprising in combination, a plurality of sets of individually movable members serving as mechanical indications of number values, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating members into a position where the rod-like members that have been swung can register with and when caused to slide can impart movement to indicating members whereby mechanical indications of number values will be given, mechanism in which number values can be added together mechanically after they have been fed in by mechanical movements determined by such number values, selective means for effecting these feeding in movements in accordance with number values indicated by indicating members that have been moved, such number values being the partial products of the problem performed mechanically in the multiplying part of the apparatus, and means whereby the adding mechanism will add together the number values fed into it and will present the final answer automatically.

15. A calculating machine for performing multiplication comprising in combination, a plurality of sets of individually movable members serving as mechanical indications of number values these members as a whole occupying a fixed position relative to other parts of the apparatus, a plurality of sets of rod-like members which can slide individually in the direction of their length and also be swung in a direction transverse to their length, a carriage on which these rod-like members are mounted, means comprising cams operative to effect the swinging of selected rod-like members, a carriage on which these cams are mounted disposed towards one side of the sets of indicating members, means for traversing the carriage on which the rod-like members are mounted from a position below the cam carriage into successive positions adjacent to the indicating members, means for traversing the cam carriage into successive positions adjacent to the sets of rod-like members on their carriage, swinging of the sets of rod-like members being effected when they are positioned adjacent to the cams while when the rod-like members are positioned adjacent to the indicating members selected rod-like members that have been swung can register with and when caused to slide can impart movement to indicating members whereby mechanical indications of number values can be given, key-actuated means whereby selected rod-like members can be caused to slide irrespective of the position occupied by the carriage on which these rod-like members are mounted, mechanism by which number values can be added together mechanically after they have been fed in by mechanical movements determined by such number values, selective means for effecting these feeding in movements in accordance with number values indicated by indicating members that have been moved, such number values being the partial products of the problem performed mechanically in the multiplying part of the apparatus, and means whereby the adding mechanism will add together the number values fed into it and will present the final answer automatically.

16. A calculating machine for performing multiplication comprising in combination, a plurality of sets of individually movable members serving as mechanical indications of number values these members as a whole occupying a fixed position relative to other parts of the apparatus, a plurality of sets of rod-like members which can slide individually in the direction of their length and also be swung in a direction transverse to their length, a carriage on which these rod-like members are mounted, means comprising cams operative to effect the swinging of selected rod-like members, a carriage on which these cams are mounted disposed towards one side of the sets of indicating members, means controlled by an escapement for traversing the carriage on which the rod-like members are mounted from a position below the cam carriage into successive positions adjacent to the indicating members, means controlled by an escapement for traversing the cam carriage into successive positions adjacent to the sets of rod-like members on their carriage, swinging of the sets of rod-like members being effected when they are positioned adjacent to the cams while when the rod-like members are positioned adjacent to the indicating members selected rod-like members that have been swung can register with and when caused to slide can impart movement to indicating members whereby mechanical indications of number values can be given, key-actuated means whereby selected rod-like members can be caused to slide irrespective of the position occupied by the carriage on which these rod-like members are mounted, mechanism by which number values can be added together mechanically after they have been fed in by mechanical movements determined by such number values, selective means controlled by an escapement for effecting these feeding in movements in accordance with number values indicated by indicating members that have been moved, such number values being the partial products of the problem performed mechanically in the multiplying part of the apparatus, means whereby the adding mechanism will add together the number values fed into it and will present the final answer automatically, and means whereby the several escapement mechanisms are operated by the said key-actuated means.

17. A calculating machine for performing multiplication comprising in combination, a plurality of sets of individually movable indicating rod members which can slide individually in the direction of their length and also be swung in a direction transverse to their length, fixed guide bars for the lower parts of the indicating rods, guide bars for the upper parts of the indicating rods, which guide bars can slide in the direction of their length, the indicating rods swinging with the sliding movement of the bars that guide them, a fixed framework in which the said guide bars and indicating rods carried thereby are mounted, a plurality of sets of rod-like members which can slide individually in the direction of their length and also be swung in a direction transverse to their length, fixed guide bars for the lower parts of these rod-like members, guide bars for the upper parts of the rod-like members which can slide in the direction of their length and swing the rod-like members carried thereby, a framework in which the said guide bars for the rod-like members are mounted, the said framework being movable relatively to the other parts of the apparatus, key-actuated means whereby selected rod-like members can be caused to slide in their guide bars, means for swinging selected rod-like members, and means for traversing the framework in which the sets of rod-like members are mounted, such traversing being from a position where these rod-like members are inoperative on the indicating members into a position where the rod-like members that have been swung can register with and when caused to slide can impart sliding movement to indicating members.

18. A calculating machine for performing multiplication comprising in combination, a plurality of sets of individually movable rod members serving as mechanical indications of number values, these rod members being capable of sliding individually in the direction of their length and also of being swung in a direction transverse to their length, fixed guide bars for the lower parts of the indicating rods, guide bars for the upper parts of the indicating rods, which guide bars can slide in the direction of their length and transversely with respect to the indicating rods which swing with the sliding movement of the bars that guide them, a fixed framework in which the said guide bars and indicating rods carried thereby are mounted, a plurality of sets of rod-like members which can slide individually in the direction of their length and also be swung in a direction transverse to their length, fixed guide bars for the lower parts of these rod-like members, guide bars for the upper parts of the rod-like members which can slide in the direction of their length and transversely with respect to the rod-like members carried thereby so as to swing these members, a framework in which the said guide bars for the rod-like members are mounted, the said framework being movable relatively to the other parts of the apparatus, key-actuated means whereby selected rod-like members can be caused to slide in their guide bars, means for swinging selected rod-like members, means for traversing the framework in which the sets of rod-like members are mounted, such traversing being from a position where these rod-like members are inoperative on the indicating members into a position where the rod-like members that have been swung can register with and when caused to slide can impart sliding movement to indicating members, mechanism into which number values can be fed and by which these number values will be added together mechanically, and means for feeding into this adding mechanism number values indicated as partial products by the indicating rod members which have been caused to slide.

19. A calculating machine for performing multiplication comprising in combination, a plurality of sets of individually movable indicating members, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating members into a position where rod-like members that have been swung can register with and when caused to slide can impart movement to indicating members, adding mechanism comprising a plurality of sets of rod-like members, the rods of each set being longitudinally movable and corresponding rods in the several sets being capable of registration with respect to the adjacent rods so that longitudinal forward movement of any rod in a rear set will impart forward movement to any rod in advance thereof, and means whereby any rod in a rear set may be positioned to impart longitudinal movement to a non-corresponding rod in the set next in advance thereof, said means including a device associated with each set of rods for simultaneously moving the forward ends of said set laterally, such lateral movement being determined by movement imparted to the said indicating members.

20. A calculating machine for performing multiplication comprising in combination, a plurality of sets of individually movable members serving as mechanical indications of number values, these members as a whole occupying a fixed poition relative to other parts of the apparatus, a plurality of sets of rod-like members which can slide individually in the direction of their length and also be swung in a direction transverse to their length, a carriage on which these rod-like members are mounted, means comprising cams operative to effect the swinging of selected rod-like members, a carriage on which these cams are mounted disposed towards one side of the sets of indicating members, means for traversing the carriage on which the rod-like members are mounted from a position below the cam carriage into successive positions adjacent to the indicating members, means for traversing the cam carriage into successive positions adjacent to the sets of rod-like members on their carriage, swinging of the sets of rod-like members being effected when they are positioned adjacent to the cams while when the rod-like members are positioned adjacent to the indicating members selected rod-like members that have been swung can register with and when caused to slide can impart movement to indicating members whereby mechanical indications of number values can be given, key-actuated means whereby selected rod-like members can be caused to slide irrespective of the position occupied by the carriage on which these rod-like members are mounted, mechanism by which number values can be added together mechanically after they have been fed in by mechanical movements determined by such number values, selective means for effecting these feeding in movements in accordance with number values indicated by indicating members that have been moved such number values being the partial products of the problem performed mechanically in the multiplying part of the apparatus, and means actuated by the traversing movement of the carriage on which the rod-like members are mounted whereby the adding mechanism is caused to add together the number values fed into it and to present the final answer.

21. A calculating machine for performing multiplication comprising in combination, a plurality of sets of individually movable members serving as mechanical indications of number values, these members as a whole occupying a fixed position relative to other parts of the apparatus, a plurality of sets of rod-like members which can slide individually in the direction of their length and also be swung in a direction transverse to their length, a carriage on which these rod-like members are mounted, means comprising cams operative to effect the swinging of selected rod-like members, a carriage on which these cams are mounted disposed towards one side of the sets of indicating members, means controlled by an escapement for traversing the carriage on which the rod-like members are mounted from a position below the cam carriage into successive positions adjacent to the indicating members, means controlled by an escapement for traversing the cam carriage into successive positions adjacent to the sets of rod-like members on their carriage, swinging of the sets of rod-like members being effected when they are positioned adjacent to the cams while when the rod-like members are positioned adjacent to the indicating members selected rod-like members that have been swung can register with and when caused to slide can impart movement to indicating members whereby mechanical indications of number values can be given, key-actuated means whereby selected rod-like members can be caused to slide irrespective of the position occupied by the carriage on which these rod-like members are mounted, mechanism by which number values can be added together mechanically after they have been fed in by mechanical movements determined by such number values, selective means controlled by an escapement for effecting these feeding in movements in accordance with number values indicated by indicating members that have been moved, such number values being the partial products of the problem performed mechanically in the multiplying part of the apparatus, means whereby the adding mechanism will add together the number values fed into it and will present the final answer automatically, means whereby the several escapement mechanisms are operated by the said key-actauted means, and a key operating as a spacing key whereby the several escapement mechanisms can be actuated without imparting sliding movement to the rod-like members on the traversing carriage.

22. A calculating machine for performing multiplication comprising in combination, a plurality of sets of individually movable indicating members which as a whole occupy a fixed position relative to other parts of the apparatus the sets being arranged in groups adapted to function respectively for the several denominations in the indication of partial products, a plurality of sets of rod-like members which can slide individually in the direction of their length and also be swung in a direction transverse to their length, these sets of rod-like members being arranged in a plurality of groups functioning with respect to different denominations, means comprising sets of cams operative to effect a swinging of selected rod-like members, means for moving the sets of rod-like members and the sets of cams relatively so that the cam sets will be positioned adjacent to and capable of being successively operative on the several groups of rod-like members, means for traversing the sets of rod-like members into positions so successively adjacent to the groups of indicating members that selected rod-like members which have been swung by cam operation can register with and when caused to slide can impart movement to indicating members, and key-actuated means whereby selected rod-like members can be caused to slide irrespective of the position occupied by these members due to their traversing, such key-actuated means being operative to control the movements of the cam sets in relation to the rod-like members and also the traversing of the sets of rod-like members and their positioning in relation to the groups of indicating members.

23. A calculating machine for performing multiplication comprising in combination, a plurality of sets of individually movable indicating members which as a whole occupy a fixed position relative to other parts of the apparatus, the sets of indicating members being arranged in a series of main groups adapted to function respectively for the several denominations in the indication of partial products and each main group except those for the highest and lowest denominations being divided into two sub-groups which function respectively for tens and units, the disposition and functioning of the indicating members composing each tens sub-group and the group operative for the highest denomination being similar when these sub-groups and group are regarded each as a whole, while there is similarity of a like nature in the disposition and functioning of the indicating members which compose each unit sub-group and the group operative for the lowest denomination when these sub-groups and group are regarded each as a whole, a carriage on which are mounted a plurality of sets of rod-like members which can slide individually in the direction of their length and also be swung in a direction transverse to their length, these sets of rod-like members being arranged in a plurality of main groups operative with respect to different denominations the disposition and functioning of the rod sets in each of these main groups regarded as a whole being similar and each main group being divided into two sub-groups, means for traversing this carriage relatively to the indicating members, sets of cams operative to effect a swinging of selected rod-like members, these sets of cams forming a main group which is divided into two sub-groups and the whole main group of cam sets being operative in succession and similarly with each main group of rod sets, means for moving the sets of rod-like members and the sets of cams relatively, the two main groups of rod sets on the carriage being operative in succession and similarly as to their sub-groups with the corresponding sub-groups of indicating members as the said carriage on which the rod sets are mounted is traversed, and key-actuated means whereby selected rod-like members can be caused to slide irrespective of the position occupied by these members due to the traversing of the carriage, such key-actuated means being operative to control the movements of the cam sets in relation to the rod-like members and also the traversing of the carriage and its positioning in relation to the groups of indicating members.

24. A calculating machine for performing multiplication comprising in combination, a plurality of sets of individually movable indicating members, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating members into a position where rod-like members that have been swung can register with and when caused to slide can impart movement to indicating members, mechanism into which number values can be fed and by which these number values will be added together mechanically, a sliding member adapted to engage and carry with it as it slides indicating members that have been moved, means for causing this member to slide, and means whereby this sliding movement will cause number values indicated as partial products by the indicating members which have been moved and engaged by the sliding member to be fed into the adding mechanism.

25. A calculating machine for performing multiplication comprising in combination, a plurality of sets of individually movable indicating rod members which can slide individually in the direction of their length and also be swung in a direction transverse to their length, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating rod members into a position where rod-like members that have been swung can register with and when caused to slide can impart sliding movement to indicating rod members, mechanism into which number values can be fed and by which these number values can be added together mechanically, a sliding member adapted to engage and carry with it as it slides the projecting ends of indicating rod members that have been caused to slide so that their ends will project, means for causing this member to slide and in so sliding carry with it and swing the indicating rod members engaged thereby, and means whereby the sliding movement of this member will cause number values indicated as partial products by the indicating members whose ends have been engaged by the sliding member to be fed into the adding mechanism.

26. A calculating machine for performing multiplication comprising in combination, a plurality of sets of individually movable indicating rod members which can slide individually in the direction of their length and also be swung in a direction transverse to their length, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating rod members into a position where rod-like members that have been swung can register with and when caused to slide can impart sliding movement to indicating rod members, mechanism into which number values can be fed and by which these number values can be added together mechanically, a plate-like member mounted so that it can slide transversely relative to the indicating rod members this plate being provided with openings therein adapted to engage the end portions of indicating rod members when the latter have been caused to slide so that indicating rod members when thus engaged with the plate will be swung as and when the plate slides, means for causing the plate to slide, and means whereby the swinging of indicating rod members due to their engagement with the sliding plate will cause movements in the adding mechanism which constitute a feeding into that mechanism of number values indicated as partial products by the indicating rods that have been caused to slide into engagement with the sliding plate.

27. A calculating machine for performing multiplication comprising in combination, a plurality of sets of individually movable rod members serving as mechanical indications of number values, these rod members being capable of sliding individually in the direction of their length and also of being swung in a direction transverse to their length, fixed guide bars for the lower parts of the indicating rods, guide bars for the upper parts of the indicating rods, which guide bars can slide in the direction of their length and transversely with respect to the indicating rods which swing with the sliding movement of the bars that guide them, a fixed framework in which the said guide bars and indicating rods carried thereby are mounted, a plurality of sets of rod-like members which can slide individually in the direction of their length and also be swung in a direction transverse to their length, fixed guide bars for the lower parts of these rod-like members, guide bars for the upper parts of the rod-like members which can slide in the direction of their length and transversely with respect to the rod-like members carried thereby so as to swing these members, a framework in which the said guide bars for the rod-like members are mounted, the said framework being movable relatively to the other parts of the apparatus, key-actuated means whereby selected rod-like members can be caused to slide in their guide bars, means for swinging selected rod-like members, means for traversing the framework in which the sets of rod-like members are mounted, such traversing being from a position where these rod-like members are inoperative on the indicating members into a position where the rod-like members that have been swung can register with and when caused to slide can impart sliding movement to indicating members, mechanism into which number values can be fed and by which these number values will be added together mechanically, a sliding member adapted to engage and carry with it as it slides indicating rod members that have been moved thereby swinging these rod members and causing the bars which guide them to slide in the direction of their length, means for causing this member to slide, and means associated with the sliding guide bars of the indicating rod members whereby movement of these guide bars will cause number values indicated as partial products by the indicating rod members which have been moved and engaged by the sliding member to be fed into the adding mechanism.

28. A calculating machine for performing multiplication comprising in combination, a plurality of sets of individually movable indicating rod members, a plurality of sets of rod-like members which can slide individually in the direction of their length and also be swung in a direction transverse to their length, key-actuated means whereby selected rod-like members can be caused to slide, means for swinging selected rod-like members, means for traversing the sets of rod-like members from a position where they are inoperative on the indicating rod members into a position where rod-like members that have been swung can register with and when caused to slide can impart movement to indicating rod members, a sliding member adapted to engage and carry with it as it slides indicating rod members that have been moved, adding mechanism comprising a plurality of sets of rod-like members the rods in each set being longitudinally movable and corresponding rods in the several sets being capable of registration with respect to the adjacent rods so that longitudinal forward movement of any rod in a rear set will impart forward movement to any rod in advance thereof, and means whereby any rod in a rear set may be positioned to impart longitudinal movement to a non-corresponding rod in the set next in advance thereof, said means including a device associated with each set of rods for simultaneously moving the ends of said set laterally, such lateral movement being determined by movement derived from the movement of the said sliding member when it has engaged the indicating rod member.

29. A calculating machine for performing multiplication comprising in combination, a plurality of sets of individually movable rod members serving as mechanical indications of number values, these rod members being capable of sliding individually in the direction of their length and also of being swung in a direction transverse to their length, these members as a whole occupying a fixed position relative to other parts of the apparatus, a plurality of sets of rod-like members which can slide individually in the direction of their length and also be swung in a direction transverse to their length, a carriage on which these rod-like members are mounted, means comprising cams operative to effect the swinging of selected rod-like members, a carriage on which these cams are mounted disposed towards one side of the sets of indicating members, means controlled by by an escapement for traversing the carriage on which the rod-like members are mounted from a position below the cam carriage into successive positions adjacent to the indicating rod members, means controlled by an escapement for traversing the cam carriage into successive positions adjacent to the sets of rod members on their carriage, swinging of the sets of rod-like members being effected when they are positioned adjacent to the cams while when the rod-like members are positioned adjacent to the indicating rod members selected rod members that have been swung can register with and when caused to slide can impart sliding movement to indicating rod members whereby mechanical indications of number values can be given, key-actuated means whereby selected rod-like members can be caused to slide irrespective of the position occupied by the carriage on which these rod-like members are mounted, mechanism into which number values can be fed and by which these number values can be added together mechanically, a plate-like member mounted so that it can slide transversely relative to the indicating rod members this plate being provided with openings therein adapted to engage the end portions of indicating rod members when the latter have been caused to slide so that indicating rod members when thus engaged with the plate will be swung as and when the plate slides, means for causing the plate to slide under the control of an escapement, means whereby the swinging of indicating rod members due to their engagement with the sliding plate will cause movements in the adding mechanism which constitute a feeding into that mechanism of number values indicated as partial products by the indicating rods that have been caused to slide into engagement with the sliding plate, means whereby the adding mechanism will add together the number values fed into it and will present the final answer automatically, and means whereby the several escapement mechanisms are operated by the said key-actuated means.

30. A calculating machine for performing multiplication comprising in combination, a plurality of sets of individually movable members serving as mechanical indications of number values, these members as a whole occupying a fixed position relative to other parts of the apparatus, a plurality of sets of rod-like members which can slide individually in the direction of their length and also be swung in a direction transverse to their length, a carriage on which these rod-like members are mounted, means comprising cams operative to effect the swinging of selected rod-like members, a carriage on which these cams are mounted disposed towards one side of the sets of indicating members, means controlled by an escapement for traversing the carriage on which the rod-like members are mounted from a position below the cam carriage into successive positions adjacent to the indicating members, means controlled by an escapement for traversing the cam carriage into successive positions adjacent to the sets of rod-like members on their carriage, swinging of the sets of rod-like members being effected when they are positioned adjacent to the cams while when the rod-like members are positioned adjacent to the indicating members selected rod-like members that have been swung can register with and when caused to slide can impart movement to indicating members whereby mechanical indications of number values can be given, key-actuated means whereby selected rod-like members can be caused to slide irrespective of the position occupied by the carriage on which these rod-like members are mounted, mechanism by which number values can be added together mechanically after they have been fed in by mechanical movements determined by such number values, selective means controlled by an escapement for effecting these feeding in movements in accordance with number values indicated by indicating members that have been moved, such number values being the partial products of the problem performed mechanically in the multiplying part of the apparatus, means whereby the adding mechanism will add together the number values fed into it and will present the final answer automatically, means whereby the several escapement mechanisms are operated by the said key-actuated means, and means whereby the return movement of the carriage on which the rod-like members are mounted to its initial position causes the resetting of the parts of the mechanism.

31. In a calculating machine in which multiplication is performed by effecting a change of position in sets of rod-like members as by swinging the members, and by transmitting impulses through these members, as by sliding them, the combination of a series of sets of rod-like members, a series of sets of indicating or transmitting members disposed above the rod sets and with which the upper ends of the rod-like members can be caused to register, means for traversing the rod sets so that they can be located either where they will be clear of the indicating member sets or where they will be below and capable of registering with and transmitting impulses to the indicating member sets, means whereby when the rod sets are located clear of the indicating member sets selected rod sets can be swung, and means whereby when the rod sets are subsequently located below the indicating member sets impulses can be transmitted to indicating members through rods which have been swung and thereby positioned so as to register with indicating members.

32. A machine for performing multiplication as claimed in claim 31 in which the selective swinging of the rod sets is effected by sets of cam-like members as and when rods in the sets are caused to slide and their ends to come in contact with the cams by the actuation of a key corresponding to the number value of the first factor in the sum to be performed, the rod sets being subsequently traversed so as to remove them from beneath the cams and position them beneath the answer-presenting members with which rods that have been swung can then register, subsequent actuation of a key corresponding to the number value of the second factor in the problem causing rods to slide and movement to be imparted thereby to the answer-presenting member or members which will represent the product, or partial product of the sum performed.

33. A machine for performing multiplication comprising in combination, a series of sets of individually movable answer-presenting members, a series of sets of rod-like members which can slide and be swung to cause their upper ends to register with said answer-presenting members, the lower ends of the rods in each set being assigned separate and different unit number values constituting a full range of such number values from 1 to 9 inclusive, the upper ends of the rods in each set being assigned effective and selective number values constituting a limited range of such number values and consisting of the numbers 1, 1, 2 and 5, said answer-presenting members being assigned a limited range of number values corresponding to the number values assigned to the upper ends of said rods, means to swing the upper ends of the rods in sets in accordance with the first factor of the problem to be performed, means for traversing said rod sets to a position where they will be effective when caused to slide in accordance with the second factor of the problem to be performed to move the answer-presenting members into positions where they will represent the product or partial product of the problem performed.

34. A machine for performing multiplication as claimed in claim 33 which further includes in combination, means to totalize said partial products indicated by the answer-presenting members, said means including a series of sets of rod-like members which can slide and be positioned relatively by swinging, these rods being assigned ranges of number values as fixed units and an added range of number values due to their swinging, the latter additive range due to swinging consisting of the numbers 1, 1, 2 and 5, to correspond to the range of number values assigned to the sets of answer-presenting members so that swinging of the partial product adding sets or rod-like members will be determined by and in accordance with the selective action of the answer-presenting members.

35. In a calculating machine in which an arithmetical operation is performed by effecting a change of position in sets of members and subsequently transitting impulses through the relatively positioned members, the combination of a series of sets of sliding rod-like members on the lower ends of which actuating members can operate so as to raise and thereby transmit impulses through the rod-like members, sets of cams with which the upper ends of the said rod-like members when raised can engage such engagement causing one or more selected sets of the rods to swing and thus be positioned in accordance with a determined value, a second or upper series of sets of sliding rod-like members with the lower ends of which the upper ends of the rods in the first or lower rod sets can be caused to register, the upper ends of the rods in the second series serving to present or effect transmission of anwers as partial products, means for traversing the whole of the first series of rod sets so that they can be located either where their upper ends can engage the cams or located where their upper ends can be caused to register with and by sliding transmit impulses to and through the rods in the upper sets, and a single set of actuating members which are always operative on the rods in the first sets so as to effect a selection and cause sliding of rods in these sets irrespective of the location of the lower rod sets due to traversing thereof, so that the same actuating members serve to effect both the relative positioning of and the transmission of answer-giving impulses through the rod sets.

36. In a calculating machine in combination a plurality of sets of rod-like members, the rods of each set being longitudinally movable, and corresponding rods in the several sets being capable of registration with respect to the adjacent rods so that longitudinal forward movement of any rod in a rear set will impart forward movement to the corresponding rod in advance thereof, and means whereby any rod in a rear set may be positioned to impart longitudinal movement to a non-corresponding rod in the set next in advance thereof, said means including a device associated with each set of rods for simultaneously moving the forward ends of said set laterally.

37. In a calculating machine in combination a plurality of sets of rod-like members the rods of each set being longitudinally movable, and corresponding rods in the several sets being capable of registration with respect to the adjacent rods so that longitudinal forward movement of any rod in a rear set will impart forward movement to the corresponding rod in advance thereof, and means whereby any rod in a rear set may be positioned to impart longitudinal movement to a non-corresponding rod in the set next in advance thereof, said means including a transverse member connecting the forward ends of the rods of each rear set and a device for moving the same endwise, so that the forward ends of said rear set of rods, are simultaneously displaced laterally.

38. In a calculating machine in combination a plurality of sets of rod-like members the rods of each set being longitudinally movable, and corresponding rods in the several sets being capable of registration with respect to the adjacent rods so that longitudinal forward movement of any rod in a rear set will impart forward movement to the corresponding rod in advance thereof, and means whereby any rod in a rear set may be positioned to impart longitudinal movement to a non-corresponding rod in the set next in advance thereof, said means including a transverse member connecting the forward ends of the rods of each rear set and a cam operative to move the said member endwise, so that the forward ends of said rear set of rods are simultaneously displaced laterally.

39. In a calculating machine in combination a set of numeral indicating plungers arranged in spaced relationship and longitudinally movable, a set of spaced longitudinally movable operating plungers associated therewith, and means whereby each operating plunger may be caused to impart, by its longitudinal movement, longitudinal movement to either of a plurality of numeral indicating plungers.

40. In a calculating machine in combination a plurality of manually operable keys, a plurality of numeral indicating devices, and means including a plurality of elongated juxtaposed end-registering members operatively connecting the keys and numeral indicating devices whereby each key may operate one of a plurality of numeral indicating devices, for the purpose set forth.

41. In a calculating machine in combination a plurality of sets of members of elongated form the sets being relatively disposed so that the ends of the members in one set lie adjacent to and register with the ends of corresponding members in the next set, means for acting on each and any member in a set so as to cause an impulse to be transmitted by such member to and through that member in the next set with which the member which has been acted on is in register, and means for imparting to the rod-like members movements transverse to the direction in which these members lie whereby the relative positions and registration of the ends of the members in adjacent sets can be changed.

42. In a calculating machine in combination a plurality of sets of members of rod-like form the sets being relatively disposed so that the ends of the members in one set lie adjacent to and register with the ends of corresponding members in the next set, means for acting on each and any member in a set so as to cause such member to move in the direction of its length and thereby transmit a movement impulse to and through that member in the next set with which the member which has been acted on is in register, and means for imparting to the rod-like members movements transverse to the direction in which these members lie and move when impulses are transmitted through them such transverse movements causing the relative positions and registration of the ends of the members in adjacent sets to be changed.

43. In a calculating machine in combination a plurality of sets of members of elongated form the sets being relatively disposed so that the ends of the members in one set lie adjacent to and register with the ends of corresponding members in the next set, key-actuated mechanism whereby each and any member in a set can be acted on so as to cause an impulse to be transmitted by such member to and through that member in the next set with which the member which has been acted on is in register, and means for imparting to the elongated members movements transverse to the direction in which these members lie whereby the relative positions and registration of the ends of the members in adjacent sets can be changed.

44. In a calculating machine in combination a plurality of sets of members of rod-like form the sets being relatively disposed so that the ends of the members in one set lie adjacent to and register with the ends of corresponding members in the next set, key-actuated mechanism for acting on each and any member in a set so as to cause such member to move in the direction of its length and thereby transmit a movement impulse to and through that member in the next set with which the member which has been acted on is in register, and means for imparting to the rod-like members movements transverse to the direction in which these members lie and move when impulses are transmitted through them such transverse movements causing the relative positions and registration of the ends of the members in adjacent sets to be changed.

45. In a calculating machine in combination a plurality of sets of members of rod-like form the sets being relatively disposed so that the ends of the members in one set lie adjacent to and register with the ends of corresponding members in the next set, and key-actuated means for imparting to the rod-like members movements transverse to the direction in which these members lie whereby the relative positions and registration of the ends of the members in adjacent sets can be changed.

46. In a calculating machine in combination a plurality of sets of members of rod-like form the sets being relatively disposed so that the ends of the members in one set lie adjacent to and register with the ends of corresponding members in the next set, means for acting on each and any member in a set so as to cause such member to move in the direction of its length and thereby transmit a movement impulse to and through that member in the next set with which the member which has been acted on is in register, and key-actuated means for imparting to the rod-like members movements transverse to the direction in which these members lie and move when impulses are transmitted through them such transverse movements causing the relative positions and registration of the ends of the members in adjacent sets to be changed.

47. In a calculating machine in combination a plurality of sets of members of elongated form the sets being relatively disposed so that the ends of the members in one set lie adjacent to and register with the ends of corresponding members in the next set, key-actuated mechanism whereby each and any member in a set can be acted on so as to cause an impulse to be transmitted by such member to and through that member in the next set with which the member which has been acted on is in register, and key-actuated means for imparting to the elongated members movements transverse to the direction in which these members lie whereby the relative positions and registration of the ends of the members in adjacent sets can be changed.

48. In a calculating machine in combination a plurality of sets of members of rod-like form the sets being relatively disposed so that the ends of the members in one set lie adjacent to and register with the ends of corresponding members in the next set, key-actuated mechanism for acting on each and any member in a set so as to cause such member to move in the direction of its length and thereby transmit a movement impulse to and through that member in the next set with which the member which has been acted on is in register, and key-actuated means for imparting to the rod-like members movements transverse to the direction in which these members lie and move when impulses are transmitted through them such transverse movements causing the relative positions and registration of the ends of the members in adjacent sets to be changed.

49. In a calculating machine in combination a plurality of sets of members of rod-like form the sets being relatively disposed so that the ends of the members in one set lie adjacent to and register with the ends of corresponding members in the next set, key-actuated means for acting on each and any member in a set so as to cause an impulse to be transmitted by such member to and through that member in the next set with which the member which has been acted on is in register, key-actuated means for imparting to the rod-like members movements transverse to the direction in which these members lie whereby the relative positions and registration of the ends of the members in adjacent sets can be changed, said means for transmitting impulses through the rod-like members acting subsequent to the action of said means for effecting transverse movement and relative positioning of the rod-like members.

50. A calculating machine comprising in combination, a plurality of banks of juxtaposed elongated members, at least one bank of said members being traversable from a position where it is clear of other banks to a position where it is disposed in tandem relation to an adjacent bank.

51. A calculating machine comprising in combination, a plurality of manually operable actuating members, a plurality of numeral indicating members and means including a plurality of bodily traversable juxtaposed elongated members adapted to constitute an operating connection between said actuating members and said indicating members.

52. A device as set forth in claim 51 in which said traversable elongated members are subjected to a change of condition in one traversed position and may be actuated to impart movement to said numeral indicating members when in another traversed position while in such changed condition.

53. A device as set forth in claim 51 in which said traversable elongated members are subjected to a change of condition in one traversed position and may be actuated to impart movement to said numeral indicating members when in another traversed position, said actuating members being arranged so that they may act upon said traversable elongated members in all traversed positions thereof to cause both the change of condition thereof and thereafter the actuation of said numeral indicating members.

54. A calculating machine comprising in combination, a plurality of manually operable actuating members, a plurality of numeral indicating members and means including a plurality of bodily traversable juxtaposed elongated members forming an operating connection between said actuating members and said indicating members, said indicating members comprising juxtaposed elongated members the ends of which may be brought into registration with the ends of said traversable elongated members.

55. A device as set forth in claim 54 in which each of said elongated members can move bodily in the direction of its length.

56. A device as set forth in claim 54 in which each of said elongated members can swing transversely of its length.

57. A device as set forth in claim 54 in which each of said elongated members can swing transversely of its length and can also move bodily in the direction of its length.

58. A calculating machine comprising in combination, a plurality of manually operable actuating members, a plurality of numeral indicating members and means including a plurality of traversable juxtaposed elongated members forming an operating connection between said actuating members and said indicating members, all of said elongated members being capable of swinging transversely of their length and also capable of bodily movement in the direction of their length, said actuating members acting upon said traversable elongated members in all traversed positions to cause both their swinging when in one traversed position and their bodily movement when in another traversed position, the bodily movement of said traversable elongated members causing impulses to be transmitted to said numeral indicating members.

59. A device as set forth in claim 58 in which said traversable elongated members are arranged in connected sets in rows.

60. A calculating machine comprising in combination, a plurality of manually operable actuating members, a plurality of numeral indicating members and means including a plurality of traversable juxtaposed elongated members forming an operating connection between said actuating members and said indicating members, all of said elongated members being capable of swinging transversely of their length and also capable of bodily movement in the direction of their length, said actuating members acting upon said traversable elongated members in all traversed positions to cause both their swinging when in one traversed position and their bodily movement when in another traversed position, said traversable elongated members being arranged in connected sets in rows, the swinging of any one member of a row causing the collective swinging of all members of the row.

61. A calculating machine comprising in combination, a plurality of manually operable actuating members, a plurality of numeral indicating members and means including a plurality of traversable juxtaposed elongated members forming an operating connection between said actuating members and said indicating members, all of said elongated members being capable of swinging transversely of their length and also capable of bodily movement in the direction of their length, said actuating members acting upon said traversable elongated members in all traversed positions to cause both their swinging when in one traversed position and their bodily movement when in another traversed position, the lengthwise bodily movement of said traversable elongated members in one traversed position causing their swinging.

62. A calculating machine comprising in combination, a plurality of manually operable actuating members, a plurality of numeral indicating members and means including a plurality of traversable juxtaposed elongated members forming an operating connection between said actuating members and said indicating members, all of said elongated members being capable of swinging transversely of their length and also capable of bodily movement in the direction of their length, said actuating members acting upon said traversable elongated members in all traversed positions to cause both their swinging when in one traversed position and their bodily movement when in another traversed position, the sliding of said traversable elongated members in one traversed position causing their swinging, and their sliding in another traversed position causing impulses to be transmitted to said numeral indicating members.

63. A calculating machine comprising in combination a plurality of traversable juxtaposed elongated members capable of swinging transversely of their length, and a plurality of cams capable of acting upon said members in one traversed position to swing them.

64. A device as set forth in claim 63 in which said members and cams are arranged in connected rows, and in which the action of one member of a row of cams upon one of a row of members causes a swinging of all members in a row.

65. A calculating machine, comprising in combination, a plurality of juxtaposed elongated members capable of swinging transversely of their length, and a plurality of cams capable of acting upon said members to swing them, said cams being traversable relative to said members so as to be selectively effective in respect of them.

66. A calculating machine, comprising in combination, a plurality of juxtaposed elongated members capable of swinging transversely of their length and also capable of sliding bodily in the direction of their length, and a plurality of cams capable of acting upon and swinging said members when slid.

67. A calculating machine, comprising in combination, a plurality of traversable juxtaposed elongated members capable of swinging transversely of their length and also capable of moving in the direction of their length, and a plurality of cams capable of acting upon and swinging said members in one traversed position and when moved in the direction of their lengths.

68. A calculating machine comprising two main portions in one of which multiplication is performed by the feeding in of two factors of a problem to be performed, the feeding in of the first factor bringing about a change of position in sets of rod-like members while the feeding in of the second factor causes the transmission of impulses through the relatively positioned rod-like members, the resultant mechanical representations of partial products being operative in the second part of the apparatus to effect in other sets of rod-like members changes of position corresponding to these partial products, the answer to the multiplication problem being presented by the automatic transmission of an impulse or impulses through the relatively positioned rod-like members in the second portion of the apparatus.

69. A calculating machine as set forth in claim 68 in which the feeding in of the two factors is effected by the successive operation of a single set of key-actuated members in the order of the digits as they would normally be written when setting out the problem to be performed.

70. A calculating machine comprising in combination, a plurality of juxtaposed elongated swingable numeral indicating members, means for imparting an impulse to said members in the direction of their length and means for swinging said members when thus impulsed.

71. In a calculating machine, in combination, a plurality of juxtaposed elongated numeral indicating members which can move in the direction of their length, means for moving any one of selected members in the direction of its length, a member to which reciprocating movement is imparted transversely with respect to the length of the numeral indicating members, a plurality of members slidable transversely with respect to the numeral indicating members, and means actuated by the numeral indicating members when any one of them is moved in the direction of its length whereby a transversely slidable member is coupled to the reciprocating member.

72. A calculating machine comprising in combination, a multiplying portion and an adding portion, each portion comprising a plurality of juxtaposed elongated members which can move in the direction of their length and can also swing transversely of their length, the elongated members in said multiplying portion being first moved in the direction of their length and subsequently swung while the elongated members in said adding portion are first swung and subsequently moved in the direction of their length.

In testimony whereof we have signed our names to this specification.

CHARLES DONOVAN ROWLEY.
WILLIAM JACKSON.